(12) United States Patent
Tao et al.

(10) Patent No.: US 8,862,791 B2
(45) Date of Patent: Oct. 14, 2014

(54) ELECTRONIC DEVICE AND DIGITAL INTERFACE DETERMINING METHOD OF CONNECTED EXTERNAL DEVICE

(75) Inventors: Akihiko Tao, Kanagawa (JP); Takehiko Saito, Kanagawa (JP); Toshihide Hayashi, Kanagawa (JP); Gen Ichimura, Tokyo (JP)

(73) Assignee: Sony Corporation (JP)

( * ) Notice: Subject to any disclaimer, the term of this patent is extended or adjusted under 35 U.S.C. 154(b) by 72 days.

(21) Appl. No.: 13/262,730

(22) PCT Filed: Feb. 2, 2011

(86) PCT No.: PCT/JP2011/052180
§ 371 (c)(1),
(2), (4) Date: Oct. 3, 2011

(87) PCT Pub. No.: WO2011/099407
PCT Pub. Date: Aug. 18, 2011

(65) Prior Publication Data
US 2012/0036284 A1    Feb. 9, 2012

(30) Foreign Application Priority Data

Feb. 12, 2010  (JP) .............................. P2010-029545
Mar. 1, 2010   (JP) .............................. P2010-044778
Mar. 23, 2010  (JP) .............................. P2010-067089

(51) Int. Cl.
*G06F 3/00*      (2006.01)
*H04N 21/442*    (2011.01)
*G09G 5/00*      (2006.01)
*H04N 21/4363*   (2011.01)

(52) U.S. Cl.
CPC .......... *G09G 5/006* (2013.01); *G09G 2370/042* (2013.01); *G09G 2370/12* (2013.01); *H04N 21/44231* (2013.01); *H04N 21/43635* (2013.01)
USPC ........................................... 710/16; 322/538

(58) Field of Classification Search
None
See application file for complete search history.

(56) References Cited

U.S. PATENT DOCUMENTS 6,334,160 B1    12/2001  Emmert et al.
6,460,094 B1 *  10/2002  Hanson et al. .................... 710/8
(Continued)

FOREIGN PATENT DOCUMENTS

EP         2472896 A2       7/2012
JP         2000-235545 A    8/2000
(Continued)

OTHER PUBLICATIONS

High-Definition Multimedia Interface Specification Version 1.4, Jun. 5, 2009; pp. i-197; Supplement 1—Consumer Electronics Control (CEC), pp. CEC i-CEC 127; Supplement 2—HDMI Ethernet and Audio Return Channel (HEAC), pp. HEAC i-HEAC 72.

(Continued)

*Primary Examiner* — Elias Mamo
(74) *Attorney, Agent, or Firm* — Lerner, David, Littenberg, Krumholz & Mentlik, LLP

(57) ABSTRACT

An electronic device to determine a type of digital interface between a source device and a sink device. A control unit of the sink device may include a determining unit which determines whether or not the source device is connected to this sink device, and whether or not the digital interface of a data transmission unit of the source device is a HDMI standard or a new standard. When a data reception unit can handle both the HDMI standard and new standard, based on the determination result of the determining unit, a control unit may switch the operation of the data reception unit so as to perform an operation in accordance with the digital interface of the data transmission unit of the source device. A connector unit for connecting the devices which may operate using the digital interfaces of HDMI and the new standard can be shared.

22 Claims, 42 Drawing Sheets

(56) References Cited

U.S. PATENT DOCUMENTS

| | | | |
|---|---|---|---|
| 6,658,497 B1 * | 12/2003 | Kawasaki et al. | 710/8 |
| 6,854,024 B2 * | 2/2005 | Barrenscheen et al. | 710/19 |
| 7,296,107 B2 * | 11/2007 | Lunsford et al. | 710/304 |
| 7,899,494 B2 | 3/2011 | Lee et al. | |
| 2003/0236934 A1 * | 12/2003 | Park | 710/74 |
| 2004/0070952 A1 | 4/2004 | Higuchi et al. | |
| 2007/0036158 A1 * | 2/2007 | Hun-Kwon et al. | 370/389 |
| 2007/0263473 A1 | 11/2007 | Raines | |
| 2009/0091656 A1 | 4/2009 | Kitaru et al. | |
| 2009/0178097 A1 * | 7/2009 | Kim et al. | 725/114 |
| 2011/0063501 A1 * | 3/2011 | Bar-Niv et al. | 348/474 |

FOREIGN PATENT DOCUMENTS

| | | |
|---|---|---|
| JP | 2002-149293 A | 5/2002 |
| JP | 2003-511757 A | 3/2003 |
| JP | 2005-284323 A | 10/2005 |
| JP | 2006-309771 A | 11/2006 |

OTHER PUBLICATIONS

Supplementary European Search Report from EP Application No. 11742152, dated Aug. 21, 2013.

Mathelin D: "HDMI version 1.4 provides opportunities for active cables" Electronic Engineering Times Europe, European Business Press, Bruxelles, Belgium, vol. 12, No. 1, Aug. 1, 2009, pp. 40-41, XP 002633255.

Office Action from China Application No. 201180002038.7, dated Sep. 27, 2013.

* cited by examiner

FIG. 4

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Utility/HEAC+ |
| 15 | SCL | 16 | SDA |
| 17 | DDC/CEC Ground/HEAC Shield | 18 | +5V Power |
| 19 | Hot Plug Detect/HEAC− | | |

FIG. 21
(a)
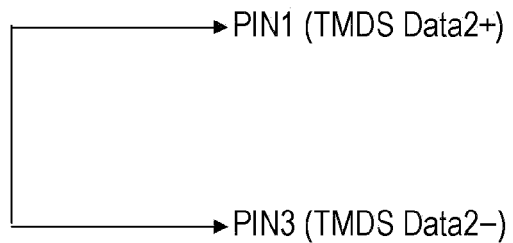
(b)
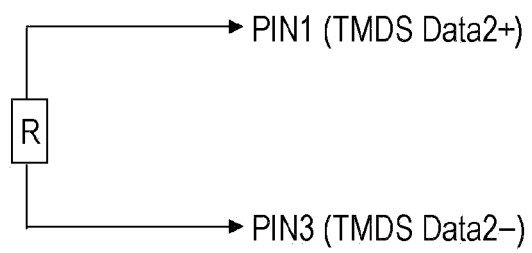
FIG. 22
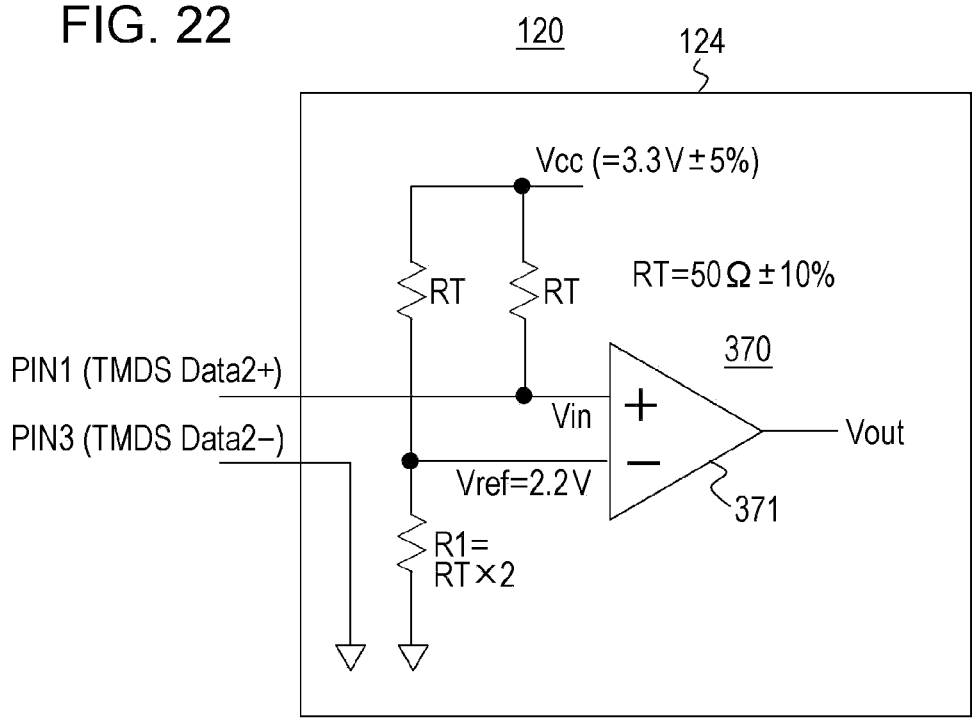

FIG. 44

| | DETECTION PROCEDURE A (out3) (SCL→SDA) | DETECTION PROCEDURE B (out2) (SDA→SCL) |
|---|---|---|
| 1. CABLE UNCONNECTED | N | N |
| 2. NEW STANDARD CABLE | Y | N |
| 3. NEW STANDARD CABLE + NEW STANDARD SOURCE DEVICE | Y | N |
| 4. HDMI CABLE | N | N |
| 5. HDMI CABLE + HDMI SOURCE DEVICE — 5-1: HIGH IMPEDANCE | Y | N |
| 5-2: LOW IMPEDANCE | Y | Y |
| 5-3: MEDIUM OF HIGH AND LOW | M | M |

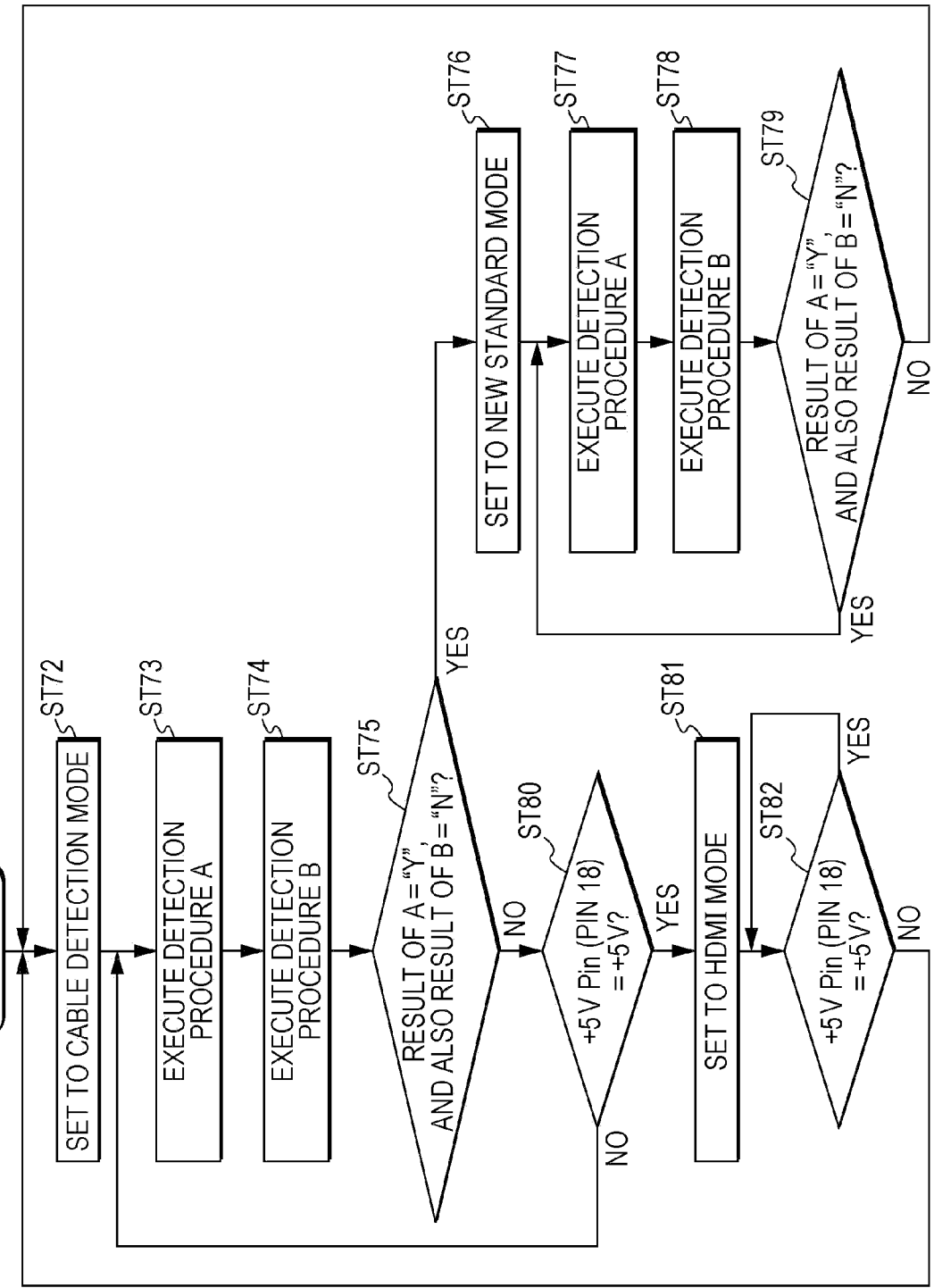

ELECTRONIC DEVICE AND DIGITAL INTERFACE DETERMINING METHOD OF CONNECTED EXTERNAL DEVICE

CROSS-REFERENCES TO RELATED APPLICATIONS

The present application is a national phase entry under 35 U.S.C. §371 of International Application No. PCT/JP2011/052180 filed Feb. 2, 2011, published on Aug. 18, 2011 as WO 2011/099407 A1, which claims priority from Japanese Patent Application No. JP 2010-029545 filed in the Japanese Patent Office on Feb. 12, 2010, Japanese Patent Application No. JP 2010-044778 filed in the Japanese Patent Office on Mar. 1, 2010, and Japanese Patent Application No. JP 2010-067089 filed in the Japanese Patent Office on Mar. 23, 2010.

TECHNICAL FIELD

The present invention relates to an electronic device and a digital interface determining method of an external device, and specifically relates to an electronic device for determining the digital interface of a connected external device to control the operation of a data transmission unit, and so forth.

BACKGROUND ART

In recent years, as a communication interface for transmitting image and audio data from a source device to a sink device at high speed, for example, interfaces such as HDMI (High Definition Multimedia Interface) and so forth have come into widespread use. Examples of the source device include game machines, DVD (Digital Versatile Disc) recorders, set top boxes, and other AV sources (Audio Visual sources). Examples of the sink device include television receivers, projectors, and other displays. For example, in NPL 1, the details of the HDMI standard are described.

CITATION LIST

Non Patent Literature

NPL 1: High-Definition Multimedia Interface Specification Version 1.4, Jun. 5, 2009

SUMMARY OF INVENTION

Technical Problem

The HDMI standard principally assumes connection between fixed devices. Accordingly, the number of connector pins is great such as 19 pins, and the connector outer dimension is also great, which are disadvantageous to portable devices. Therefore, there has been studied a standard wherein a connector is reduced in size with a small number of pins, and further the same baseband video transmission as with HDMI is performed.

On the other hand, with sink devices such as television receivers and so forth, adding a connector conforming to a new standard is detrimental to user convenience, and is also disadvantageous from a space aspect and a cost aspect. It is convenient for a new standard to share HDMI receptacle that is a digital A/V input port which has come into widespread use. Specifically, there has been a demand for sharing a conventional HDMI receptacle to handle a new standard by only the circuit.

The object of this invention is to enable determining of the digital interface of a connected external device, and operating of a data transmission unit to be switched so as to be compatible with the digital interface of the connected external device.

Solution to Problem

The conception of the present invention is an electronic device including: a connector unit having multiple pins with a first number of pins being used of the multiple pins when an external device which operates using a first digital interface is connected to the connector unit, and a second number of pins which are less than the first number of pins being used of the multiple pins when an external device which operates using a second digital interface is connected, and further comprising: a digital interface determining unit configured to determine whether the digital interface of an external device connected to the connector unit is the first digital interface or the second digital interface, based on the voltage or current state of a predetermined pin not used of the multiple pins when an external device which operates using the second digital interface is connected to the connector unit; and a control unit configured to perform switching control so that a data transmission unit connected to the connector unit operates using a digital interface determined by the digital interface determining unit.

With the present invention, an electronic device includes a connector unit (receptacle) having multiple pins. A first number of pins are used of the multiple pins when an external device which operates using a first digital interface is connected to the connector unit. Also, a second number of pins which are less than the first number of pins are used of the multiple pins when an external device which operates using a second digital interface is connected. For example, in the event that the connector unit is an HDMI receptacle, the number of pins is 19 pins.

For example, in the event that the first digital interface is HDMI, and an external device which operates using this HDMI is connected, all of the 19 pins are used. For example, the second digital interface is a new standard digital interface which improves HDMI by increasing the frequency of a TMDS clock, and reducing the number of TMDS channels, and so forth. When an external device which operates using this second digital interface is connected, there may be an unused pin of the 19 pins of the HDMI receptacle, for example.

Determination is made by the digital interface determining unit whether the digital interface of an external device connected to the connector unit is the first digital interface or the second digital interface. In this case, of the multiple pins of the connector unit, determination is made based on the voltage or current state of a predetermined pin which is not used when the second digital interface is connected.

A data transmission unit connected to the connector unit is then subjected to switching control by an operation control unit so as to be operated using the digital interface determined by the digital interface determining unit. Specifically, when the digital interface of an external device connected to the connector unit is the first digital interface, the operation of the data transmission unit is arranged to conform to the first digital interface. On the other hand, when the digital interface of an external device connected to the connector unit is the second digital interface, the operation of the data transmission unit is arranged to conform to the second digital interface.

With the present invention, the digital interface of a connected external device is determined by the digital interface determining unit, the operation of the data transmission unit is switched so as to comfort to the digital interface of the connected external device. Accordingly, the connector unit can be shared as a connector unit for connecting an external device which operates using the first digital interface, and as a connector unit for connecting an external device which operates using the second digital interface, which is advantageous to a cost aspect and a space aspect.

With the present invention, for example, an arrangement may be made wherein the digital interface determining unit determines the digital interface of an external device connected to the connector unit based on the voltage states of a pair of pins to which a differential signal is input when an external device which operates using the first digital interface is connected, and no differential signal is input when an external device which operates using the second digital interface is connected. In this case, the digital interface of a source device can be determined on a sink device side.

Here, for example, the electronic device may further include a connection determining unit configured to determine whether or not an external device is connected to the connector unit via a cable based on the voltage states of a pair of pins to which a differential signal is input in either case of a case where an external device which operates using the first digital interface is connected, and a case where an external device which operates using the second digital interface is connected.

Also, with the present invention, for example, the digital interface determining unit determines whether the digital interface of an external device connected to the connector unit is the first digital interface or the second digital interface based on the voltage states of a pair of pins to which a differential signal is output when an external device which operates using the first digital interface, and no differential signal is output when an external device which operates using the second digital interface. In this case, the digital interface of the sink device can be determined on the source device side.

Here, for example, the electronic device may further include a connection determining unit configured to determine whether or not an external device is connected to the connector unit via a cable based on the voltage states of a pair of pins to which a differential signal is output in either case of a case where an external device which operates using the first digital interface is connected, and a case where an external device which operates using the second digital interface is connected.

Also, with the present invention, for example, in the event that an external device which operates using the first digital interface is connected, the digital interface determining unit determines whether the digital interface of an external device connected to the connector unit is the first digital interface or the second digital interface based on the voltage states of a pin to which power supply is supplied from said external device, and a pin connected to that pin via a diode and a resistor.

Also, with the present invention, for example, the digital interface determining unit determines whether the digital interface of an external device connected to the connector unit is the first digital interface or the second digital interface based on the voltage state of a pin which is grounded when an external device which operates using the first digital interface is connected, and to which higher voltage than ground voltage is applied, or which is changed to an electrically floating state, and also pulled up to higher voltage than ground voltage via a resistor, when an external device which operates using the second digital interface is connected.

Also, with the present invention, for example, based on a result of comparison between the voltage of a pin which is grounded when an external device which operates using the first digital interface is connected, and is grounded via a first resistor when an external device which operates using the second digital interface is connected, and also pulled up to predetermined voltage higher than ground voltage via a second resistor, and the upper side voltage and lower side voltage obtained by dividing the predetermined voltage by the first resistor and the second resistor, the digital interface determining unit determines whether the digital interface of an external device connected to the connector unit is the first digital interface or the second digital interface.

Also, with the present invention, for example, based on a result of comparison between the voltage of a pin which is grounded when an external device which operates using the first digital interface is connected, and to which voltage obtained by dividing predetermined voltage by a first resistor and a second resistor is applied, and also which is pulled up to the predetermined voltage via a third resistor, and the upper side voltage and lower side voltage obtained by dividing the predetermined voltage by a parallel resistor of the first resistor and the third resistor, and the second resistor, in the event of an external device which operates with the second digital interface being connected, the digital interface determining unit determines whether the digital interface of an external device connected to the connector unit is the first digital interface or the second digital interface.

Also, with the present invention, for example, the digital interface determining unit focuses on a pair of pins to which a differential signal is input when an external device which operates using the first digital interface is connected, and no differential signal is input when an external device which operates using the second digital interface is connected, and in a state in which when an external device which operates using the second digital interface is connected, the pair of pins are short-circuited or connected via a first resistor, one pin of the pair of pins is pulled up to predetermined voltage via a second resistor, and the other pin of the pair of pins is grounded, based on a result of comparison between the voltage of the one pin, and higher voltage than voltage obtained by dividing the predetermined voltage by the first resistor and the second resistor, determines whether the digital interface of an external device connected to the connector unit is the first digital interface or the second digital interface.

Here, for example, when an external device which operates using the second digital interface is connected, a state in which the pair of pins are short-circuited or connected via the first resistor is performed within the plug of a cable for connecting the external device to the connector unit. Also, the electronic device may further include a connection determining unit configured to determine connection of the cable as to the connector unit with the digital interface determining unit determining whether the digital interface of an external device connected to the connector unit is the first digital interface or the second digital interface after the connection determining unit determines that the cable is connected to the connector unit.

Also, with the present invention, for example, the digital interface determining unit further includes a first detecting unit configured to focus on a pair of pins which are used when an external device which operates using the first digital interface is connected, and are not used when an external device which operates using the second digital interface is connected, and to detect, when an external device which operates using the second digital interface is connected, the pair of pins are short-circuited or connected via a resistor, and one of the pair of pins is pulled up to predetermined voltage via a resistor, the state of current or voltage of the other pin of the pair of pins, and a second detecting unit configured to focus on, when an external device which operates using the first digital interface is connected, a power supply pin to which power supply is supplied from this external device, and to detect the voltage state of the power supply pin, and based on the detection results of the first detecting unit and the second detecting unit, determines whether the digital interface of an external device connected to the connector unit is the first digital interface or the second digital interface.

Here, for example, when an external device which operates using the second digital interface is connected, a state in which the pair of pins are short-circuited or connected via the first resistor is performed within the plug of a cable for connecting the external device to the connector unit. Also, for example, the first digital interface is HDMI, one pin of the pair of pins is a pin for SCL, and the other pin of the pair of pins is a pin for SDA.

In this case, for example, the digital interface determining unit determines, when the second detecting unit detects that the voltage state of the power supply pin is the voltage of the power supply, that the digital interface of an external device connected to the connector unit is the first digital interface.

Also, in this case, for example, the digital interface determining unit determines, when the second detecting unit detects that the voltage state of the power supply pin is not the voltage of the power supply, and further, the first detecting unit detects that current flows through the other pin of the pair of pins, or that the voltage of the other pin of the pair of pins is predetermined voltage, that the digital interface of an external device connected to the connector unit is the second digital interface.

Also, with the present invention, for example, the electronic device further includes a power supply unit configured to supply, when the digital interface determining unit detects that the digital interface of an external device connected to the connector unit is the second digital interface, power supply to the external device via the power supply pin.

In this case, for example, even when an external device of which the digital interface is the second digital interface is a battery-driven electronic device, and this battery is completely down, it can be determined that the digital interface of this external device is the second digital interface. Accordingly, power supply can be supplied to the external device for charging by the power supply unit.

Also, with the present invention, for example, the digital interface determining unit focuses on a pair of pins which are used when an external device which operates using the first digital interface is connected, and are not used when an external device which operates using the second digital interface is connected, with one pin and the other pin of the pair of pins being connected via an electronic device which flows a signal in one direction from the one pin to the other pin when an external device which operates using the second digital interface is connected, includes: a first signal supply unit configured to supply a first signal to the one pin of the pair of pins; a second signal supply unit configured to supply a second signal to the other pin of the pair of pins; a first signal detecting unit configured to detect the first signal from the other pin of the pair of pins during a period when the first signal is supplied from the first signal supply unit to the one pin of the pair of pins; and a second signal detecting unit configured to detect the second signal from the one pin of the pair of pins during a period when the second signal is supplied from the second signal supply unit to the other pin of the pair of pins; and based on the detection results of the first signal detection unit and the second signal detection unit, determines whether or not the digital interface of an external device connected to the connector unit is the second digital interface.

Here, for example, a state in which the pair of pins are connected through the electronic device when an external device which operates using the second digital interface is connected is performed within the plug of a cable for connecting the external device to the connector unit. Also, for example, the first digital interface is HDMI, one pin of the pair of pins is a pin for SCL, and the other pin of the pair of pins is a pin for SDA. Also, for example, the electronic device is a diode.

Also, with the present invention, for example, the digital interface determining unit determines, when the first signal detecting unit detects the first signal, and the second signal detecting unit does not detect the second signal, that the digital interface of an external device connected to the connector unit is the second digital interface.

Also, with the present invention, for example, the digital interface determining unit focuses on, when an external device which operates using the first digital interface is connected, a power supply pin to which power supply is supplied from this external device, further includes a voltage detecting unit configured to detect the voltage state of the power supply pin, and when the voltage detecting unit detects that the voltage state of the power supply pin is the voltage of the power supply, determines that the digital interface of an external device connected to the connector unit is the first digital interface.

Also, with the present invention, for example, the first signal and the second signal are pulse signals. In this case, for example, the first signal supply unit includes a first resistor element for connecting the one pin of the pair of pins to a terminal to which predetermined voltage is supplied, a first switching element for connecting the one pin to a ground terminal, and a first pulse generator for generating a pulse signal for driving the first switching element, the second signal supply unit includes a second resistor element for connecting the other pin of the pair of pins to a terminal to which predetermined voltage is supplied, a second switching element for connecting the other pin to a ground terminal, and a second pulse generator for generating a pulse signal for driving the second switching element. For example, the switching elements are field-effect transistors.

Advantageous Effects of Invention

According to the present invention, the digital interface of a connected external device is determined, and the operation of the data transmission unit is switched so as to conform to the digital interface of the connected external device, whereby the connector unit for connecting an external devices which operates using the first or second digital interface can be shared, which is advantageous to a cost aspect and a space aspect.

BRIEF DESCRIPTION OF DRAWINGS

FIG. 4 is a diagram showing the pin-out (Type A) of an HDMI terminal provided to an HDMI device.

FIG. 21 is a diagram for describing a processing example within a Type-A plug according to a new standard.

FIG. 22 is a diagram illustrating a configuration example of a cable detecting circuit provided to a determining unit within a control unit of the sink device.

FIG. 44 is a diagram showing a list of detection results out3 and out2 in the detection procedure A and detection procedure B in each of the cases.

FIG. 45 is a flowchart illustrating a control procedure of the control unit of the sink device.

DESCRIPTION OF EMBODIMENTS

Hereafter, a mode for implementing the present invention (hereafter, referred to "embodiment") will be described. Note that description will be made in the following sequence.
1. Embodiment
2. Modification

1. EMBODIMENT

[Configuration of AV System]

Figure 1:
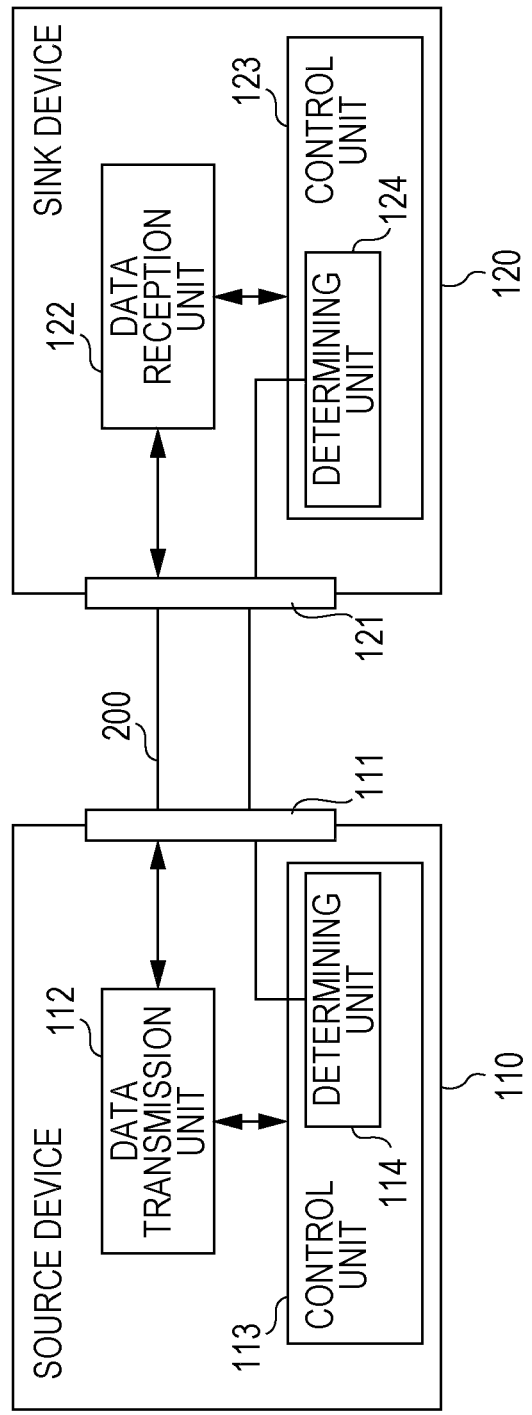
FIG. 1 is a block diagram illustrating a configuration example of an AV system serving as an embodiment of the present invention.

FIG. 1 illustrates a configuration example of an AV (Audio and Visual) system 100 serving as an embodiment. This AV system 100 is configured of a source device and a sink device being connected. Examples of a source device 110 include AV sources such as game machines, disc players, set top boxes, digital cameras, cellular phones, and so forth. Examples of a sink device 120 include television receivers, and projectors.

The source device 110 and the sink device 120 are connected via a cable 200. A connector unit 111 to which a data transmission unit 112 is connected is provided to the source device 110. A connector unit 121 to which a data reception unit 122 is connected is provided to the sink device 120. One end of the cable 200 is connected to the connector unit 111 of the source device 110, and the other end of this cable 200 is connected to the connector unit 121 of the sink device 120.

The source device 110 includes a control unit 113. This control unit 113 controls the whole of the source device 110. There is a case where the data transmission unit 112 of the source device 110 can handle the digital interface conforming to the HDMI standard alone, a case where the data transmission unit 112 can handle the digital interface conforming to a new standard alone, or a case where the data transmission unit 112 can handle both. In the case that the data transmission unit 112 can handle both of the digital interfaces, the data transmission unit 112 is selectively switched by the control unit 113 so as to perform the operation of one of the digital interfaces.

The control unit 113 of this source device 110 includes a determining unit 114. This determining unit 114 determines using a circuit whether or not the sink device 120 is connected to this source device 110, whether the digital interface of the data reception unit 122 of the sink device 120 is the HDMI standard or new standard, and so forth. In the event that the data transmission unit 112 can handle both of the digital interfaces of the HDMI standard and new standard, the control unit 113 switches the operation of the data transmission unit 112 so as to perform operation corresponding to the digital interface of the data reception unit 122 of the sink device 120 based on the determination result of the determining unit 114.

The sink device 120 includes a control unit 123. This control unit 123 controls the whole of the sink device 120. There is a case where the data reception unit 122 of the sink device 120 can handle the digital interface conforming to the HDMI standard alone, a case where the data reception unit 122 can handle the digital interface conforming to the new standard alone, or a case where the data reception unit 122 can handle both. In the case that the data reception unit 122 can handle both of the digital interfaces, the data reception unit 122 is selectively switched by the control unit 123 so as to perform the operation of one of the digital interfaces.

The control unit 123 of this sink device 120 includes a determining unit 124. This determining unit 124 determines using a circuit whether or not the source device 110 is connected to this sink device 120, whether the digital interface of the data transmission unit 112 of the source device 110 is the HDMI standard or new standard, and so forth. In the event that the data reception unit 122 can handle both of the digital interfaces of the HDMI standard and new standard, the control unit 123 switches the operation of the data reception unit 122 so as to perform operation corresponding to the digital interface of the data transmission unit 112 of the source device 110 based on the determination result of the determining unit 124.

[Configuration Example of Data Transmission Unit and Data Reception Unit]

Figure 2:
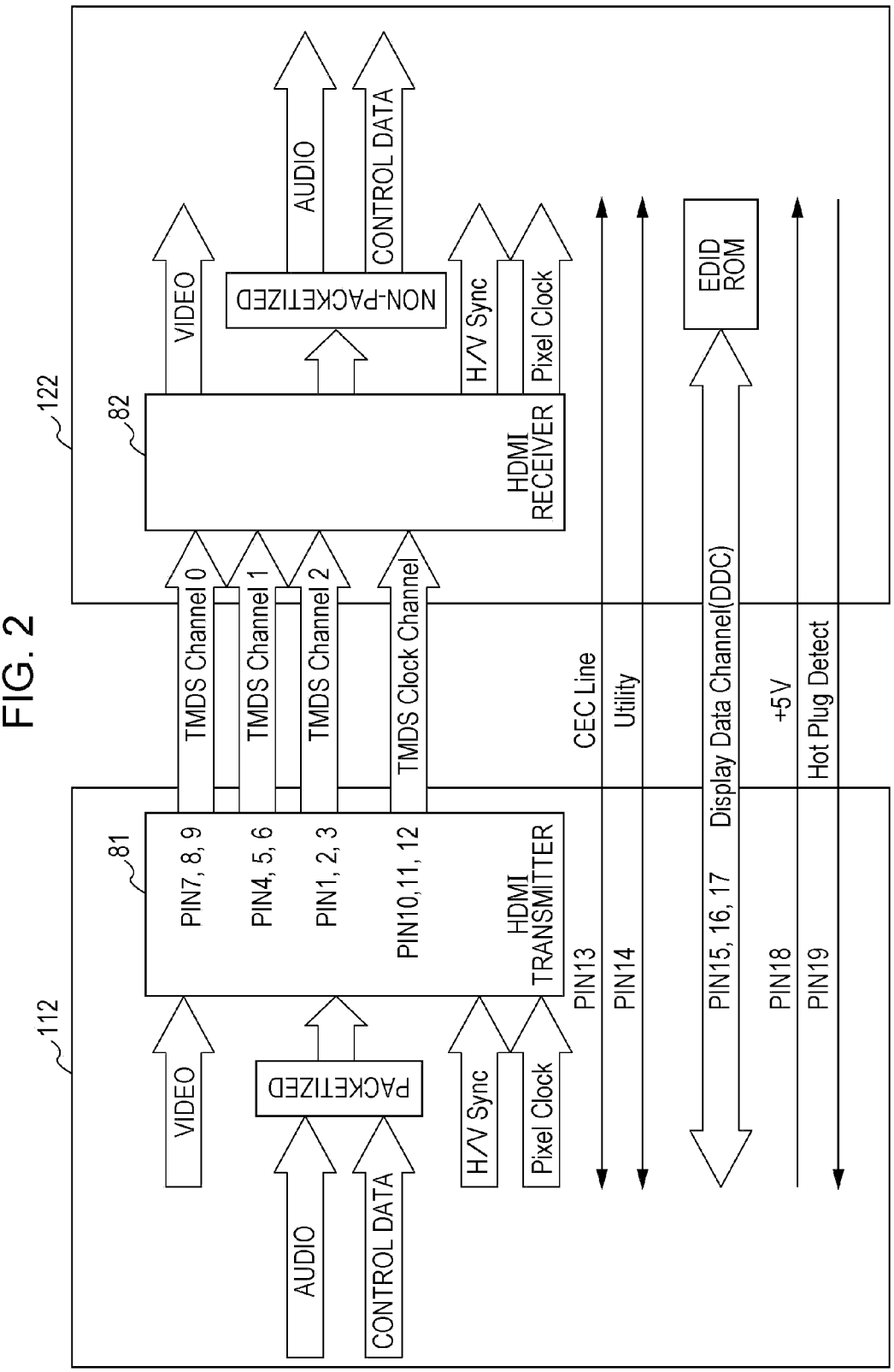
FIG. 2 is a diagram illustrating a configuration example of a data transmission unit of a source device, and a data reception unit of a sink device in the AV system (in the case of the digital interface conforming to the HDMI standard).

FIG. 2 illustrates a configuration example of the data transmission unit 112 of the source device 110, and the data reception unit 122 of the sink device 120 in the AV system 100 in FIG. 1. This configuration example illustrates a case where the digital interface between the data transmission unit 112 and the data reception unit 122 is the HDMI standard digital interface.

The data transmission unit 112 transmits a differential signal corresponding to the pixel data of one screen worth of uncompressed image in a valid image period (hereafter, also referred to as "active video period" as appropriate) to the data reception unit 122 in one direction using multiple channels. Here, the valid image period is a period obtained by removing a horizontal blanking period and a vertical blanking period from a period between one vertical synchronizing signal and the next vertical synchronizing signal. Also, the data transmission unit 112 transmits a differential signal corresponding to at least audio data, control data, other auxiliary data, and so forth accompanied with an image to the data reception unit 122 in one direction, with multiple channels.

The transmission channels of the HDMI system made up of the data transmission unit 112 and the data reception unit 122 include the following transmission channels. Specifically, there are three TMDS channels #0 through #2 serving as transmission channels for serially transmitting pixel data and audio data from the data transmission unit 112 to the data reception unit 122 in one direction in sync with pixel clock. Also, there is a TMDS clock channel serving as a transmission channel for transmitting TMDS clock.

The data transmission unit 112 includes an HDMI transmitter 81. This HDMI transmitter 81 converts, for example, the pixel data of an uncompressed image into the corresponding differential signal, and serially transmits to the data reception unit 122 connected via the HDMI cable in one direction using the three TMDS channels #0, #1, and #2 that are multiple channels.

Also, the HDMI transmitter 81 converts the audio data accompanied with an uncompressed image, and further necessary control data, other auxiliary data, and so froth into the corresponding differential signal, and serially transmits to the data reception unit 122 using the three TMDS channels #0, #1, and #2 in one direction.

Further, the HDMI transmitter 81 transmits the TMDS clock in sync with the pixel data transmitted by the three TMDS channels #0, #1, and #2 to the data transmission unit 122 connected via an HDMI cable using the TMDS clock channel. Here, with one TMDS channel #i (i=0, 1, and 2), 10-bit pixel data is transmitted during one clock of the TMDS clock.

The data reception unit 122 receives the differential signal corresponding to the pixel data transmitted from the data transmission unit 122 in one direction using the multiple channels during an active video period. Also, this data reception unit 122 receives the differential signal corresponding to audio data or control data transmitted from the data transmission unit 112 in one direction using the multiple channels during a horizontal blanking period or vertical blanking period.

Specifically, the data reception unit 122 includes an HDMI receiver 82. This HDMI receiver 82 receives the differential signal corresponding to the pixel data, and the differential signal corresponding to the audio data or control data transmitted from the data transmission unit 112 in one direction using the TMDS channels #0, #1, and #2. In this case, the data reception unit 122 receives the differential signals in sync with the pixel clock (TMDS clock) transmitted from the data transmission unit 112 using the TMDS clock channel.

The transmission channels of the HDMI system include, in addition to the TMDS channels #0 through #2 and the TMDS clock channel, transmission channels called as a DDC (Display Data Channel) and a CEC line. The DDC is made up of unshown two signal lines included in the HDMI cable. The DDC is used for the data transmission unit 112 reading out E-EDID (Enhanced Extended Display Identification Data) from the data reception unit 122.

Specifically, the data reception unit 122 includes, in addition to the HDMI receiver 81, EDID ROM (Read Only Memory) which stores E-EDID that is performance information relating to its own performance (Configuration/capability). The data transmission unit 112 reads out the E-EDID from the data reception unit 122 connected via the HDMI cable, for example, in response to the request from the control unit 113.

The data transmission unit 112 transmits the read E-EDID to the control unit 113. The control unit 113 stores this E-EDID in unshown flash ROM or DRAM. The control unit 113 can recognize the settings of the performance of the data reception unit 122 based on the E-EDID. For example, the control unit 113 recognizes whether or not the sink device 120 including the data reception unit 122 can handle stereoscopic image data, and in the event that stereoscopic image data can be handled, further recognizes what kind of TMDS transmission data structure the sink device 120 can handle, and so forth.

The CEC line is made up of one unshown signal line included in the HDMI cable, and is used for performing both-way communication data for control between the data transmission unit 112 and the data reception unit 122. This CEC line makes up control data lines.

Also, a line connected to a pin called as HPD (Hot Plug Detect) (HPD line) is included in the HDMI cable. The source device can detect connection of the sink device by taking advantage of this HPD line. Note that this HPD line is also used as an HEAC-line making up a both-way communication path. Also, a power line (+5VPower Line) used for supplying power supply from the source device to the sink device is included in the HDMI cable. Further, a utility line is included in the HDMI cable. This utility line is also used as an HEAC+ line making up the both-way communication path.

Figure 3:
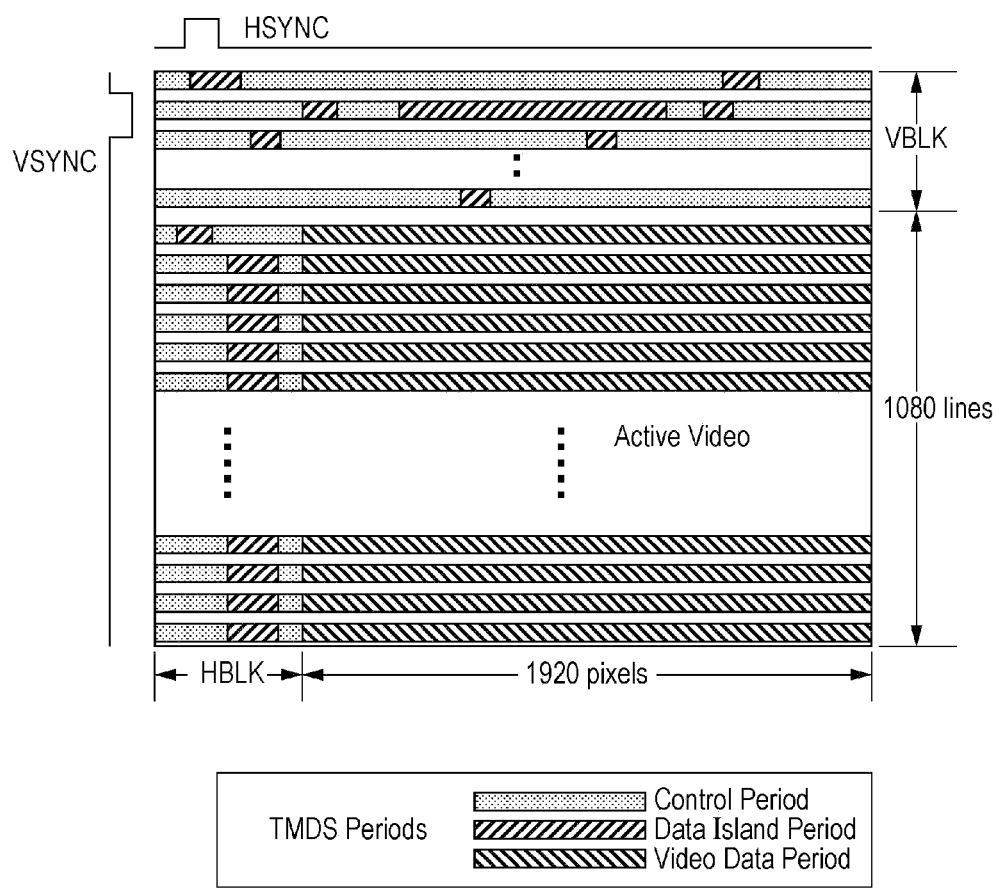
FIG. 3 is a diagram illustrating a structure example of TMDS transmission data to be transmitted by a TMDS channel of HDMI.

FIG. 3 illustrates a structure example of the TMDS transmission data. This FIG. 3 illustrates the periods of various types of transmission data in the event that the image data of 1920 pixels×1080 lines serving as crosswise×lengthwise is transmitted at the TMDS channels #0, #1, and #2.

According to the type of transmission data, there are three types of periods in a video field (Video Field) with the transmission data being transmitted using the three TMDS channels #0, #1, and #2 of HDMI. These three types of periods are a video data period (Video Data Period), a data island period (Data Island period), and a control period (Control period).

Here, a video field period is a period from the leading edge (active edge) of a certain vertical synchronizing signal to the leading edge of the next vertical synchronizing signal. This video field period is divided into a horizontal blanking period (horizontal blanking), a vertical blanking period (vertical blanking), and an active video period (Active Video). This active video period is a period obtained by removing the horizontal blanking period and the vertical blanking period from the video field period.

The video data period is assigned to the active video period. With this video data period, the data of 1920 pixels×1080 lines worth of valid pixels (Active pixels) making up one screen worth of uncompressed image data is transmitted.

The data island period and the control period are assigned to the horizontal blanking period and the vertical blanking period. With the data island period and the control period, auxiliary data (Auxiliary data) is transmitted. That is to say, the data island period is assigned to a portion of the horizontal blanking period and vertical blanking period. With this data island period, of the auxiliary data, audio data packets and so forth, which is data unrelated to control, are transmitted, for example.

The control period is assigned to another portion of the horizontal blanking period and vertical blanking period. With this control period, of the auxiliary data, the vertical synchronizing signal, horizontal synchronizing signal, control packet, and so forth, which is data relating to control, are transmitted, for example.

FIG. 4 shows an example of the pin-out of the HDMI receptacle. The pin-out shown in FIG. 4 is called as Type A (type-A). TMDS Data#i+ and TMDS Data#i− which are differential signals of the TMDS channel #i are transmitted by two lines which are differential lines. These two lines are connected to pins to which Data#i+ is assigned (pins of which the pin numbers are 1, 4, and 7), and pins to which Data#i− is assigned (pins of which the pin numbers are 3, 6, and 9).

Also, the CEC line where the CEC signal that is data for control is transmitted is connected to a pin of which the pin number is 13. Also, a line where an SDA (Serial Data) signal such as the E-EDID or the like is transmitted is connected to a pin of which the pin number is 16. A line where an SCL (Serial Clock) signal that is a clock signal used for synchronization at the time of transmission/reception of the SDA signal is transmitted is connected to a pin of which the pin number is 15. The above-mentioned DDC is made up of a line where the SDA signal is transmitted, and a line where the SCL signal is transmitted.

Also, as described above, the HPD line (HEAC− line) for the source device detecting connection of the sink device is connected to a pin of which the pin number is 19. Also, the utility line (HEAC+ line) is connected to a pin of which the pin number is 14. Also, as described above, a power supply line for supplying power supply is connected to a pin of which the pin number is 18.

Figure 5:
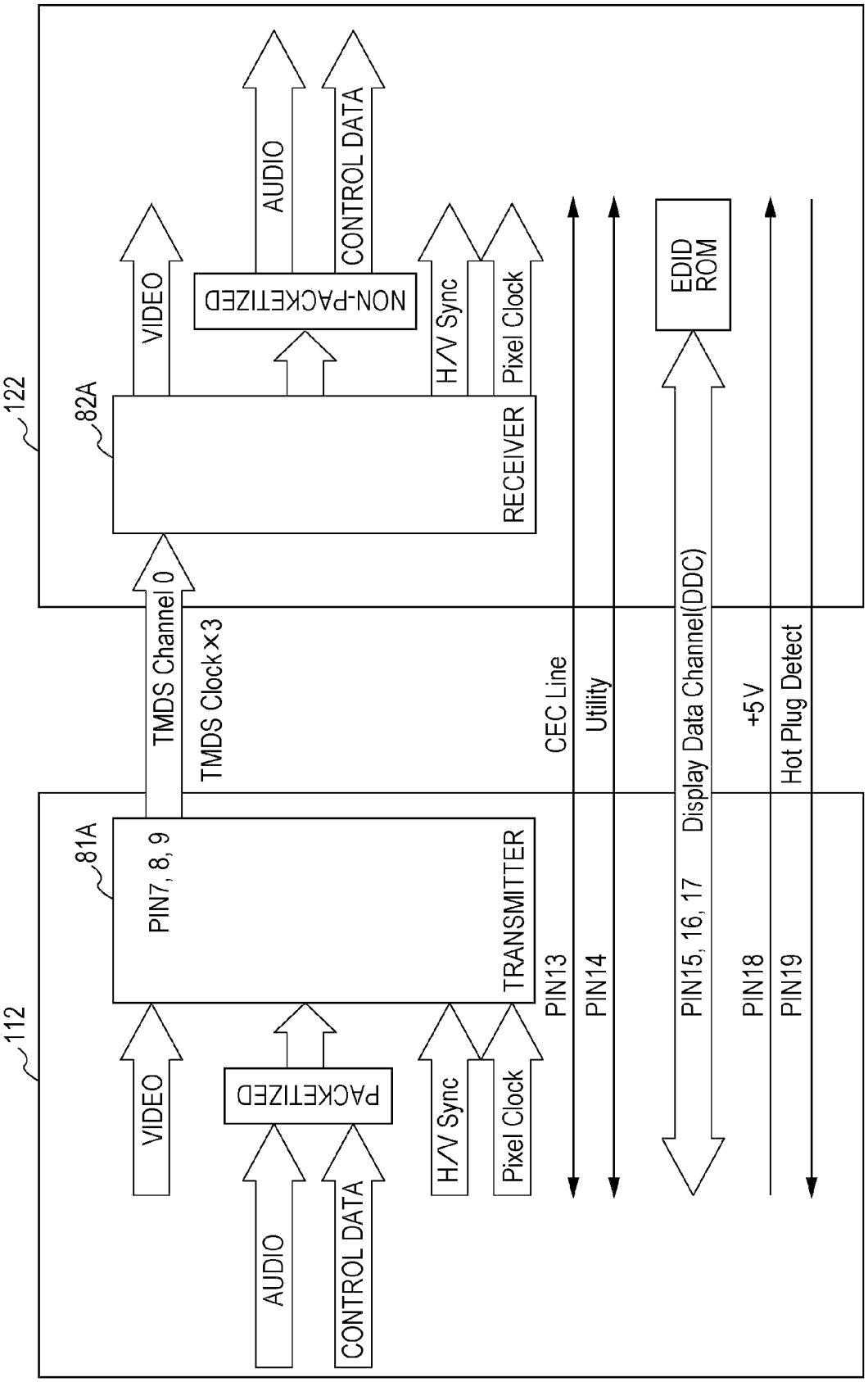
FIG. 5 is a diagram illustrating a configuration example of a data transmission unit of a source device, and a data reception unit of a sink device in the AV system (in the case of the digital interface conforming to a new standard).

FIG. 5 illustrates a configuration example of the data transmission unit 112 of the source device 110, and the data reception unit 122 of the sink device 120. This configuration example illustrates a case where the digital interface between the data transmission unit 112 and the data reception unit 122 is a new standard digital interface. In FIG. 5, portions corresponding to FIG. 2 are denoted with the same reference numerals, and detailed description thereof will be omitted as appropriate.

The data transmission unit 112 transmits, with a valid image period (hereafter, also referred to as "active video period" as appropriate), differential signals corresponding to the pixel data of one screen worth of an uncompressed image to the data reception unit 122 in one direction using the multiple channels. Here, the valid image period is a period obtained by removing a horizontal blanking period and a vertical blanking period from a period between one vertical synchronizing signal and the next vertical synchronizing signal. Also, the data transmission unit 112 transmits, with a horizontal blanking period or vertical blanking period, differential signals corresponding to at least audio data, control data, other auxiliary data, and so forth accompanied with an image to the data reception unit 122 in one direction using the one TMDS channel #0.

In this case, the TMDS clock is set to triple in the case of the HDMI standard (see FIG. 2), thereby enabling transmission using the TMDS channel #0 alone. Also, the TMDS clock itself is inserted into the TMDS channel #0 in a common mode, thereby eliminating the necessity for the TMDS clock channel. Accordingly, with this new standard digital interface, of the pins of the HDMI receptacle (Type A), nine pines used for the TMDS channel #1, TMDS channel #2, and TMDS clock channel (PINS 1 through 6, and 10 through 12) in the case of the HDMI standard digital interface become unused pins.

The data transmission unit 112 includes a transmitter 81A. This transmitter 81A converts, for example, the pixel data of an uncompressed image into the corresponding differential signal, and serially transmits to the data reception unit 122 connected via the HDMI cable or new standard cable in one direction using the one TMS channel #0.

Also, the transmitter 81A converts audio data accompanied with the uncompressed image, and further necessary control data, other auxiliary data, and so forth into the corresponding differential signal, and serially transmits to the data reception unit 122 in one direction using the one TMDS channel #0.

The data reception unit 122 receives, with an active video period, the differential signal corresponding to the pixel data transmitted from the data transmission unit 122 in one direction using the one channel #0. Also, this data reception unit 122 receives, with a horizontal blanking period or vertical blanking period, the differential signal corresponding to the audio data or control data transmitted from the data transmission unit 112 in one direction using the one channels #0.

Specifically, the data reception unit 122 includes a receiver 82A. This receiver 82A receives the differential signal corresponding to the pixel data, and the differential signal corresponding to the audio data or control data transmitted from the data transmission unit 112 in one direction using the TMDS channel #0.

The others of the configuration example of the data transmission unit 112 and data reception unit 122 in the case of the new standard shown in FIG. 5 are the same as those of the configuration example of the data transmission unit 112 and data reception unit 122 in the case of the HDMI standard shown in FIG. 2, and accordingly, detailed description thereof will be omitted.

Figure 6:
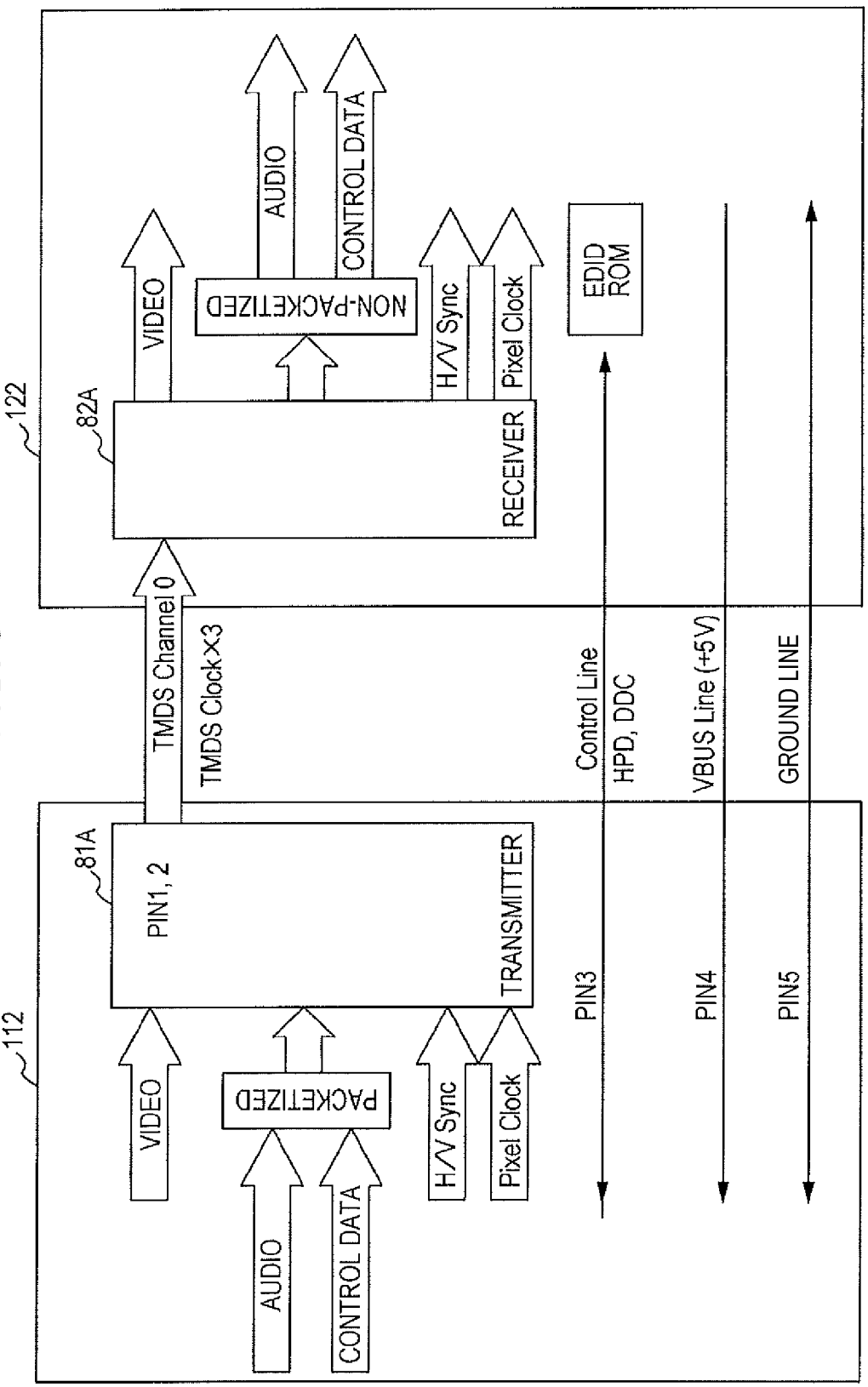
FIG. 6 is a diagram illustrating a configuration example of a data transmission unit of a source device, and a data reception unit of a sink device in the AV system (in the case of the digital interface conforming to another new standard).

FIG. 6 illustrates, with the AV system 100 in FIG. 1, a configuration example of the data transmission unit 112 of the source device 110, and the data reception unit 122 of the sink device 120. This configuration example also illustrates a case where the digital interface between the data transmission unit 112 and the data reception unit 122 is a new standard digital interface. In this FIG. 6, portions corresponding to FIG. 5 are denoted with the same reference numerals, and detailed description thereof will be omitted as appropriate.

In the case of the configuration example shown in FIG. 6, in the same way as with the configuration example in FIG. 5, the data transmission unit 112 transmits, with a horizontal blanking period or vertical blanking period, the differential signals corresponding to at least audio data and control data, other auxiliary data, and so forth accompanied with an image to the data reception unit 122 in one direction using the one TMDS channel #0.

In this case, the TMDS clock is set to triple in the case of the HDMI standard (see FIG. 2), thereby enabling transmission using the TMDS channel #0 alone. Also, the TMDS clock itself is inserted into the TMDS channel #0 in the common mode, thereby eliminating the necessity for the TMDS clock channel. In this case, PINS 1 and 2 of the HDMI receptacle are used.

Also, with the configuration example in FIG. 6, one control line (Control Line) is used as the lines of CEC, DDC, and HPD. Also, the power supply line (+5VPower Line) is omitted. Also, a VBUS line (VBUS Line) is added for charging a portable source device like USB, and further, a ground line (Ground Line) is commonly provided.

The control line is connected to a pin of which the pin number is 3. Also, the VBUS line is connected to a pin of which the pin number is 4. Further, the ground line is connected to a pin of which the pin number is 5. Accordingly, with the new standard digital interface shown in FIG. 6, of the pins of the HDMI receptacle (Type A), fourteen pins of PINS 6 through 19 become unused pins.

With the AV system 100 shown in FIG. 1, in the event that the data reception unit 122 of the sink device 120 can handle the digital interfaces of both of the HDMI standard and new standard, the data reception unit 122 is controlled so as to perform operation in accordance with the digital interface of the data transmission unit 112 of the source device 110. Specifically, when the cable 200 is connected to the connector unit 121 after power-on, the control unit 123 determines whether the digital interface of the data transmission unit 112 of the source device 110 is the HDMI standard or new standard, and controls the data reception unit 122 according to the determination result thereof.

Figure 7:
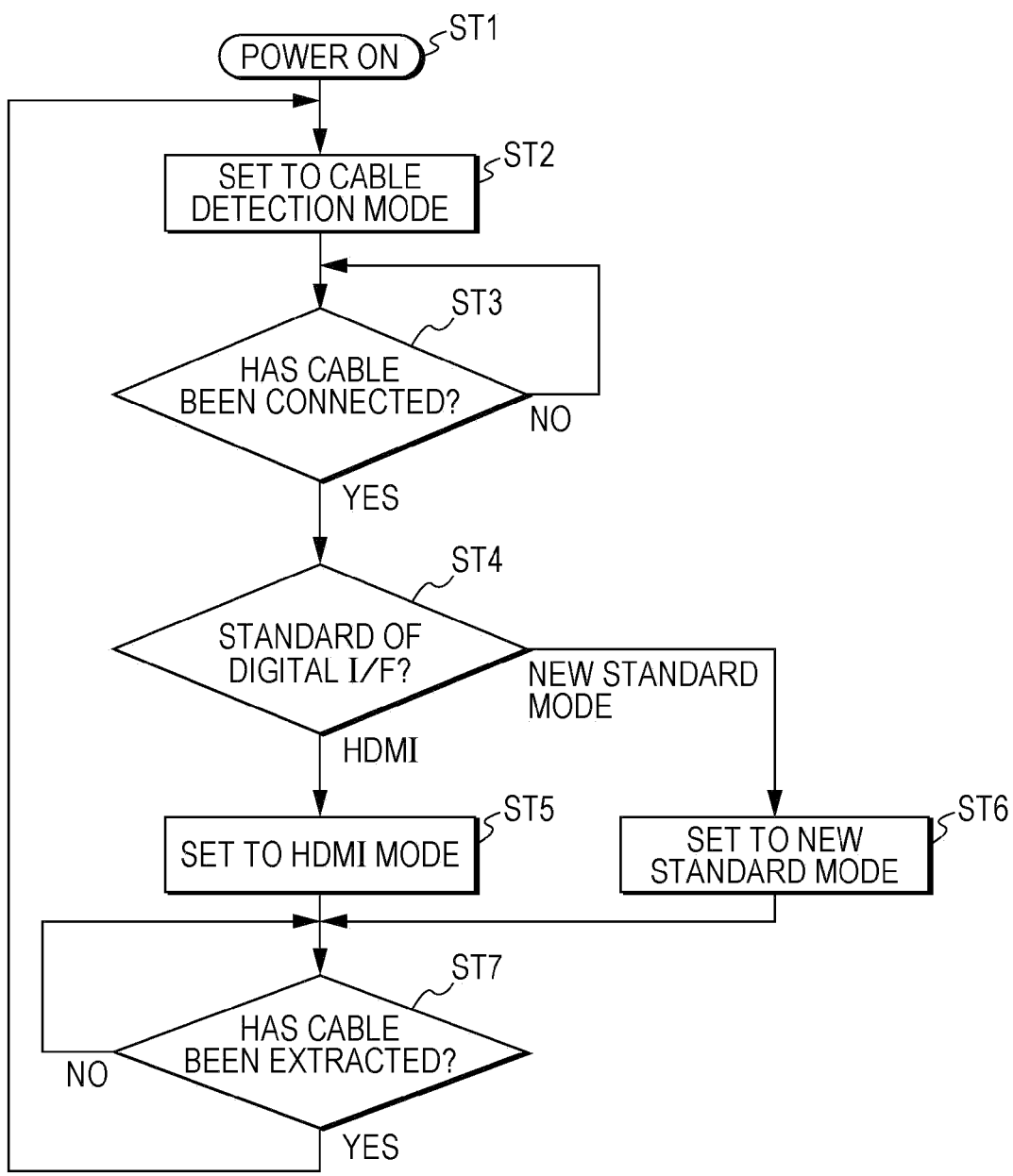
FIG. 7 is a flowchart illustrating the control procedure of a control unit.

The flowchart in FIG. 7 illustrates the control procedure of the control unit 123. First, in step ST1, the control unit 123 starts processing in response to power-on, and then proceeds to processing in a cable detection mode in step ST2. With this case detection mode, the control unit 123 detects connection of the cable 200 as to the connector unit 121 from the voltage of the Pin 18 of the connector unit 121, output of a sensor for detecting cable connection, and so forth.

Next, in step ST3, based on the detection results in step ST2, the control unit 123 determines whether or not the cable 200 is connected to the connector unit 121. When the cable 200 is connected to the connector unit 121, the control unit 123 proceeds to processing in step ST4. In this step ST4, based on the determination result of the determining unit 124, the control unit 123 determines whether the digital interface of the data transmission unit 112 of the source device 110 is the HDMI standard or new standard.

When the digital interface is the HDMI standard, in step ST5 the control unit 123 controls the data reception unit 122 in the operation mode conforming to the HDMI standard digital interface (HDMI mode). Also, when the digital interface is a new standard, in step ST6 the control unit 123 controls the data reception unit 122 in the operation mode conforming to a new standard digital interface (new standard mode). After the processing in step ST5 or step ST6, in step ST7 the control unit 123 determines whether or not extraction of the cable 200 has been performed, and continues the operation mode of the data reception unit 122 without change as long as extraction of the cable 200 has not been performed. On the other hand, in the event that extraction of the cable 200 has been performed, the control unit 123 immediately returns to step ST2.

Also, with the AV system 100 shown in FIG. 1, in the event that the data transmission unit 112 of the source device 110 can handle the digital interfaces of both of the HDMI standard and new standard, the data transmission unit 112 is controlled so as to perform operation in accordance with the digital interface of the data reception unit 122 of the sink device 120. Specifically, when the cable 200 is connected to the connector unit 111 after power on, the control unit 113 determines whether the digital interface of the data reception unit 122 of the sink device 120 is the HDMI standard or new standard, and controls the data transmission unit 112 according to the determination result thereof. The control procedure of this control unit 113 is, though detailed description thereof will be omitted, the same as the above-mentioned control procedure of the control unit 123 of the sink device 120 (see FIG. 7).

[Configuration Example of Determining Unit]

Next, description will be made regarding a configuration example of the determining unit 124 within the control unit 123 of the sink device 120, and the determining unit 114 within the control unit 113 of the source device 110.

First Configuration Example

This configuration example is an example wherein determination is made with the TMDS differential signal line alone. Of the multiple TMDS differential signal pairs, it is detected that only one pair is an active signal pair. For example, as shown in the configuration example in FIG. 5, with the HDMI standard, the three TMDS channels #0 through #2 are used, but with the new standard (see FIG. 5), only one TMDS channel #0 is used. Accordingly, with the new standard, the TMDS channels #1 and #2, and TMDS clock channel are unused.

With the present configuration example, an active range detecting circuit is provided to a pair of pins to which a differential signal is input when the data transmission unit 112 of the source device 110 operates using the HDMI standard digital interface, and is not input when the data transmission unit 112 of the source device 110 operates using the new standard digital interface (see FIG. 5), e.g., PINS 1 and 3. According to the detection result of this active range detecting circuit, determination can be made whether the digital interface of the data transmission unit 112 of the source device 110 is the HDMI standard or new standard.

Figure 8:
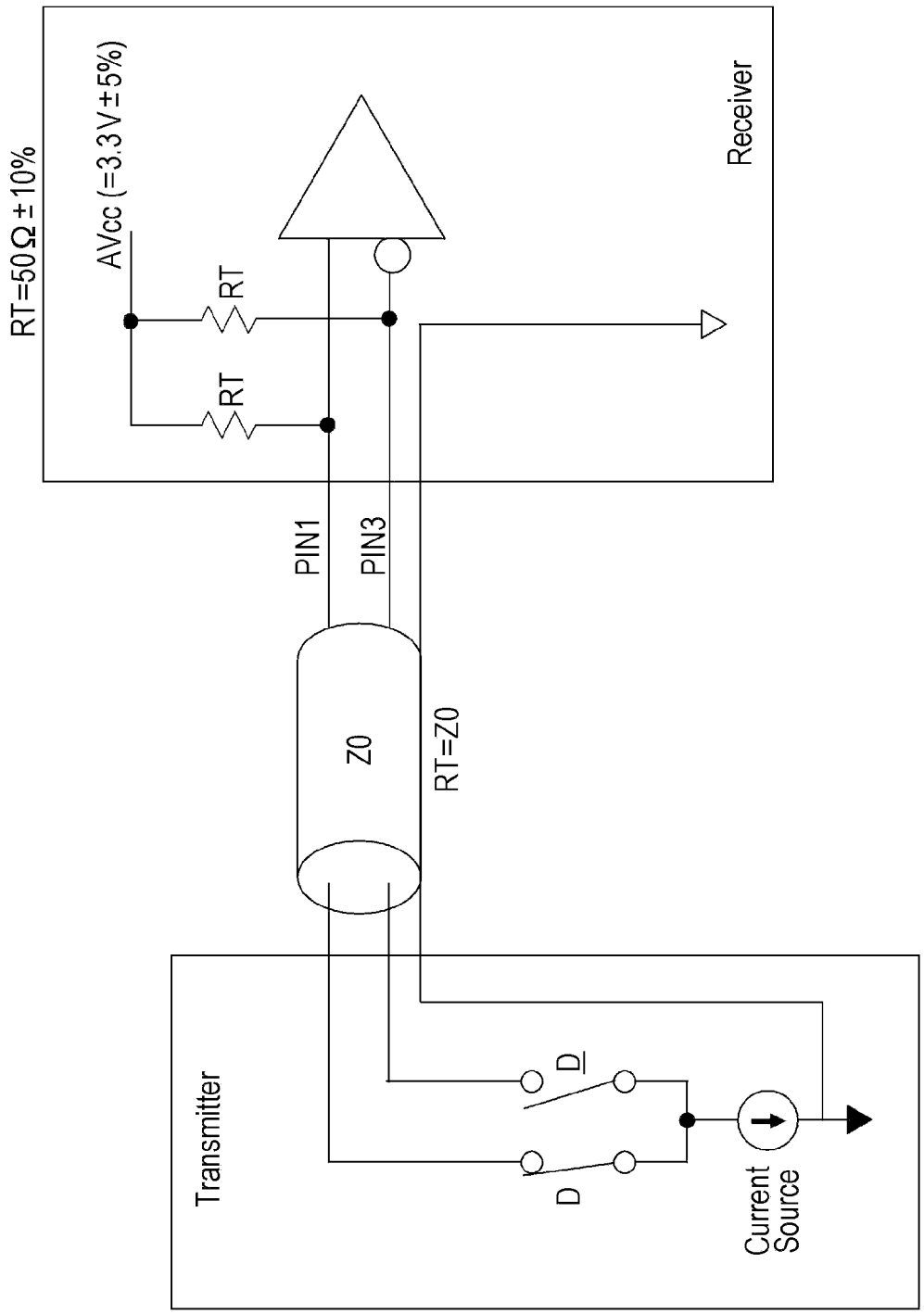
FIG. 8 is a schematic diagram of a TMDS differential signal pair.
Figure 9:
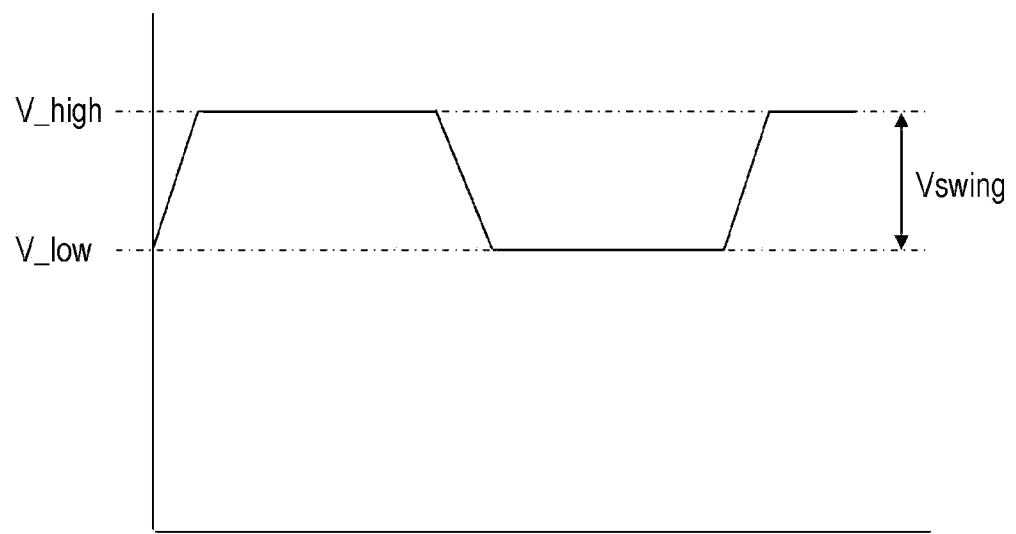
FIG. 9 is a diagram illustrating that a TMDS differential signal operates in a range with upper limit voltage V_high, lower limit voltage V_low, and amplitude Vswing.

FIG. 8 illustrates a schematic diagram of a TMDS differential signal pair. In this FIG. 8, TMDS differential signals operate, as shown in FIG. 9, in a range with upper limit voltage V_high, lower limit voltage V_low, and amplitude Vswing. The active range detecting circuit is a circuit which outputs "H" when both of the differential signal pair are included in the TMDS specified voltage range, and outputs "L" when one or both of the differential signal pair are not included in the TMDS specified voltage range.

Figure 10:
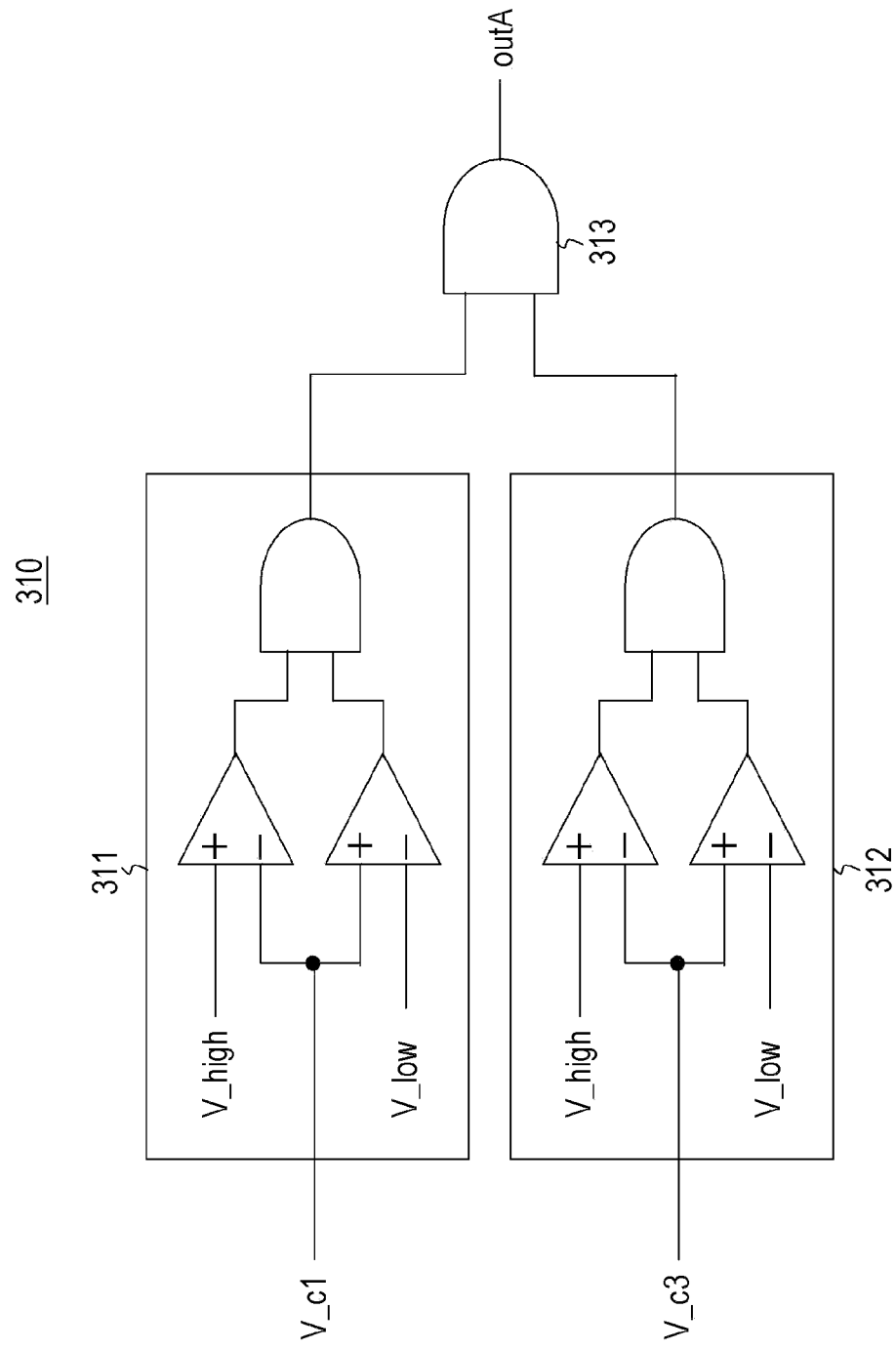
FIG. 10 is a diagram illustrating a specific circuit example of an active range detecting circuit for digital interface determination.

FIG. 10 illustrates a specific circuit example of an active range detecting circuit 310 for digital interface determination. This circuit example is configured of two window comparators 311 and 312, and one AND circuit 313. With the window comparators 311 and 312, the upper voltage in the TMDS is taken as V_high, and the lower voltage is taken as V_low, and upon one of the differential signal pair being connected to V_c, if V_c is in a specified range of V_high>V_c>V_low, AND circuit output becomes "H". The voltage V_c1 of PIN 1 is input to the window comparator 311, and the voltage V_c3 of PIN 3 is input to the window comparator 312. The outputs of the window comparators 311 and 312 are input to the AND circuit 313, and the output of this AND circuit 313 becomes the output outA of the active range detecting circuit 310.

Also, with this configuration example, an active range detecting circuit is provided to a pair of pins to which a differential signal is input in either case of a case where the data transmission unit 112 of the source device 110 operates using the HDMI standard digital interface, and a case where the data transmission unit 112 of the source device 110 operates using the new standard digital interface (see FIG. 5), e.g., PINS 7 and 9. According to the detection result of this active range detecting circuit, determination can be made whether or not the source device 110 is connected via the cable 200.

Figure 11:
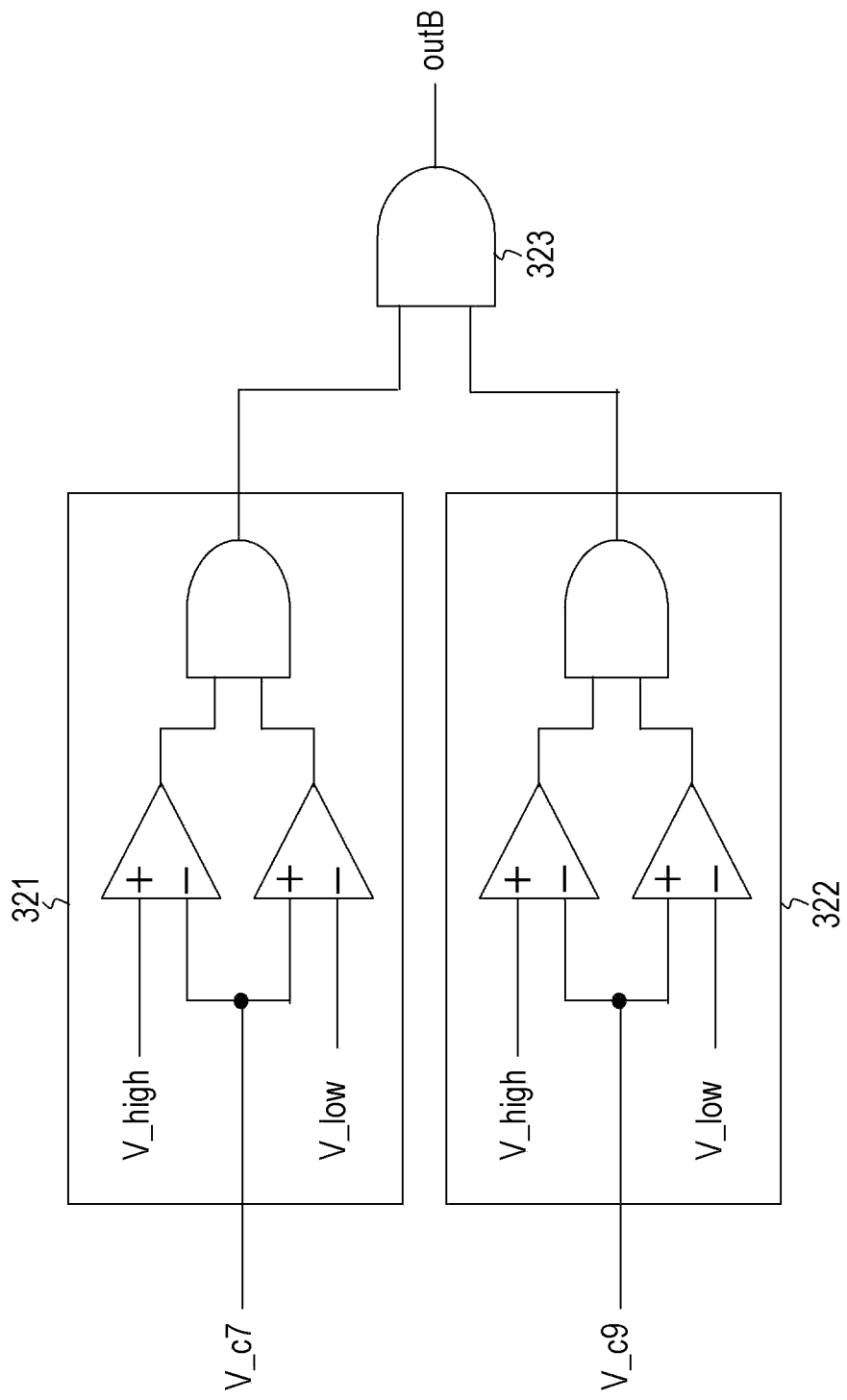
FIG. 11 is a diagram illustrating a specific circuit example of an active range detecting circuit for source device connection determination.

FIG. 11 illustrates a specific circuit example of an active range detecting circuit 320 for source device connection determination. This circuit example is configured of two window comparators 321 and 322, and one AND circuit 323. With the window comparators 321 and 322, the upper voltage in the TMDS is taken as V_high, and the lower voltage is taken as V_low, and upon one of the differential signal pair being connected to V_c, if V_c is in a specified range of V_high>V_c>V_low, AND circuit output becomes "H". The voltage V_c7 of PIN 7 is input to the window comparator 321, and the voltage V_c9 of PIN 9 is input to the window comparator 322. The outputs of the window comparators 321 and 322 are input to the AND circuit 323, and the output of this AND circuit 323 becomes the output outB of the active range detecting circuit 320.

The outputs outA and outB of the active range detecting circuits 310 and 320 shown in FIG. 10 and FIG. 11 are as follows. Specifically, in the event that the source device 110 is connected, and the digital interface of the data transmission unit 112 of this source device 110 is the HDMI standard, outA="H" and outB="H" hold. Also, in the event that the source device 110 is connected, and the digital interface of the data transmission unit 112 of this source device 110 is the new standard, outA="L" and outB="H" hold. Further, in the event that the source device 110 is not connected, outA="L" and outB="L" hold.

The active range detecting circuits 310 and 320 shown in FIG. 10 and FIG. 11 are provided, whereby determination can be made regarding whether or not the source device 110 is connected, and regarding whether the digital interface of the data transmission unit 112 thereof is the HDMI standard or new standard.

Note that description has been made so far regarding the active range detecting circuits 310 and 320 provided to the determining unit 124 within the control unit 123 of the sink device 120. However, a similar active range detecting circuit is provided to the determining unit 114 within the control unit 113 of the source device 110, whereby determination can be made regarding whether or not the sink device 120 is connected, and regarding whether the digital interface of the data transmission unit 122 thereof is the HDMI standard or new standard.

In this case, an active range detecting circuit is provided to a pair of pins to which a differential signal is output when the data transmission unit 112 of the source device 110 operates using the HDMI standard digital interface, and is not output when the data transmission unit 112 of the source device 110 operates using the new standard digital interface (see FIG. 5), e.g., PINS 1 and 3. According to the detection result of this active range detecting circuit, determination can be made whether the digital interface of the data reception unit 122 of the sink device 120 is the HDMI standard or new standard.

Also, in this case, an active range detecting circuit is provided to a pair of pins to which a differential signal is output in either case of a case where the data transmission unit 112 of the source device 110 operates using the HDMI standard digital interface, and a case where the data transmission unit 112 of the source device 110 operates using the new standard digital interface (see FIG. 5), e.g., PINS 7 and 9. According to the detection result of this active range detecting circuit, determination can be made whether the sink device 120 is connected via the cable 200.

Second Configuration Example

This configuration example is an example wherein determination is made with other than TMDS differential signals. With the new standard (see FIG. 6), the power supply line (+5VPower Line) connected to PIN 18, and the HPD line connected to PIN 19 are not used. Therefore, with this example, these power supply line and HPD line are used.

Figure 12:
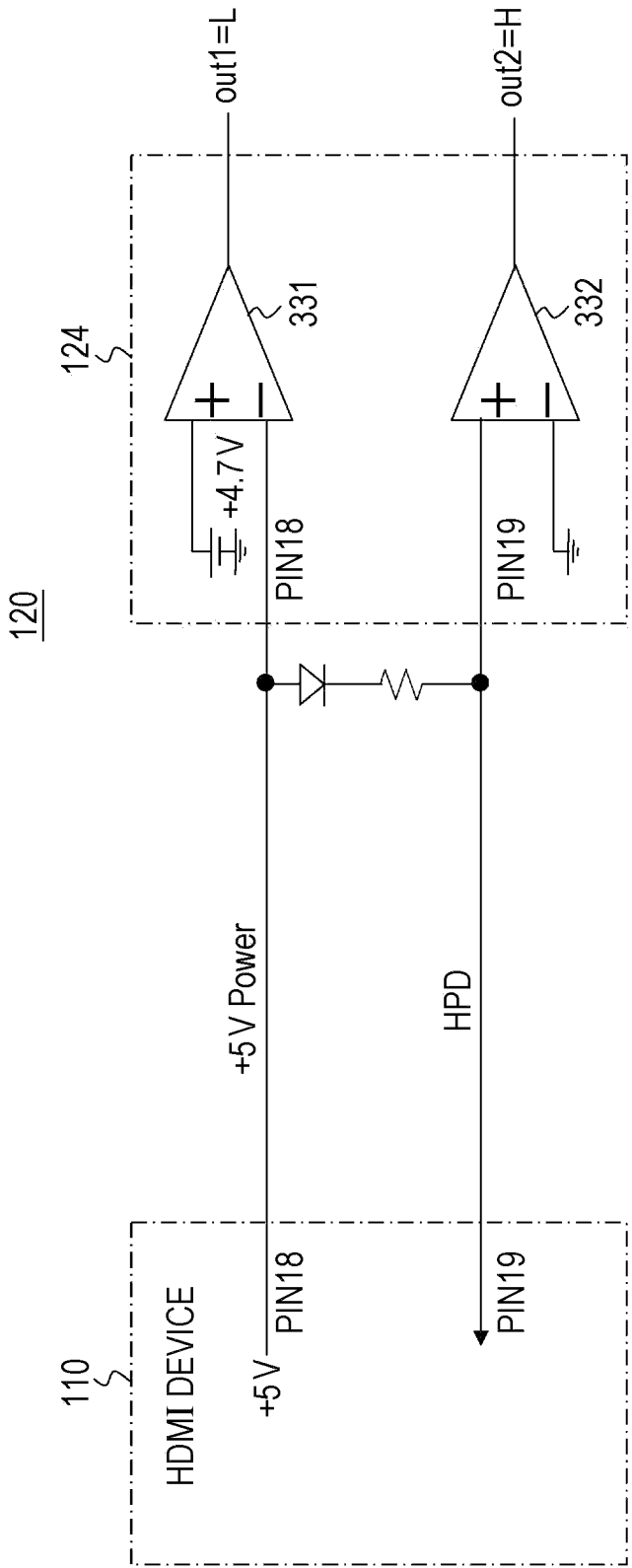
FIG. 12 is a diagram illustrating that in the event that the source device is an HDMI device, +5V power supply is supplied from the source device to the sink device using a power supply line.

In the event that the data transmission unit 112 of the source device 110 operates using the HDMI standard digital interface, as shown in FIG. 12, +5V power supply is supplied from the source device 110 to the sink device 120 using the power supply line. With the sink device 120, the PIN 18 of the connector unit 121 connected to this power supply line, and the PIN 19 of the connector unit 121 connected to the HPD line are connected via a diode and a resistor. Accordingly, in the event that the sink device 120 is connected to the source device 110, the voltage of the HPD line increases, and accordingly, the source device 110 can confirm that the sink device 120 is connected.

Figure 13:
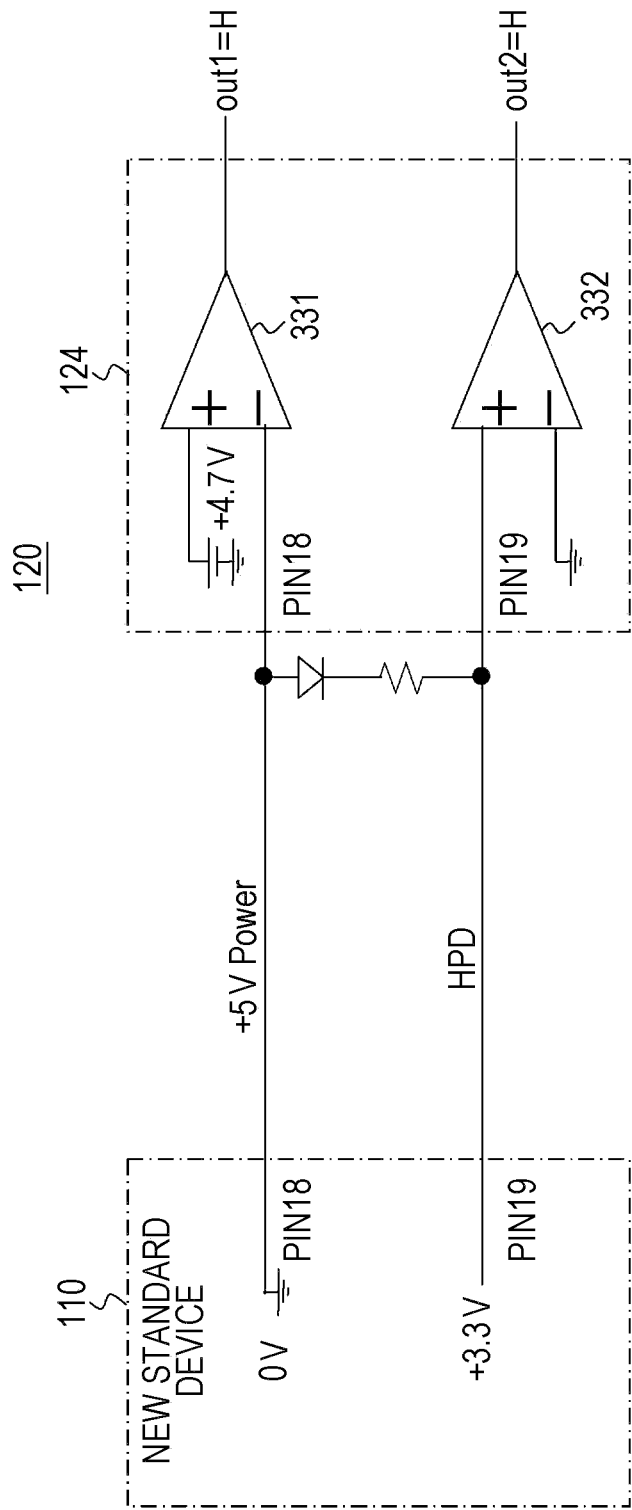
FIG. 13 is a diagram illustrating that in the event that the source device is a new standard device, Pin 19 is set to voltage lower than voltage to be applied in the HDMI standard (minimum +4.7 V), e.g., 0V.

With this configuration example, in the event that the data transmission unit 112 of the source device 110 operates using the new standard digital interface (see FIG. 6), as shown in FIG. 13, PIN 18 is set to voltage lower than voltage applied in the HDMI standard (minimum +4.7V), e.g., 0V. Also, PIN 19 is set to voltage higher than voltage applied to PIN 18, e.g., +3.3 V.

With this configuration example, two voltage comparators 331 and 332 are provided to the determining unit 124 within the control unit 123 of the sink device 120. +4.7 V is input to the positive input terminal of the voltage comparator 331, and the voltage of the PIN 18 of the connector unit 121 is input to the negative input terminal thereof. Also, the voltage of the PIN 19 of the connector unit 121 is input to the positive input terminal of the voltage comparator 332, and 0V is input to the negative input terminal thereof.

The outputs out1 and out2 of the voltage comparators 331 and 332 shown in FIG. 12 and FIG. 13 are as follows. Specifically, in the event that the source device 110 is connected, and the digital interface of the data transmission unit 112 of this source device 110 is the HDMI standard, out1="L" and out2="H" hold. Also, in the event that the source device 110 is connected, and the digital interface of the data transmission unit 112 of this source device 110 is the new standard, out1="H" and out2="H" hold.

In this way, with this configuration example, depending on the outputs out1 and out2 of the voltage comparators 331 and 332, determination can be made whether the digital interface of the data transmission unit 112 is the HDMI standard or new standard. In the event of no cable being connected, the HPD line cannot be set to +3.3 V, and accordingly, cable connection determination is unnecessary. Note that a diode and a resistor are necessary in the case of an HDMI standard device, but in the case of new standard connection, the diode is in a non-conduction state due to inverse bias, which does not disturb any kind of operation.

Third Configuration Example

This configuration example is also an example wherein determination is made with other than TMDS differential signals. With the new standard (see FIG. 6), a DDC-GND line to be connected to PIN 17 is not used. Therefore, with this example, this DDC-GND line is used.

Figure 14:
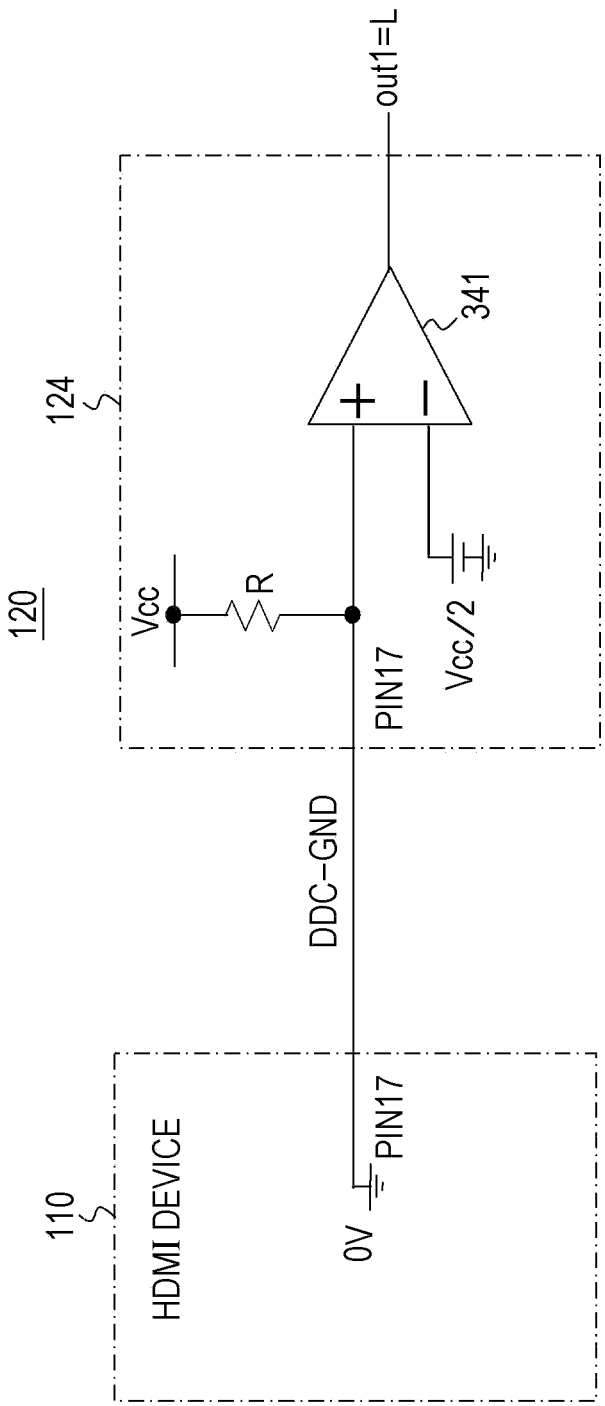
FIG. 14 is a diagram illustrating that in the event that the source device is an HDMI device, Pin 17 to which a DDC-GND line is connected is grounded at the source device.

In the event that the data transmission unit 112 of the source device 110 operates using the HDMI standard digital interface, as shown in FIG. 14, with the source device 110, PIN 17 to which the DDC-GND line is connected is grounded. With this configuration example, in the event that the data transmission unit 112 of the source device 110 operates using the new standard digital interface (see FIG. 6), as shown in FIG. 15, Vcc (e.g., +5 V) is applied to PIN 17, or this PIN 17 is set to an disconnected state, i.e., an electrically floating state.

With this configuration example, with the sink device 120, the PIN 17 of the connector unit 121 is pulled up to Vcc via a resistor R. Also, one voltage comparator 341 is provided to the determining unit 124 within the control unit 123 of the sink device 120. The voltage of the PIN 17 of the connector unit 121 is input to the positive input terminal of the voltage comparator 341. Also, Vcc/2 is input to the negative input terminal of the voltage comparator 341.

Figure 15:
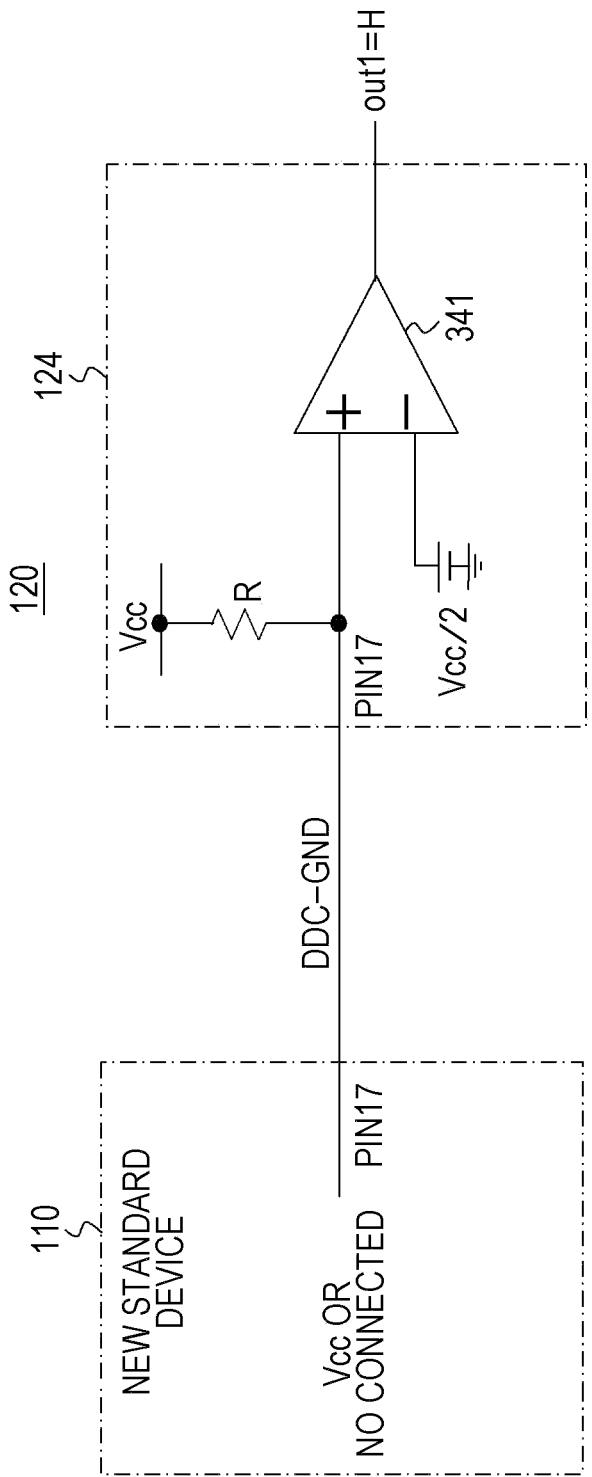
FIG. 15 is a diagram illustrating that in the event that the source device is a new standard device, Vcc (e.g., +5 V) is applied to Pin 17 to which a DDC-GND line is connected, or this Pin 17 is set to disconnected, i.e., an electrically floating state at the source device.

The output out1 of the voltage comparator 341 shown in FIG. 14 and FIG. 15 are as follows. Specifically, in the event that the source device 110 is connected, and the digital interface of the data transmission unit 112 of this source device 110 is the HDMI standard, out1="L" holds. Also, in the event that the source device 110 is connected, and the digital interface of the data transmission unit 112 of this source device 110 is the new standard, out1="H" holds.

In this way, with this configuration example, depending on the output out1 of the voltage comparator 341, determination can be made whether the digital interface of the data transmission unit 112 is the HDMI standard or new standard. With this configuration example, a case where the digital interface of the data transmission unit 112 of the source device 110 conforms to the new standard, and a case of no cable being connected are not distinguished, and accordingly, cable connection determination is separately needed.

Fourth Configuration Example

This configuration example is also an example wherein determination is made with other than TMDS differential signals. With the new standard (see FIG. 6), the DDC-GND line to be connected to PIN 17 is not used. Therefore, with this example, this DDC-GND line is used.

Figure 16:
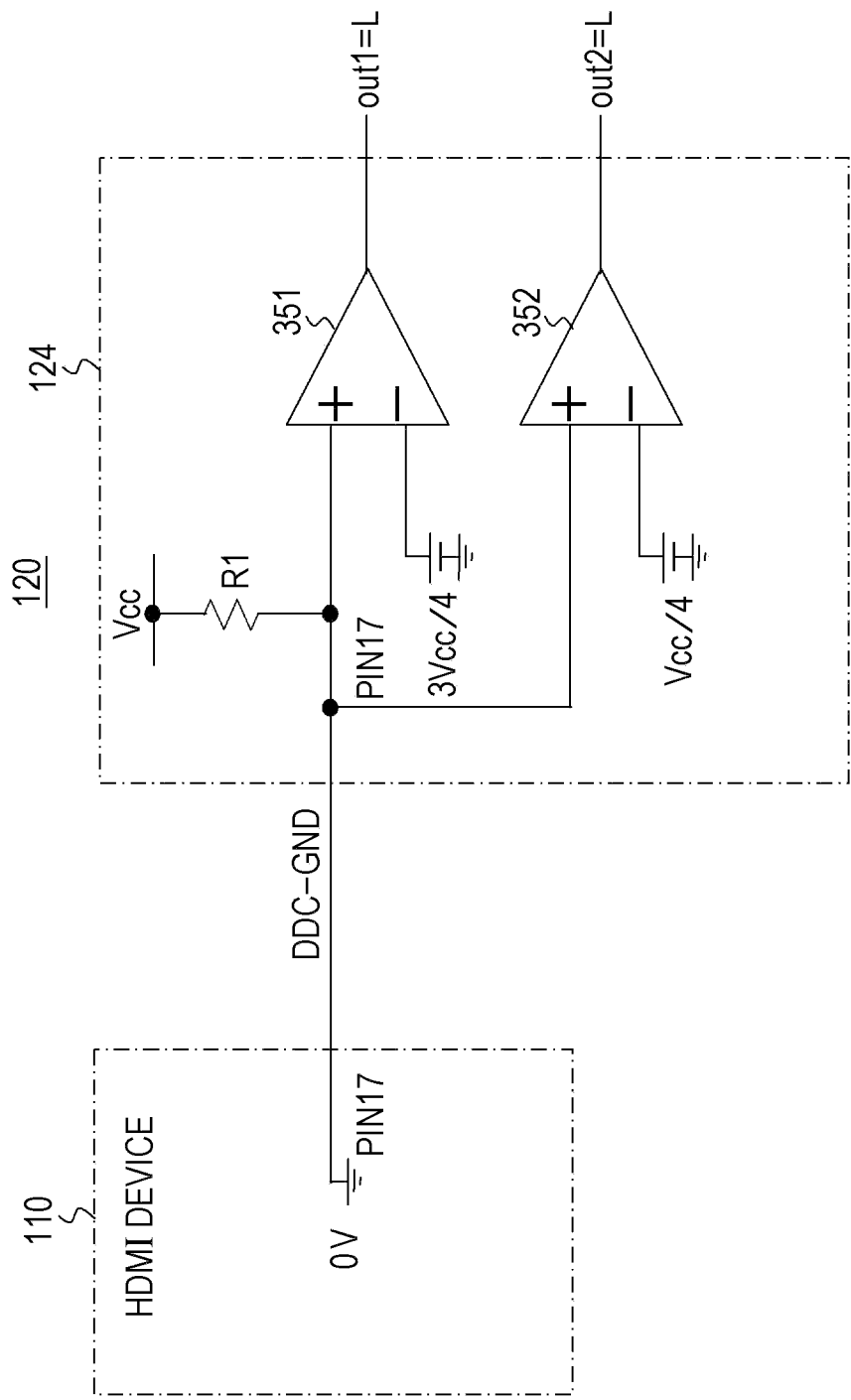
FIG. 16 is a diagram illustrating that in the event that the source device is an HDMI device, Pin 17 to which a DDC-GND line is connected is grounded at the source device.

In the event that the data transmission unit 112 of the source device 110 operates using the HDMI standard digital interface, as shown in FIG. 16, with the source device 110, PIN 17 to which the DDC-GND line is connected is grounded. With this configuration example, in the event that the data transmission unit 112 of the source device 110 operates using the new standard digital interface (see FIG. 6), as shown in FIG. 17, PIN 17 is grounded via a resistor R2.

With this configuration example, with the sink device 120, the PIN 17 of the connector unit 121 is pulled up to Vcc (e.g., +5 V) via a resistor R1 (=R1). Also, two voltage comparators 351 and 352 are provided to the determining unit 124 within the control unit 123 of the sink device 120. The voltage of the PIN 17 of the connector unit 121 is input to the positive input terminals of the voltage comparators 351 and 352.

Also, 3 Vcc/4 is input to the negative input terminal of the voltage comparator 351. In this case, with the voltage comparator 351, the voltage of PIN 17 is compared with the upper side voltage of voltage obtained by dividing Vcc by the resistor R1 and a resistor R2. Also, Vcc/4 is input to the negative input terminal of the voltage comparator 352. In this case, with the voltage comparator 352, the voltage of PIN 17 is compared with the lower side voltage of voltage obtained by dividing Vcc by the resistor R1 and the resistor R2.

Figure 17:
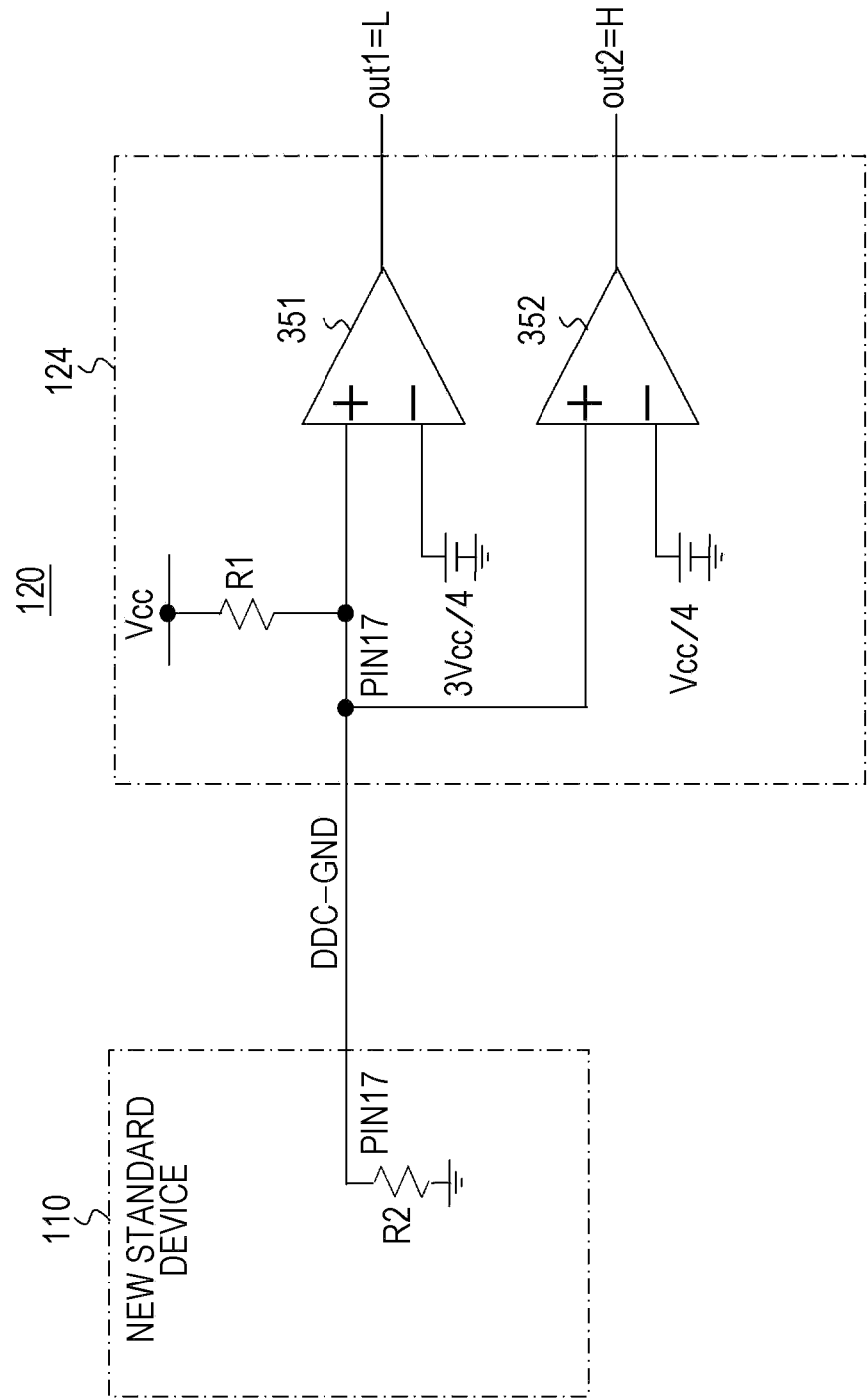
FIG. 17 is a diagram illustrating that in the event that the source device is a new standard device, Pin 17 to which a DDC-GND line is connected is grounded via a resistor R2 at the source device.

The outputs out1 and out2 of the voltage comparators 351 and 352 shown in FIG. 16 and FIG. 17 are as follows. Specifically, in the event that the source device 110 is connected, and the digital interface of the data transmission unit 112 of this source device 110 is the HDMI standard, out1="L" and out2="L" hold. Also, in the event that the source device 110 is connected, and the digital interface of the data transmission unit 112 of this source device 110 is the new standard, out1="L" and out2="H" hold. Further, in the event that the source device 110 is not connected, out1="H" and out2="H" hold.

In this way, with this configuration example, depending on the outputs out1 and out2 of the voltage comparators 351 and 352, determination can be made regarding whether the source device 110 is connected, and regarding whether the digital interface of the data transmission unit 112 is the HDMI standard or new standard.

Fifth Configuration Example

This configuration example is also an example wherein determination is made with other than TMDS differential signals. With the new standard (see FIG. 6), the DDC-GND line to be connected to PIN 17 is not used. Therefore, with this example, this DDC-GND line is used.

Figure 18:
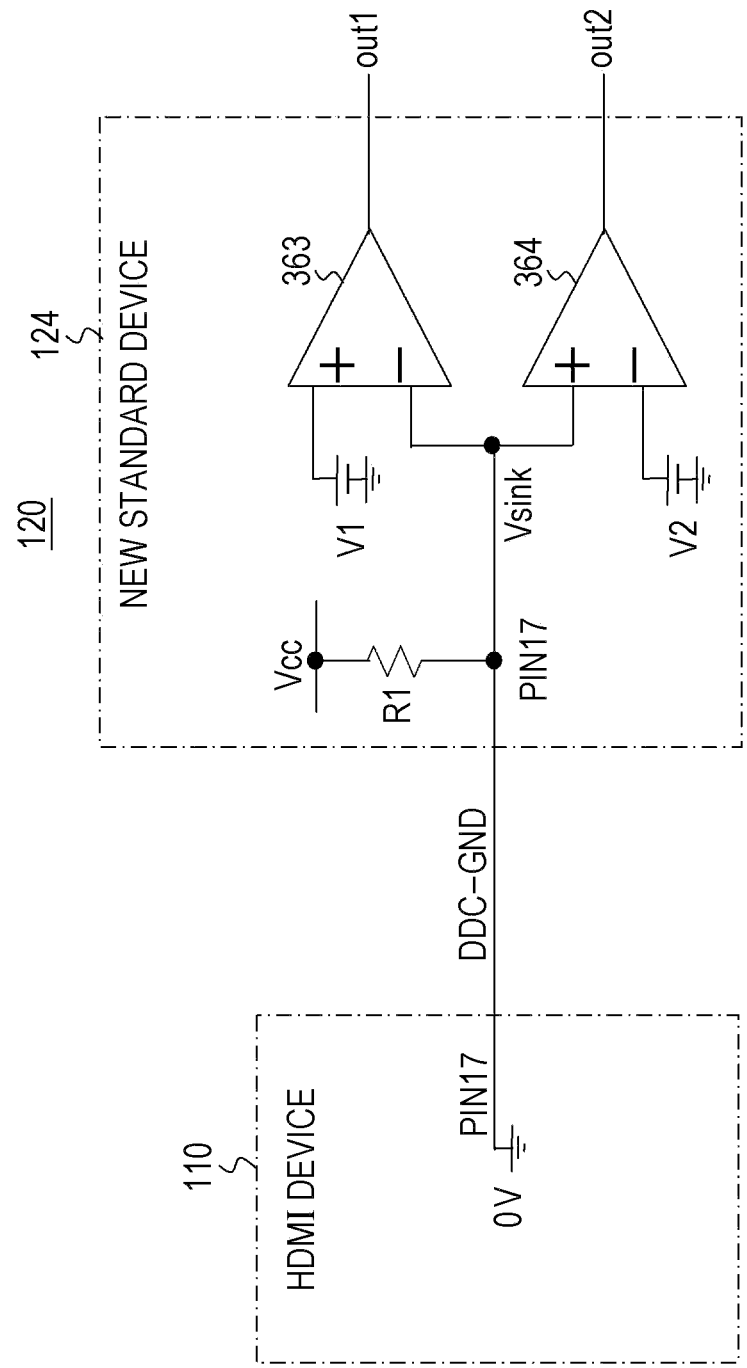
FIG. 18 is a diagram illustrating that in the event that the source device is an HDMI device, Pin 17 to which a DDC-GND line is connected is grounded at the source device, and so forth.
Figure 19:
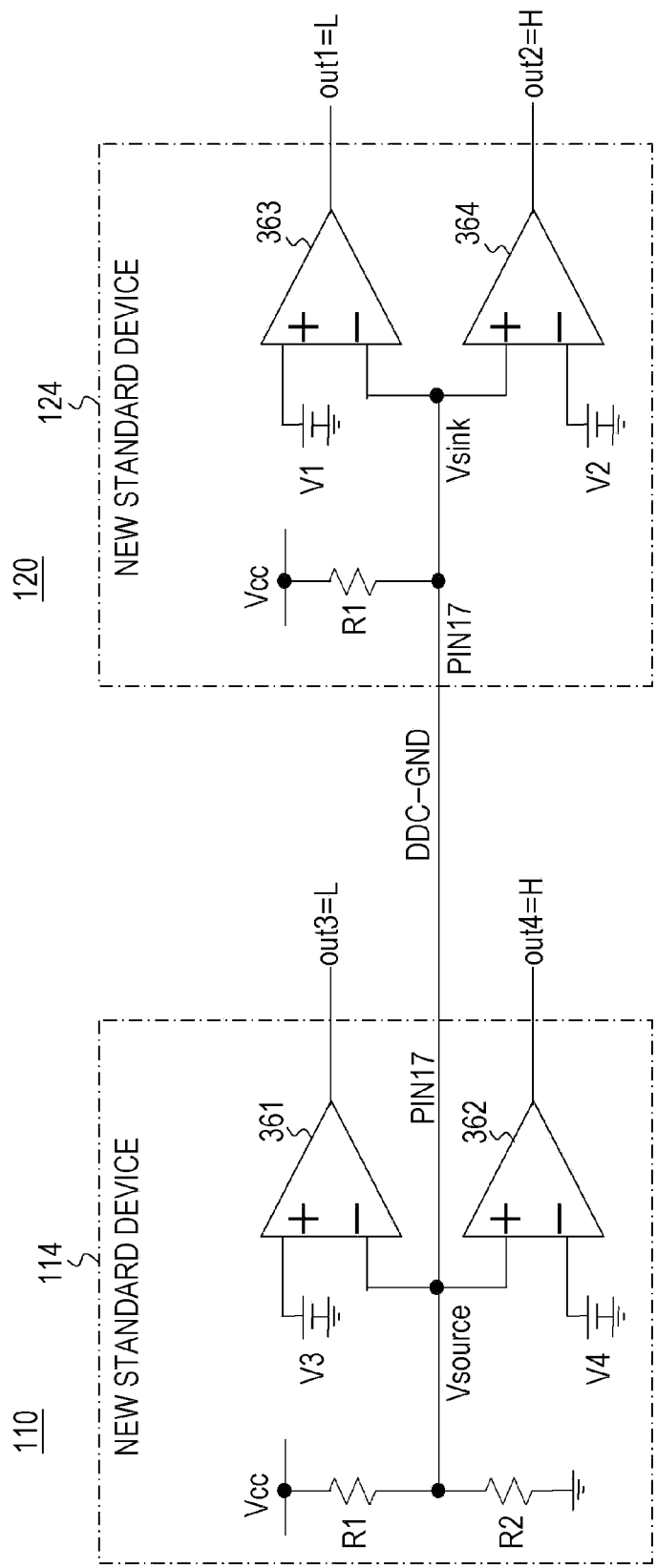
FIG. 19 is a diagram illustrating that in the event that the source device is a new standard device, voltage obtained by dividing Vcc (e.g., +5 V) by resistors R1 and R2 is applied to Pin 17 at the source device, and so forth.

In the event that the source device 110 is an HDMI device, as shown in FIG. 18, with the source device 110, PIN 17 to which the DDC-GND line is connected is grounded. Also, in the event of the new standard device (see FIG. 6) of the source device 110, as shown in FIG. 19, voltage obtained by dividing Vcc (e.g., +5 V) by a resistor R1 and a resistor R2 is applied to PIN 17. Also, two voltage comparators 361 and 362 are provided to the determining unit 114 within the control unit 113. The voltage of the PIN 17 of the connector unit 111 is input to the negative input terminal of the voltage comparator 361, and the positive input terminal of the voltage comparator 362. Also, voltage V3 is input to the positive input terminal of the voltage comparator 361. Also, voltage V4 is input to the negative input terminal of the voltage comparator 362.

Figure 20:
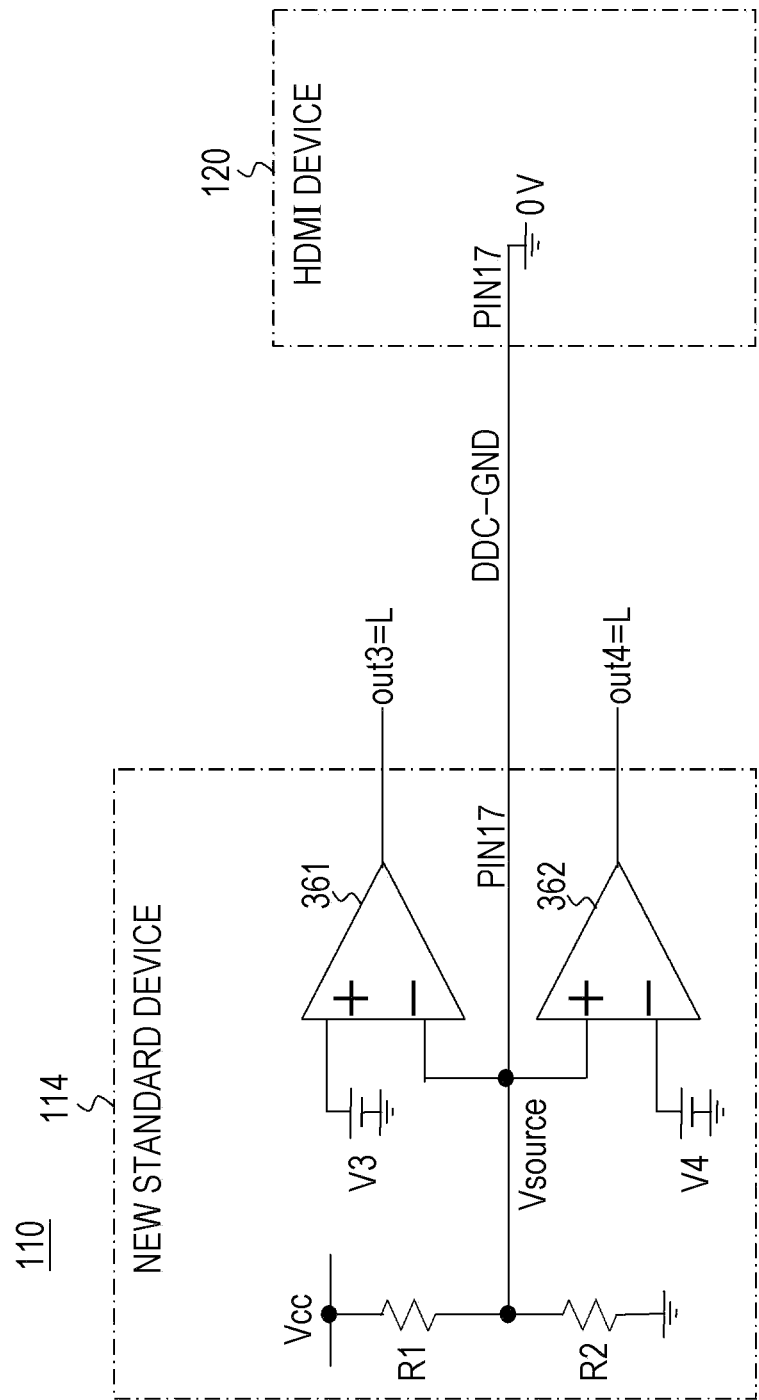
FIG. 20 is a diagram illustrating that in the event that the sink device is an HDMI device, Pin 17 to which a DDC-GND line is connected is grounded at the source device, and so forth.

Also, in the event that the sink device 120 is an HDMI device, as shown in FIG. 20, with the sink device 120, PIN 17 to which the DDC-GND line is connected is grounded. Also, in the event that the sink device 120 is the new standard device (see FIG. 6), as shown in FIG. 19, PIN 17 is pulled up to voltage Vcc via the resistor R1. Also, two voltage comparators 363 and 364 are provided to the determining unit 124 within the control unit 123. The voltage of the PIN 17 of the connector unit 111 is input to the negative input terminal of the voltage comparator 363, and the positive input terminal of the voltage comparator 364. Also, voltage V1 is input to the positive input terminal of the voltage comparator 363. Also, voltage V2 is input to the negative input terminal of the voltage comparator 364.

Here, the voltage Vsink of the PIN 17 of the connector unit 121 on the sink device 120 side, which is taken as R1=2*R2, will be calculated as follows. Specifically, in the case of FIG. 18, Vsink=0 holds, and in the case of FIG. 19, Vsink=Vcc/2 holds, and in the case of no cable being connected, Vsink=Vcc holds. Also, the voltage Vsource of the PIN 17 of the connector unit 111 on the source device 110 side will be calculated as follows. Specifically, in the case of FIG. 19, Vsource=Vcc/2 holds, and in the case of FIG. 20, Vsource=0 holds, and in the case of no cable being connected, Vsource=Vcc/3 holds.

Accordingly, comparative voltages V1, V2, V3, and V4 are set as the following expressions, whereby the connection states can be detected using combinations of the outputs out1 and out2, and the outputs out3 and out4 of the voltage comparators. Note that in the case of no cable being connected, all of the outputs out1 through out4 are "H".

$V1 = 3/4 * Vcc$ $V2 = 1/4 * Vcc$ $V3 = 5/12 * Vcc$ $V4 = 1/4 * Vcc$

Note that, in the case of FIG. 19, with the voltage comparator 363 of the sink device 120, the voltage of PIN 17 is compared with the upper side voltage of voltage obtained by dividing Vcc by parallel resistors of resistors R1 and R1 and a resistor R2. Also, with the voltage comparator 364 of the sink device 120, the voltage of PIN 17 is compared with the lower side voltage of voltage obtained by dividing Vcc by parallel resistors of resistors R1 and R1 and a resistor R2.

Sixth Configuration Example

This configuration example is an example using the TMDS differential signal line alone. With this configuration example, attention is focused on a pair of pins to which a differential signal is input when the data transmission unit 112 of the source device 110 operates using the HDMI standard digital interface, and to which not differential signal is input when the data transmission unit 112 of the source device 110 operates using the new standard digital interface (see FIG. 5), e.g., PINS 1 and 3.

Here, impedance between the PIN 1 and PIN 3 on the sink device side is as follows.
(1) Case of No HDMI Cable Being Inserted: high impedance
(2) Case of HDMI Cable Alone Being Inserted: high impedance
(3) Case of HDMI Cable+HDMI Source Device Being Connected: high impedance As described above, with the two cases (1) and (2) where no source device is connected, PIN 1 and PIN 3 are not connected, and accordingly have high impedance. Also, even when an HDMI source device is connected, PIN 1 and PIN 3 have high impedance for protecting the device.

On the other hand, with the new standard (see FIG. 5), PINS 1 and 3 are disconnected, and accordingly, as shown in (a) in FIG. 21, PIN 1 and PIN 3 are short-circuited within a Type-A plug using a lead wire, or as shown in (b) in FIG. 21, PIN 1 and PIN 3 are connected with a resistor R (50Ω). Thus, in the event that a new standard cable is inserted into the Type-A HDMI receptacle on the sink side, between PIN 1 and PIN 3 is electrically connected as viewed from the sink device side regardless of whether or not there is a source device. Also, PIN 1 and PIN 3 have been referenced here as an example, but of unused pins in the new standard, any combination of pins having high impedance on the HDMI source device side can be applied.

As described above, it can be determined from the impedance properties of PIN 1 and PIN 3 whether a new standard cable is inserted.

FIG. 22 illustrates a cable detecting circuit 370 provided to the determining unit 124 within the control unit 123 of the sink device 120. This cable detecting circuit 370 is configured of a voltage comparator 371. Pin 1 is pulled up to voltage Vcc via a resistor RT. The voltage of PIN 1 is input to the positive input terminal of the voltage comparator 370. Also, voltage obtained by dividing voltage by the resistors RT and R1 (=2RT) is input to the negative input terminal of the voltage comparator 371 as reference voltage Vref (=2.2 V). Note that PIN 3 is grounded.

Figure 23:
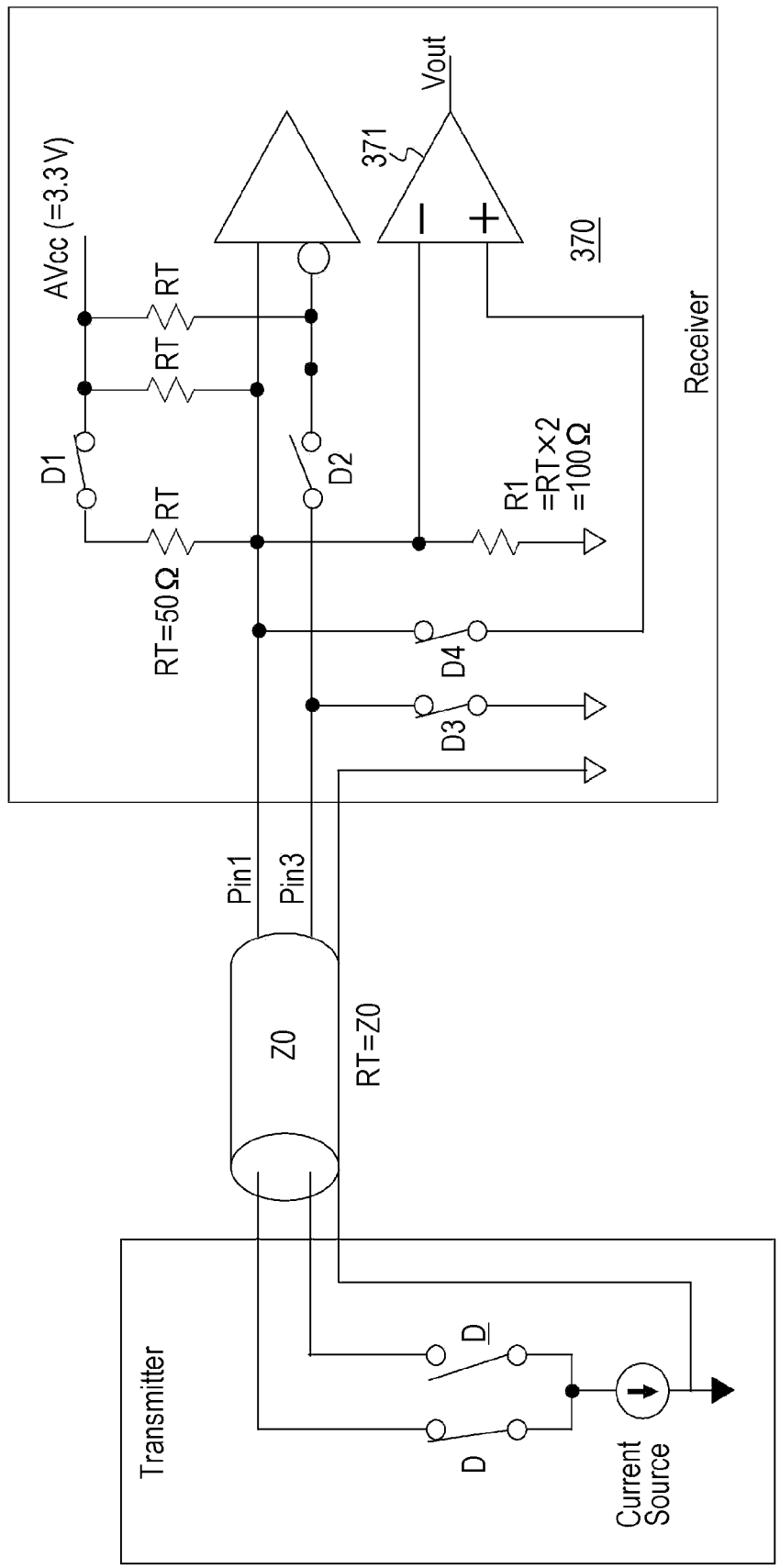
FIG. 23 is a diagram illustrating a circuit example in the event that the cable detecting circuit is inserted into a TMDS differential pair schematic diagram.

FIG. 23 is a circuit example in the event of inserting the cable detecting circuit 370 in FIG. 22 into the TMDS differential pair schematic diagram shown in FIG. 8. In this FIG. 23, in the event of performing cable detection, switches are set such as switch D1: ON, switch D2: OFF, switch D3: ON, and switch D4: ON. Conversely, if the switches are set such as switch D1: OFF, switch D2: ON, switch D3: OFF, and switch D4: OFF, the circuit returns to a circuit equivalent to FIG. 8. In FIG. 22, Vout=L holds only a case where a new standard cable is inserted, and Vout=H holds in a case other than that. The reason thereof will be shown below by five cases.

(1) When no cable is inserted

Figure 24:
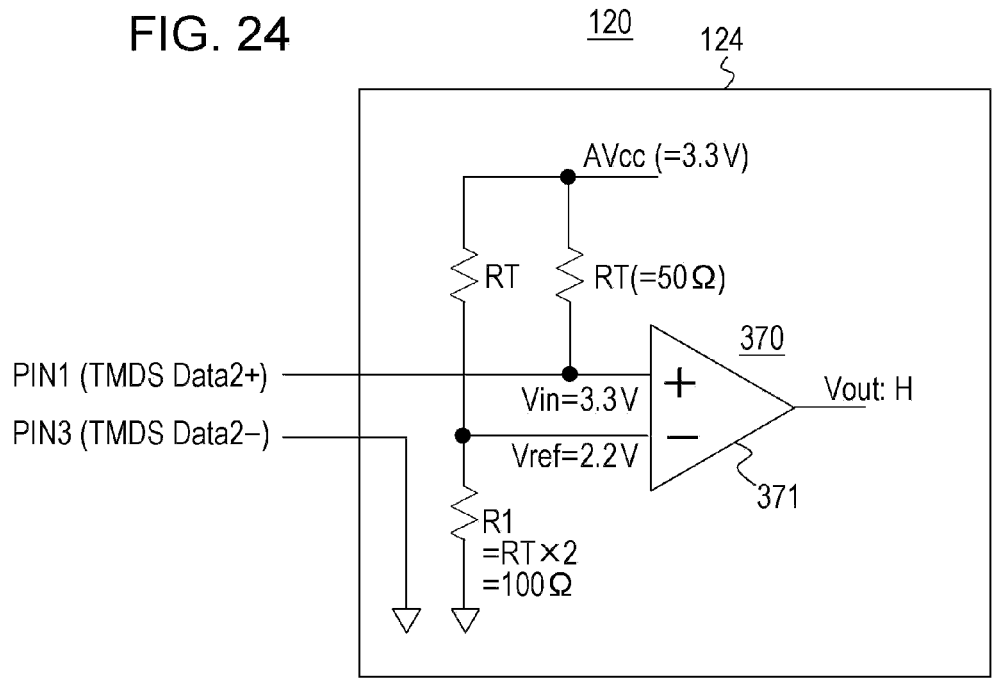
FIG. 24 is a diagram illustrating voltage to be input a voltage comparator of the cable detecting circuit at the time of no cable being inserted.

FIG. 24 illustrates voltage to be input to the voltage comparator 371 at the time of no cable being inserted. Between PIN 1 (TMDS Data2+) and PIN 3 (TMDS Data2−) has high impedance, and accordingly, Vin becomes 3.3 V, and Vout becomes H.

(2) When a new standard cable is inserted [1]

Figure 25:
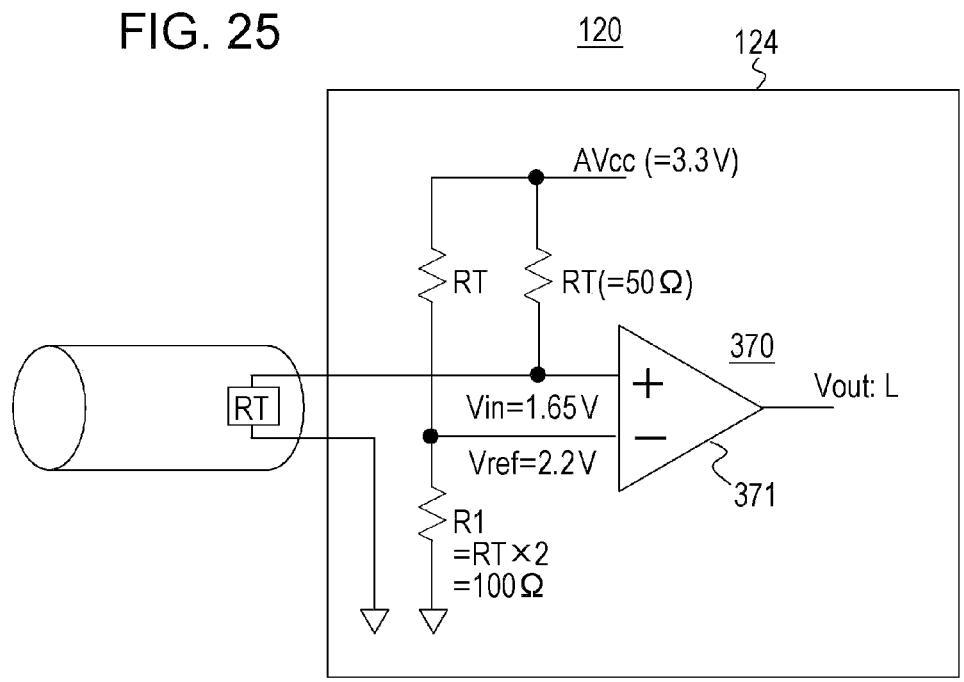
FIG. 25 is a diagram illustrating voltage to be input to the voltage comparator in the event that a new standard cable with between PIN 1 (TMDS Data2+) and PIN 3 (TMDS Data2−) being connected with a resistor RT (50Ω) has been inserted.

FIG. 25 illustrates a case where a new standard cable connecting between PINI (TMDS Data2+) and PIN 3 (TMDS Data2−) by a resistor RT (50Ω) is inserted. Vin becomes 1.65 V, and Vout becomes L.

(3) When a new standard cable is inserted [2]

Figure 26:
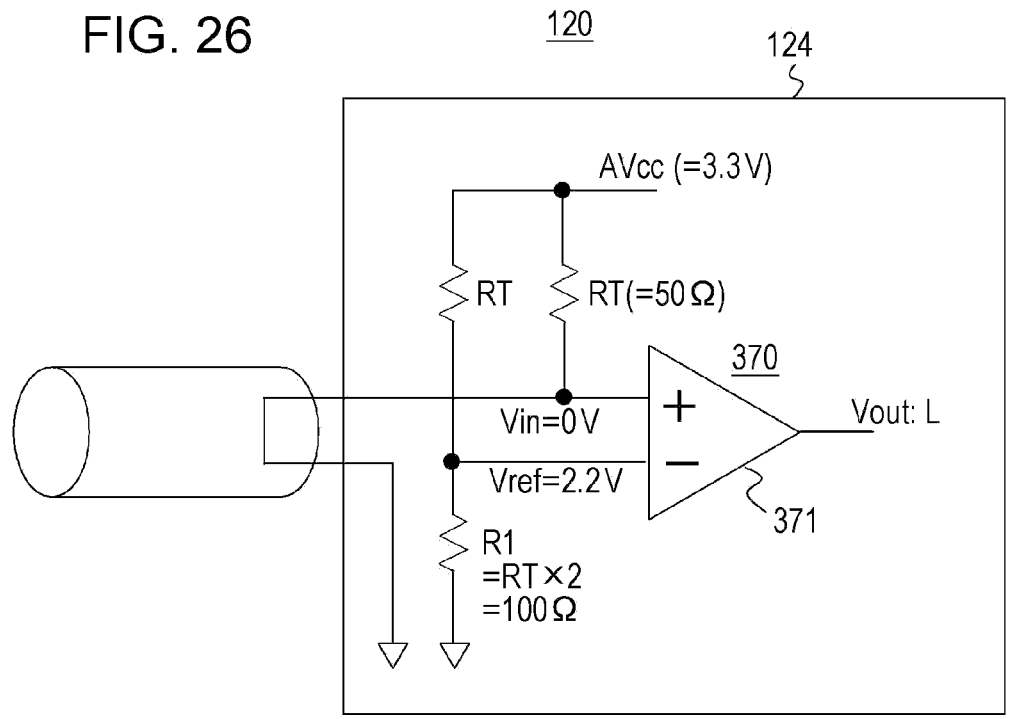
FIG. 26 is a diagram illustrating voltage to be input to the voltage comparator in the event that a new standard cable with between PIN 1 (TMDS Data2+) and PIN 3 (TMDS Data2−) being short-circuited with a lead wire has been inserted.

FIG. 26 illustrates a case where a new standard cable with between PIN 1 (TMDS Data2+) and PIN 3 (TMDS Data2−) being short-circuited by a lead wire is inserted. Vin becomes 0 V, and Vout becomes L.

(4) When the HDMI cable is inserted

Figure 27:
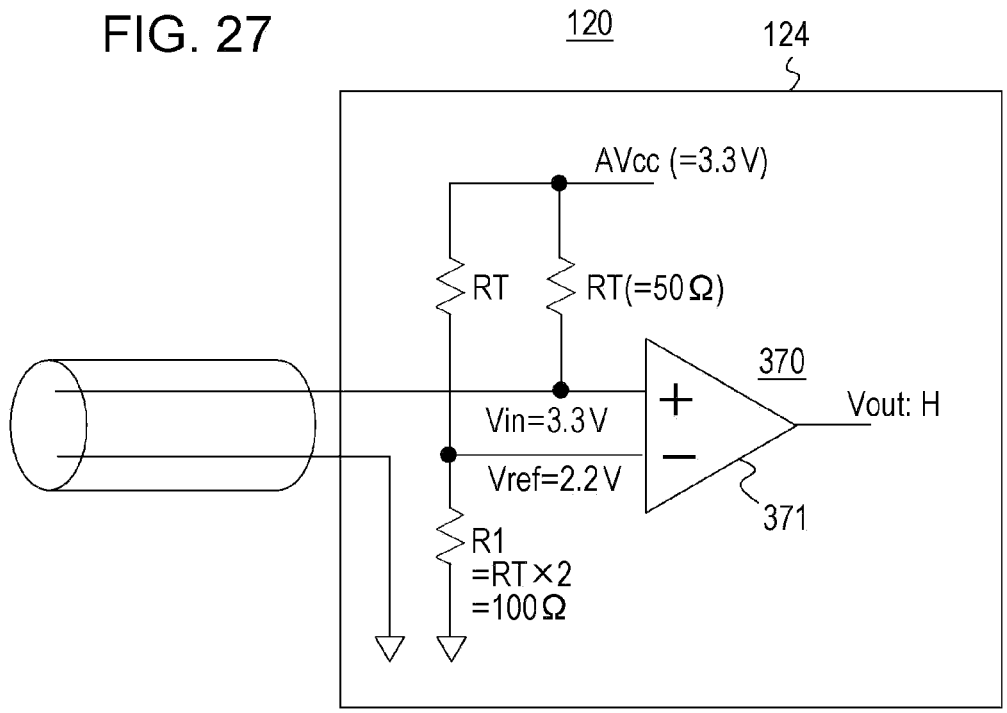
FIG. 27 is a diagram illustrating voltage to be input to the voltage comparator at the time of an HDMI cable being inserted (without HDMI source device).

FIG. 27 illustrates voltage to be input to the voltage comparator 371 at the time of the HDMI cable being inserted (with no HDMI source device). Between PIN 1 (TMDS Data2+) and PIN 3 (TMDS Data2−) has high impedance, and accordingly, Vin becomes 3.3 V, and Vout becomes H.

(5) When the HDMI cable+the HDMI source device are inserted

Figure 28:
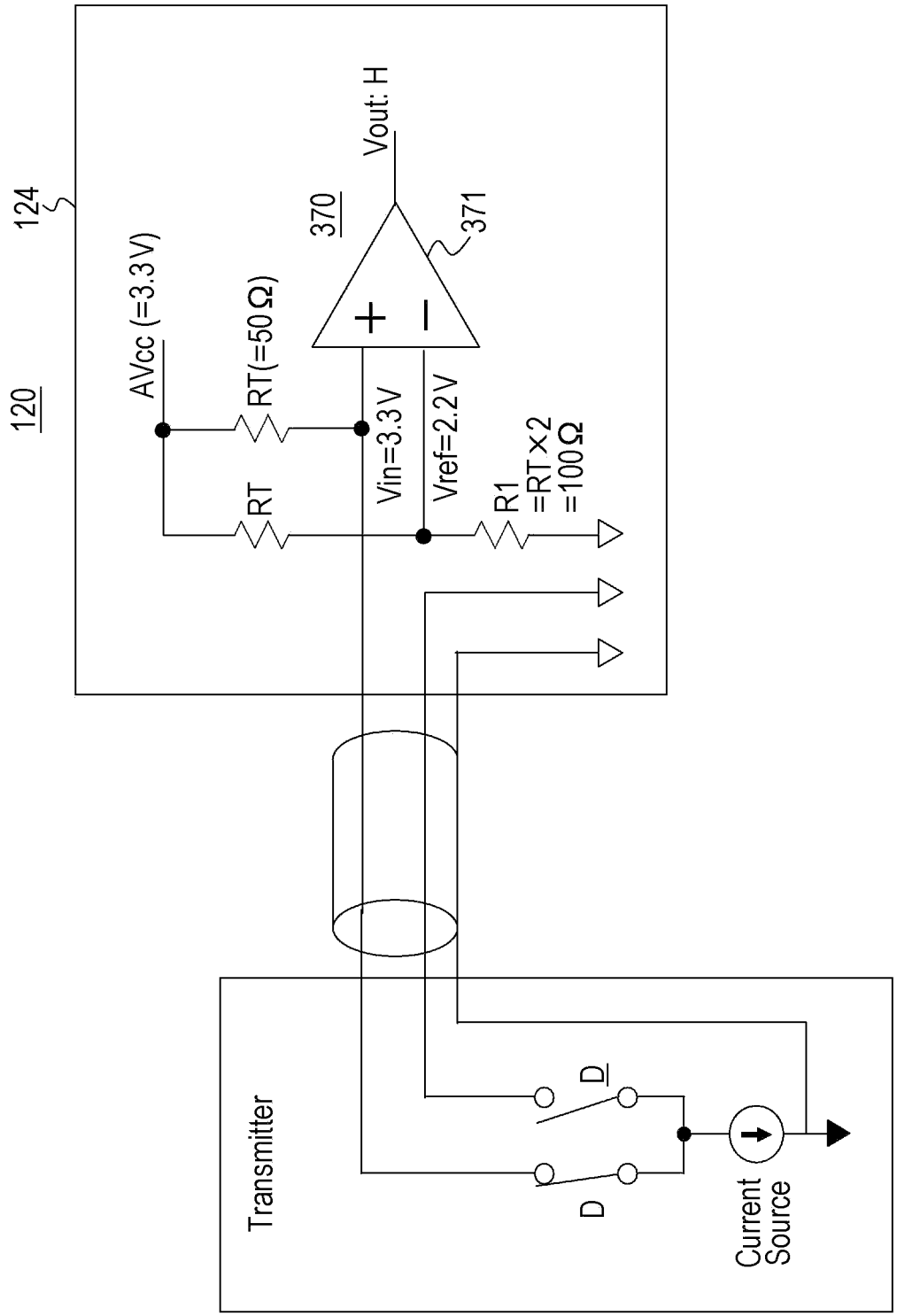
FIG. 28 is a diagram illustrating voltage to be input to the voltage comparator at the time of an HDMI cable being inserted (with HDMI source device).

FIG. 28 illustrates voltage to be input to the voltage comparator 371 at the time of the HDMI cable being inserted (with the HDMI source device). Between PIN 1 (TMDS Data2+) and PIN 3 (TMDS Data2−) has high impedance, and accordingly, Vin becomes 3.3 V, and Vout becomes H.

The operation of the cable detecting circuit 370 in the five cases has been described so far. Next, description will be made regarding two processes up to switching to an HDMI mode or new standard mode after cable detection is performed. Now, three modes that will be described in these processes, i.e., "cable detection mode", "HDMI mode", and "new standard mode" will be defined as follows.

"Cable detection mode" means a state immediately after power is applied to the sink device 120. Only at the time of this mode, the cable detecting circuit 370 shown in FIG. 22 is effective. Also, all of the signal lines not relating to the cable detecting circuit 370 have to be set to high impedance so as not to give unexpected damage to the source device.

"HDMI mode" means a state in which the sink device has the signal configuration shown in FIG. 2, and also satisfies the requirements for sink devices defined in HDMI Ver. 1.4.

"New standard mode" means a state in which the sink device has the signal configuration shown in FIG. 5 and FIG. 6 illustrated as an example, and also satisfies the requirements for sink devices defined in a new standard.

A. "Method for Detecting a Mechanical Switch within the Type-A Receptacle"

Figure 29:
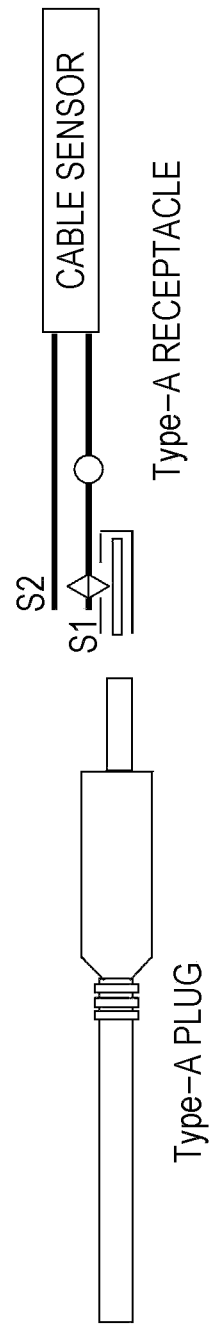
FIG. 29 is a diagram for describing a mechanical switch within the receptacle.

As shown in FIG. 29, a switch S1 is provided to the inside of the Type-A receptacle so as to determine whether or not there is insertion of the Type-A plug. An arrangement is made wherein upon the Type-A plug being inserted, the switch S1 comes into contact with a contact point S2. The contact/non-contact state of the switch is detected by a cable sensor within the drawing.

Figure 30:
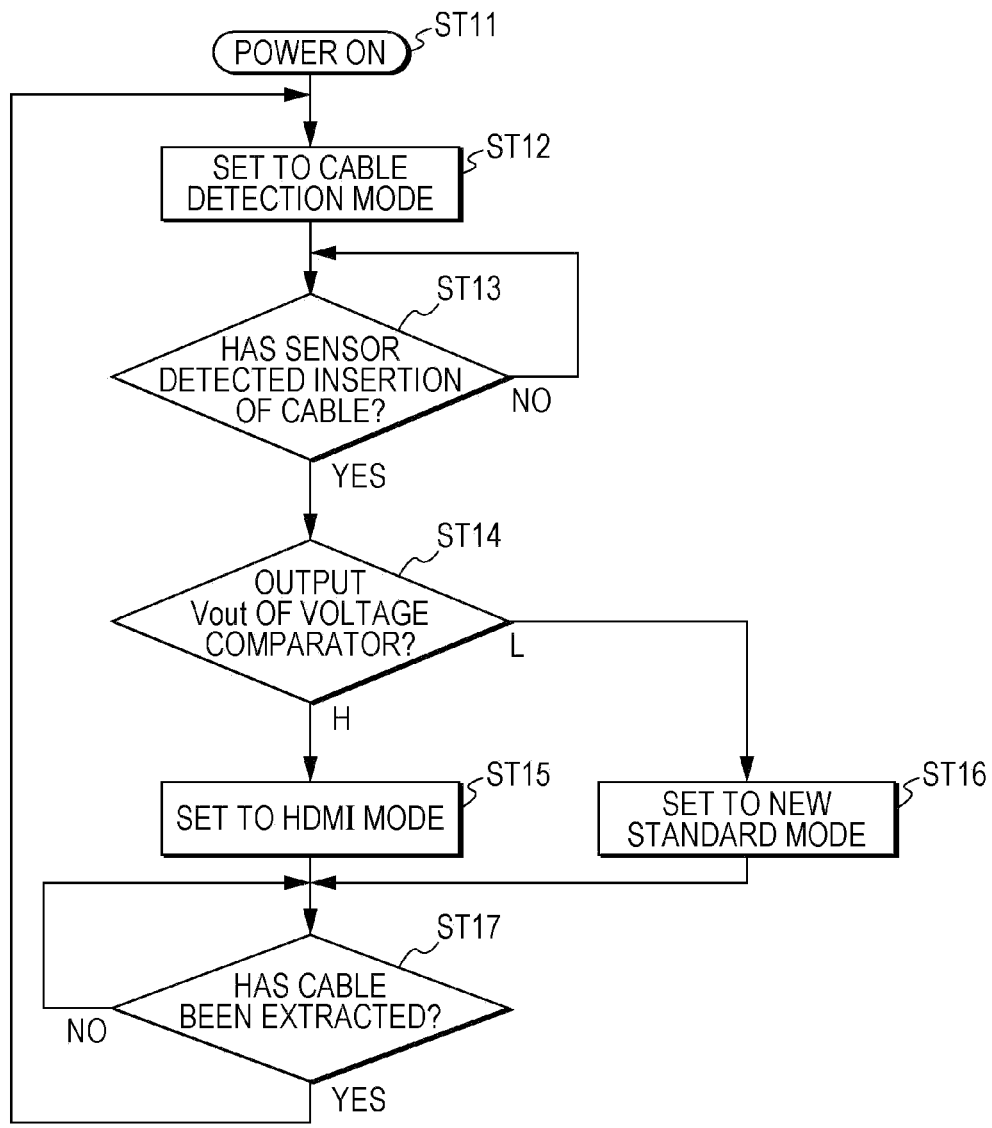
FIG. 30 is a flowchart illustrating the control procedure of the control unit of the sink device in the event of using a detecting method by the mechanical switch within the receptacle.

The flowchart in FIG. 30 illustrates the control procedure of the control unit 123 of the sink device 120 in the event of using this detection method. First, in step ST11, the control unit 123 starts processing in response to power-on, and then proceeds to the cable detection mode in step ST12. In step ST13, the control unit 123 determines whether or not the cable sensor (see FIG. 29) has detected insertion of a cable. In the event that the cable sensor has detected insertion of a cable, the control unit 123 proceeds to processing in step ST14. In this step ST14, the control unit 123 determines whether the output Vout of the voltage comparator 371 of the cable detecting circuit 370 (see FIG. 22) is "H" or "L".

When Vout is "H", in step ST15 the control unit 123 controls the data reception unit 122 in the operation mode conforming to the HDMI standard digital interface (HDMI mode). Also, when Vout is "L", a new standard, in step ST16 the control unit 123 controls the data reception unit 122 in the operation mode conforming to a new standard digital interface (new standard mode). After the processing in step ST15 or step ST16, the control unit 123 determines in step ST17 whether or not extraction of the cable has been performed to maintain the operation mode of the data reception unit 122 without change as long as extraction of the cable has not been performed. On the other hand, in the event that extraction of the cable has been performed, the control unit 123 immediately returns to step ST12.

B. "Method for Monitoring and Detecting the Voltage of +5V Pin (PIN 18)"

The control unit 123 monitors the voltage of +5V pin (PIN 18), and at the time of detection of +5 V, references the voltage comparator output Vout to perform switching to the HDMI mode or new standard mode.

Figure 31:
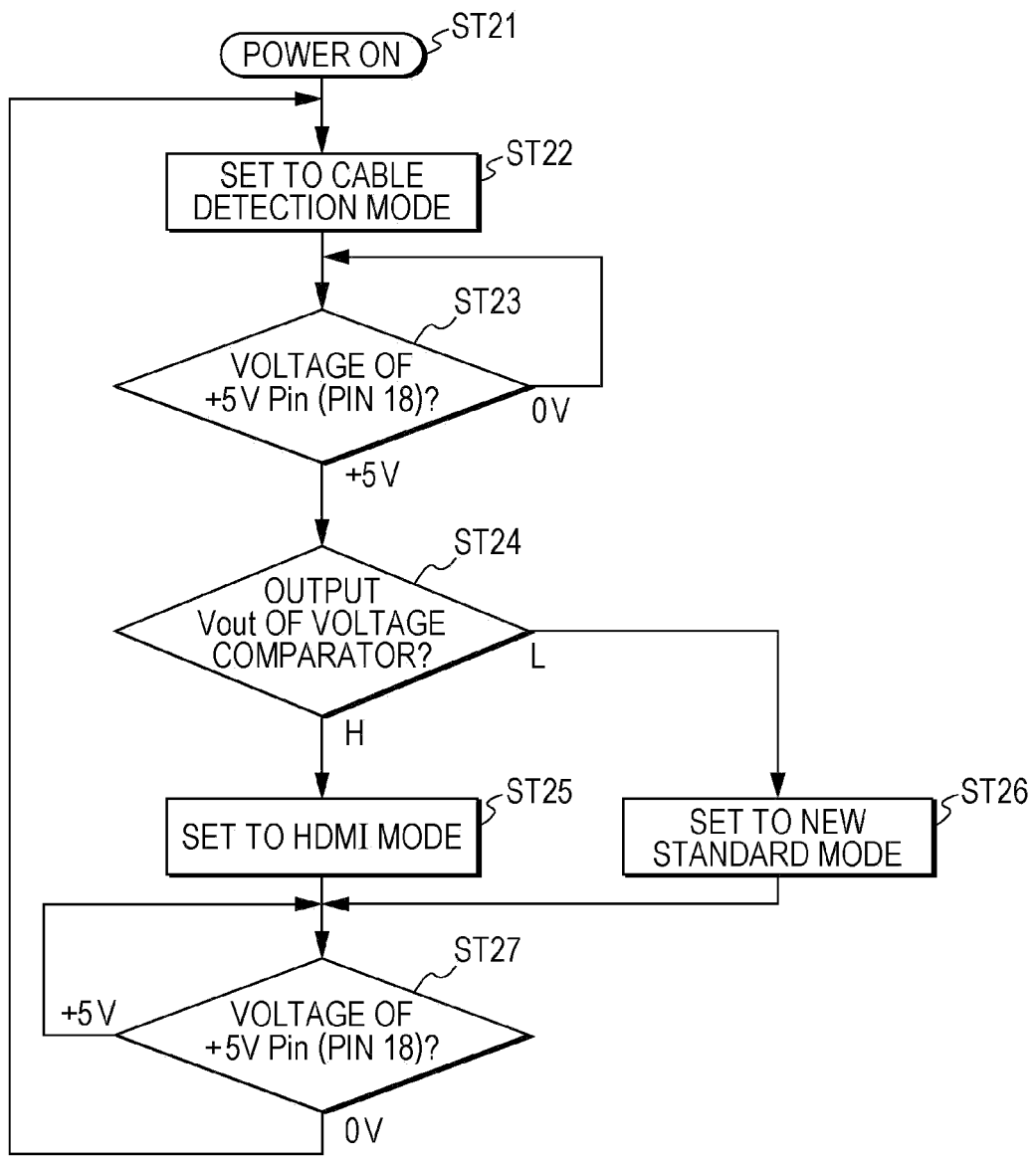
FIG. 31 is a flowchart illustrating a control procedure of the control unit of the sink device in the event of using a detecting method for monitoring the voltage of +5V pin (Pin 18).

The flowchart in FIG. 31 illustrates the control procedure of the control unit 123 of the sink device 120 in the event of using this detection method. First, in step ST21, the control unit 123 starts processing in response to power-on, and then proceeds to the cable detection mode in step ST22. In step ST23, the control unit 123 determines whether or not the voltage of +5V pin (PIN 18) is +5 V. When the voltage of +5V pin (PIN 18) is +5 V, the control unit 123 proceeds to processing in step ST24. In this step ST24, the control unit 123 determines whether the output Vout of the voltage comparator 371 of the cable detecting circuit 370 (see FIG. 22) is "H" or "L".

When Vout is "H", in step ST25 the control unit 123 controls the data reception unit 122 in the operation mode conforming to the HDMI standard digital interface (HDMI mode). Also, when Vout is "L", a new standard, in step ST26 the control unit 123 controls the data reception unit 122 in the operation mode conforming to a new standard digital interface (new standard mode).

After the processing in step ST25 or step ST26, the control unit 123 determines in step ST27 whether or not extraction of the cable has been performed. Specifically, when the voltage of +5V pin (PIN 18) is 0 V, the control unit 123 determines that extraction of the cable has been performed. The control unit 123 maintains the operation mode of the data reception unit 122 without change as long as extraction of the cable has not been performed. On the other hand, in the event that extraction of the cable has been performed, the control unit 123 immediately returns to step ST22.

Figure 32:
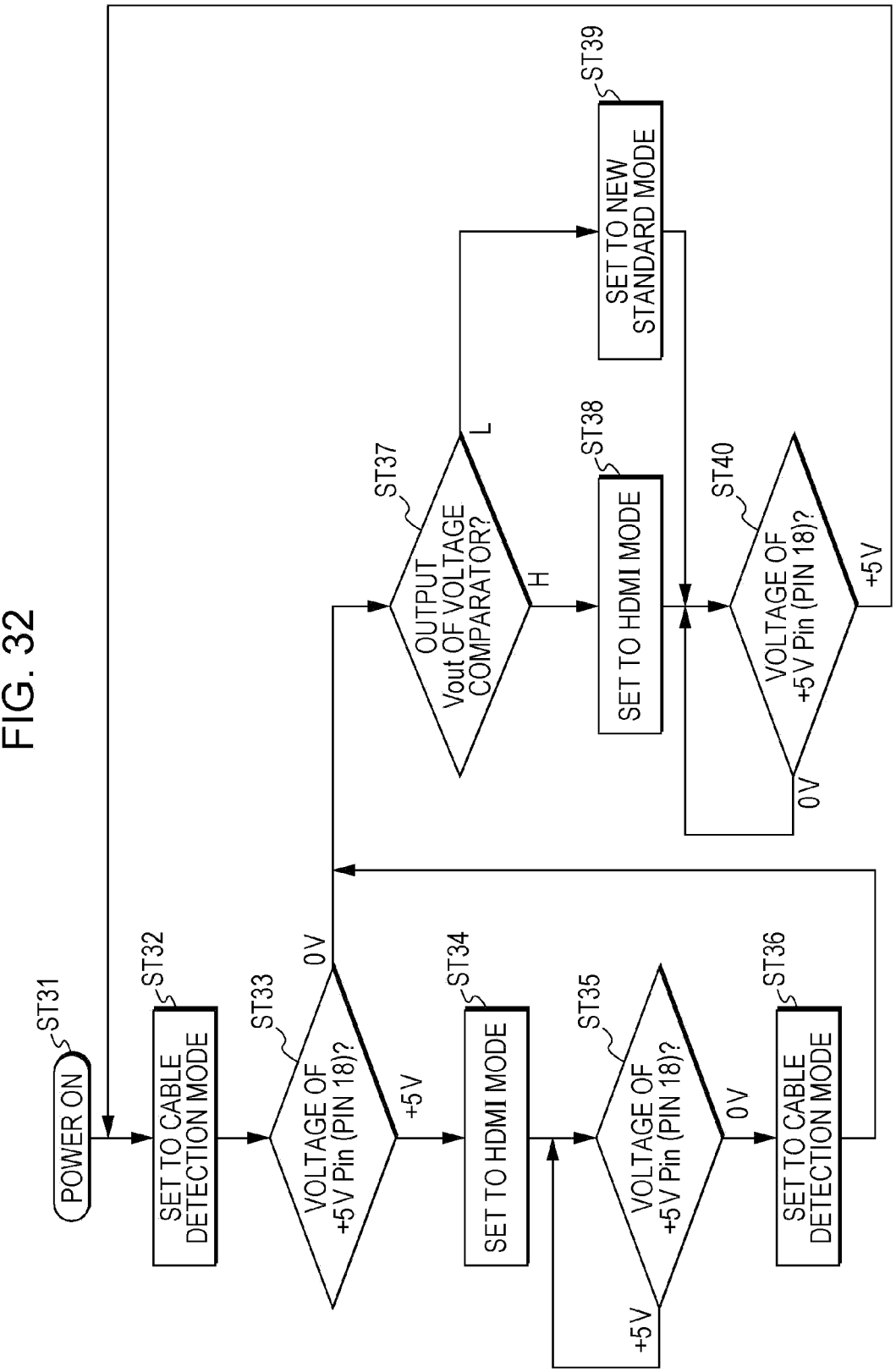
FIG. 32 is a flowchart illustrating another control procedure of the control unit of the sink device in the event of using a detecting method for monitoring the voltage of +5V pin (Pin 18).

The flowchart in FIG. 32 also illustrates the control procedure of the control unit 123 of the sink device 120 in the event of using a method for monitoring and detecting +5V pin (PIN 18). However, this processing is processing in the event that +5V pin is not used in a new standard. This control procedure differs from the above-mentioned control procedure in the flowchart in FIG. 31 in that the HDMI mode is always active while applying +5 V to +5V pin. Also, in the event that +5 V has not been applied to +5V pin, the control unit 123 references the voltage comparator output Vout to proceed to the HDMI mode or new standard mode.

First, in step ST31 the control unit 123 starts processing in response to power-on, and then proceeds to the cable detection mode in step ST32. In step ST33, the control unit 123 determines whether or not the voltage of +5V pin (PIN 18) is +5 V. When the voltage of +5V pin (PIN 18) is +5 V, in step ST34 the control unit 123 controls the data reception unit 122 in the operation mode conforming to the HDMI standard digital interface (HDMI mode).

Next, in step ST35 the control unit 123 determines the voltage of +5V pin (PIN 18). When the voltage is +5 V, the control unit 123 maintains the operation mode of the data reception unit 122 (HDMI mode) without change. On the other hand, when the voltage is 0 V, in step ST36 the control unit 123 immediately proceeds to the cable detection mode, and then proceeds to processing in step ST37.

In step ST33, even when the voltage of +5V pin (PIN 18) is 0 V, the control unit 123 proceeds to processing in step ST37. In this step ST37, the control unit 123 determines whether the output Vout of the voltage comparator 371 of the cable detecting circuit 370 (see FIG. 22) is "H" or "L".

When Vout is "H", in step ST38 the control unit 123 controls the data reception unit 122 in the operation mode conforming to the HDMI standard digital interface (HDMI mode). Also, when Vout is "L", a new standard, the control unit 123 controls the data reception unit 122 in the operation mode conforming to a new digital interface (new standard mode) in step ST39.

After the processing in step ST38 or step ST39, the control unit 123 determines the voltage of +5V pin (PIN 18) in step ST40. When the voltage of +5V pin (PIN 18) is 0 V, the control unit 123 maintains the operation mode (HDMI mode or new standard mode) of the data reception unit 122 without change. On the other hand, when the voltage is +5 V, the control unit 123 immediately returns to step ST32.

Seventh Configuration Example

With this configuration example, attention is focused on a pair of pins used when the data transmission unit 112 of the source device 110 operates using the HDMI standard digital interface, and not used when the data transmission unit 112 of the source device 110 operates using the new standard digital interface (see FIG. 5), e.g., PIN 15 (pin for SCL) and PIN 16 (pin for SDA).

Figure 33:
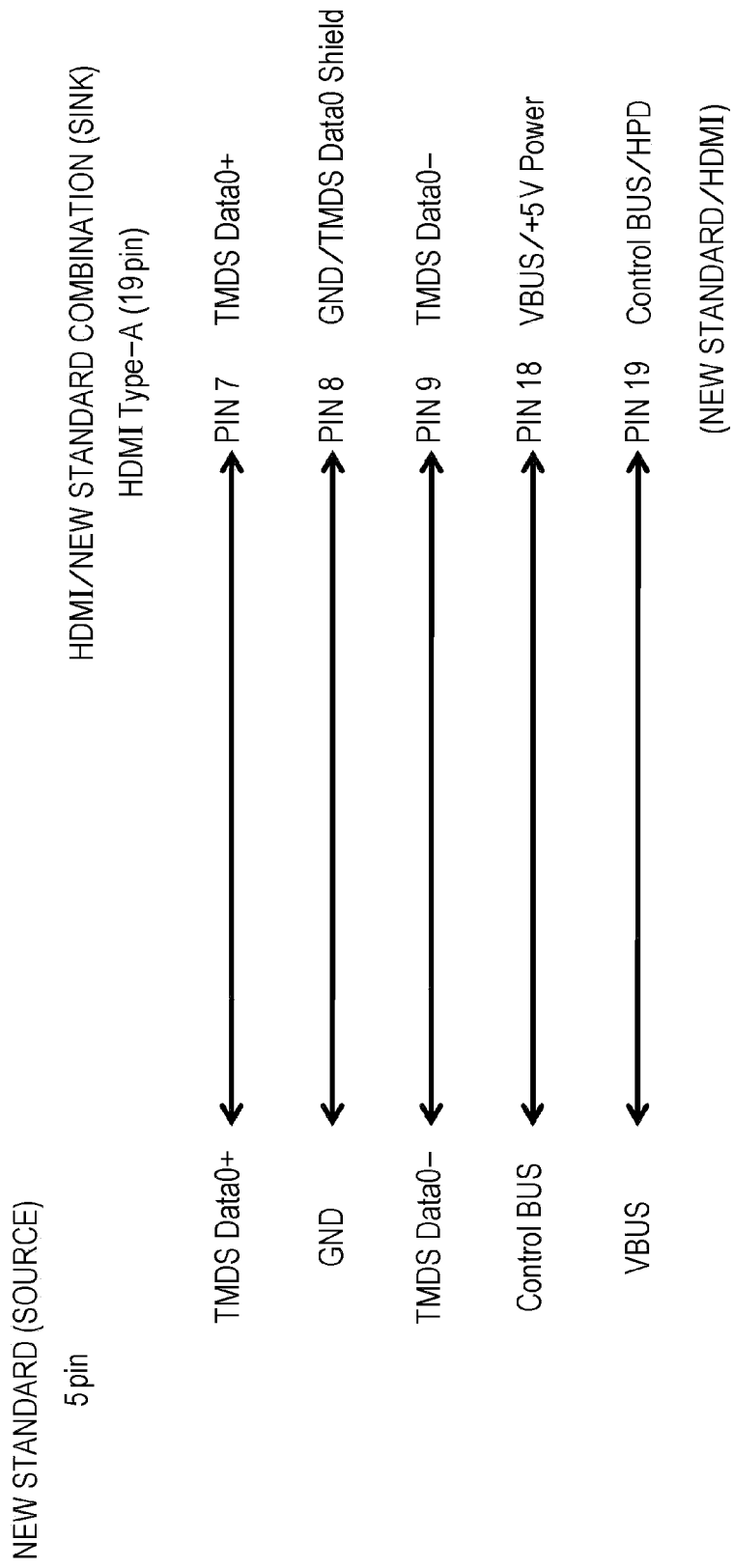
FIG. 33 is a diagram illustrating a cable wire layout based on a new standard.
Figure 34:
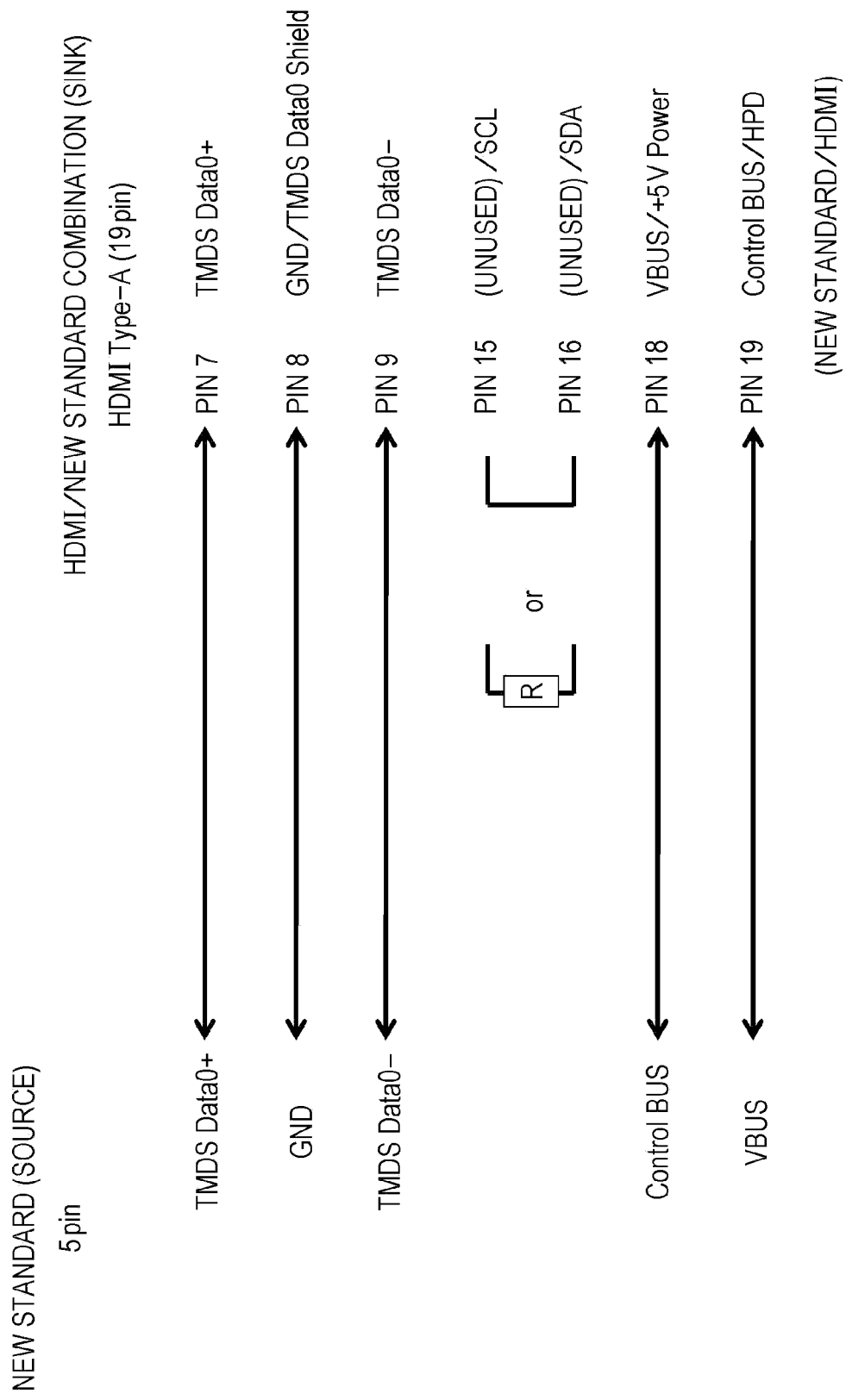
FIG. 34 is a diagram illustrating a cable wire layout of a new standard cable.

FIG. 33 illustrates a cable wire layout diagram based on the new standard. FIG. 34 illustrates the cable wire layout diagram of a new standard cable, wherein PIN 15 and PIN 16 are short-circuited by a lead wire, or PIN 15 and PIN 16 are connected by a resistor R, within the HDMI Type-A plug on the sink device side of this new standard cable.

Figure 35:
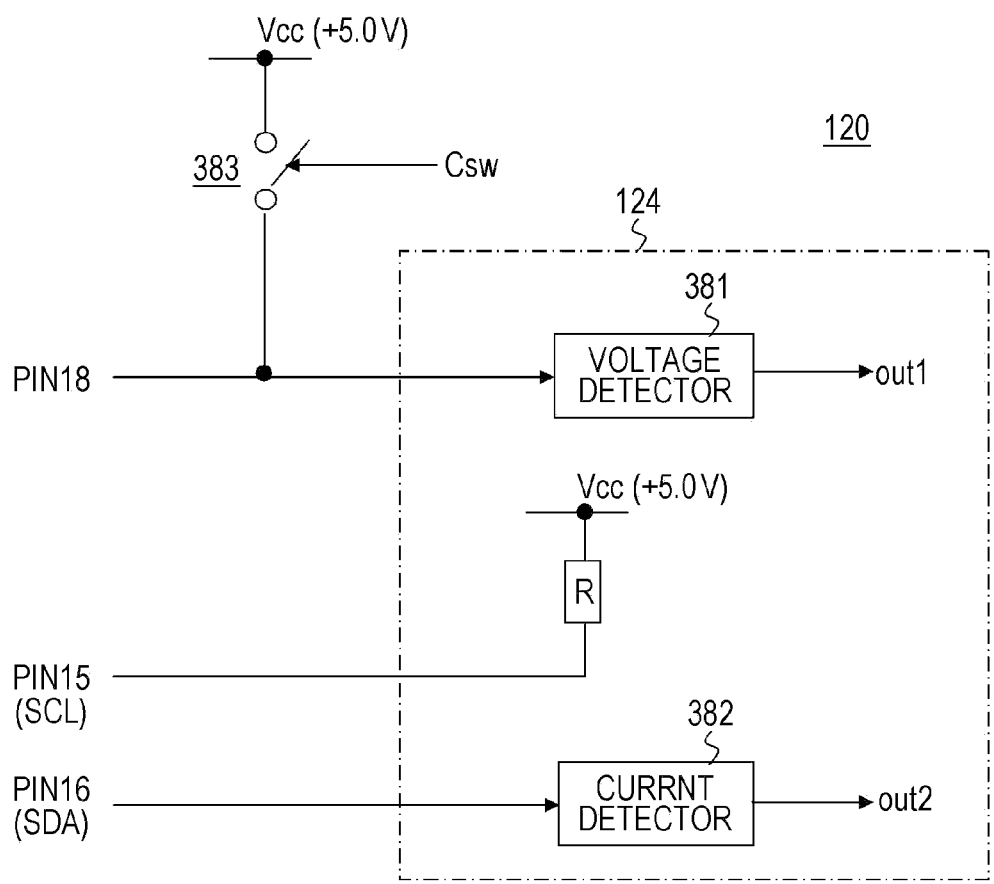
FIG. 35 is a diagram schematically illustrating the configuration within the determining unit within the control unit of the sink device.

FIG. 35 illustrates the schematic configuration of the determining unit 124 within the control unit 123 of the sink device 120. This determining unit 124 includes a voltage detector 381. PIN 18 is connected to the input side of this voltage detector 381. PIN 18 is a power supply pin to which a power supply line (+5VPower Line) is connected when an HDMI source device is connected. The voltage detector 381 detects the voltage state of PIN 18. Specifically, the voltage detector 381 detects whether or not the voltage state of PIN 18 is the voltage of the power supply, and outputs a detection result out1 thereof.

Also, the determining unit 124 pulls up PIN 15 to power supply voltage Vcc via a resistor R. Also, the determining unit 124 includes a current detector 382. PIN 16 is connected to the input side of this current detector 382. This current detector 382 detects the current state of PIN 16. That is to say, the current detector 382 detects whether or not current flows through PIN 16, and outputs a detection result out2 thereof.

The detection operations of the above-mentioned voltage detector 381 and current detector 382 within the determining unit 124 will be considered regarding the following six cases.
(1) Case of No Cable Being Connected
(2) Case of HDMI Cable Being Connected
(3) Case of HDMI Cable+HDMI Source Device (power off) Being Connected
(4) Case of HDMI Cable+HDMI Source Device (power off) Being Connected
(5) Case of New Standard Cable Being Connected
(6) Case of New Standard Cable+New Standard Source Device (both of power on/off) Being Connected "(1) Case of No Cable Being Connected"

No power supply is supplied from the source side to PIN 18, and accordingly, the voltage detector 381 detects that the voltage state of PIN 18 is not the voltage of power supply. Also, between PIN 15 and PIN 16 is in a high impedance state, and accordingly, no current flows through PIN 16, and the current detector 382 detects that no current flows.

"(2) Case of HDMI Cable Being Connected"

No power supply is supplied from the source side to PIN 18, and accordingly, the voltage detector 381 detects that the voltage state of PIN 18 is not the voltage of power supply. Also, the SCL line and the SDA line within the HDMI cable are disconnected. Accordingly, in this case, between PIN 15 and PIN 16 is in a high impedance state. Accordingly, no current flows through PIN 16, and the current detector 382 detects that no current flows.

"(3) Case of HDMI Cable+HDMI Source Device (Power Off) Being Connected"

The power supply of the HDMI source device is off, and accordingly, no power supply is supplied to PIN 18. Accordingly, the voltage detector 381 detects that the voltage state of PIN 18 is not the voltage of power supply. Also, between SCL-SDA on the HDMI source device side is in a high impedance state so as to prevent electrical damage. Accordingly, no current flows through PIN 16, and the current detector 382 detects that no current flows.

"(4) Case of HDMI Cable+HDMI Source Device (Power on) Being Connected"

The power supply of the HDMI source device is on, and accordingly, power supply is supplied to PIN 18 from the source side. Accordingly, the voltage detector 381 detects that the voltage state of PIN 18 is the voltage of power supply. Also, between SCL-SDA on the HDMI source device side is in a high impedance state so as to prevent electrical damage. Accordingly, no current flows through PIN 16, and the current detector 382 detects that no current flows.

"(5) Case of New Standard Cable Being Connected"

No power supply is supplied from the source side to PIN 18, and accordingly, the voltage detector 381 detects that the voltage state of PIN 18 is not the voltage of power supply. PIN 15 and PIN 16 are short-circuited by a lead wire within the HDMI Type-A plug on the sink side of the new standard cable, or connected via a resistor R. Accordingly, current flows through PIN 16, and the current detector 382 detects that current flows.

"(6) Case of New Standard Cable+New Standard Source Device (Both of Power on/Off) being Connected"

No power supply is supplied from the source side to PIN 18, and accordingly, the voltage detector 381 detects that the voltage state of PIN 18 is not the voltage of power supply. PIN 15 and PIN 16 are short-circuited by a lead wire within the HDMI Type-A plug on the sink side of the new standard cable, or connected via a resistor R. Accordingly, current flows through PIN 16, and the current detector 382 detects that current flows.

Figure 36:
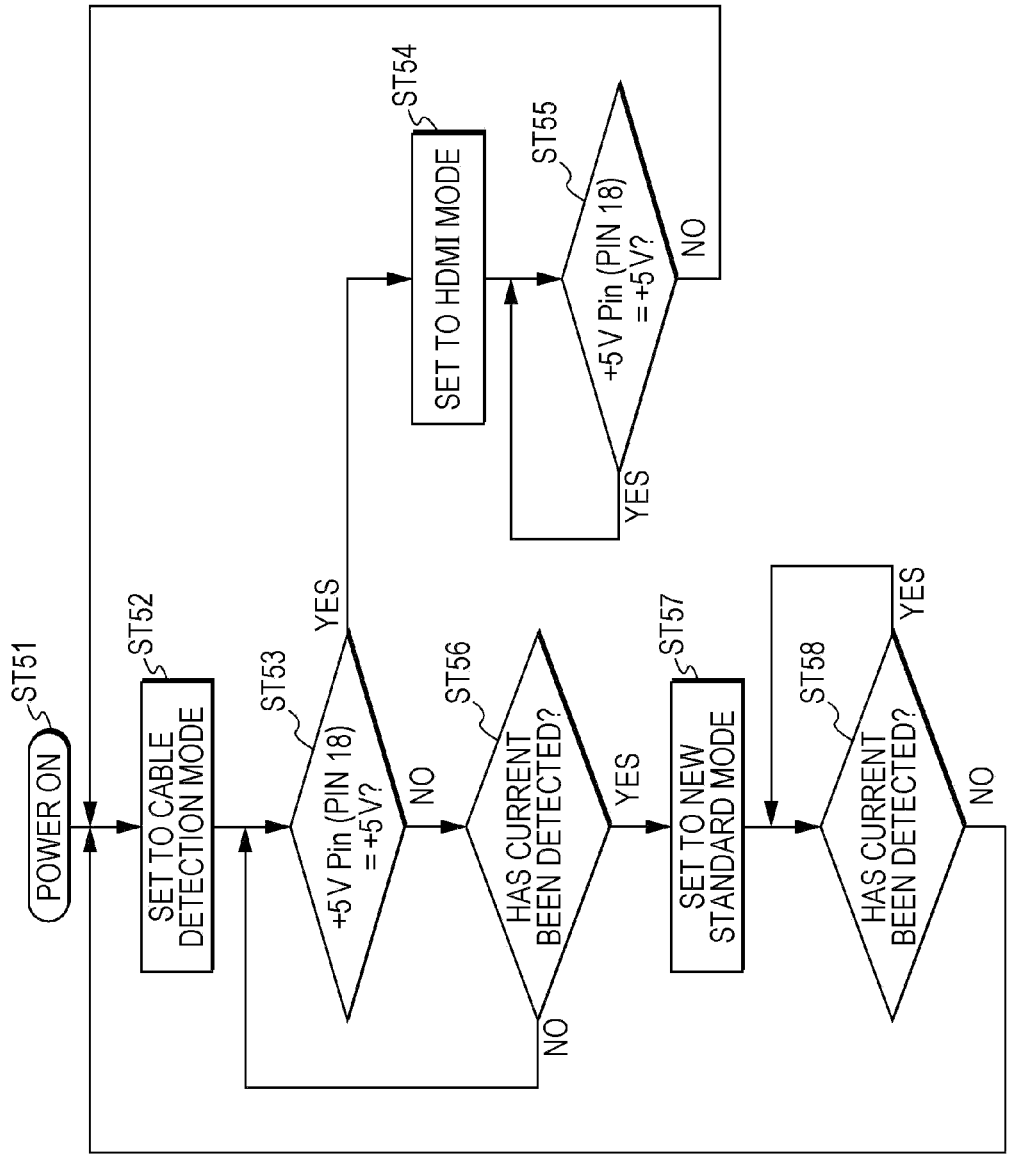
FIG. 36 is a flowchart illustrating a control procedure of the control unit of the sink device.

According to the above-mentioned consideration, with this seventh configuration example, cable detection is performed by the voltage detector 381 and current detector 382. The flowchart in FIG. 36 illustrates the control procedure of the control unit 123 of the sink device 120 in the event of using this detection method.

First, in step ST51, the control unit 123 starts processing in response to power-on, and then proceeds to the cable detection mode in step ST52. With this cable detection mode, the control unit 123 performs polling regarding the detection results of the voltage detector 381 and current detector 382. In step ST53, the control unit 123 determines whether or not the voltage detector 381 detects that the voltage is power supply voltage, i.e., whether or not the voltage of +5V pin (PIN 18) is +5 V (power supply voltage).

In the event that power supply voltage has been supplied, the control unit 123 determines that this is equivalent to the above mentioned "(4) Case of HDMI Cable+HDMI Source Device (power on) Being Connected", in step ST54 controls the data reception unit 122 in the operation mode conforming to the HDMI standard digital interface (HDMI mode). In step ST55, the control unit 123 monitors the voltage detection state of the voltage detector 381, and continues the operation mode (HDMI mode) of the data reception unit 122 without change while detecting power supply voltage. On the other hand, in the event that power supply voltage has not been detected at the voltage detector 381, the control unit 123 immediately returns to the cable detection mode in step ST52.

Also, in the event that no power supply voltage has been detected at the voltage detector 381 in step ST53, in step ST56 the control unit 123 determines whether or not the current detector 382 has detected current. In the event that no current has been detected, the control unit 123 determines that this is equivalent to the above-mentioned "(1) Case of No Cable Being Connected, (2) Case of HDMI Cable Being Connected, (3) Case of HDMI Cable+HDMI Source Device (power off) Being Connected", and repeats the polling processing in steps ST53 and ST56.

Also, in the event that current has been detected at the current detector 382 in step ST56, the control unit 123 determines that this is equivalent to the above-mentioned "(5) Case of New Standard Cable Being Connected, (6) Case of New Standard Cable+New Standard Source Device (both of power on/off) Being Connected", and in step ST57 controls the data reception unit 122 in the operation mode conforming to a new standard digital interface (new standard mode).

In step ST58, the control unit 123 monitors the current detection state of the current detector 382, and continues the operation mode (new standard mode) of the data reception unit 122 without change while detecting current. On the other hand, in the event that current has not been detected at the current detector 382, the control unit 123 immediately returns to the cable detection mode in step ST52.

Note that, in step ST57, the control unit 123 supplies a switch control signal $C_{SW}$ to a connection switch 383 shown in FIG. 35 at the time of controlling the data reception unit 122 in the new standard mode to change to an on state. Thus, power supply Vcc can be supplied to the source device side.

With the above-mentioned seventh configuration example, even when the source device of which the digital interface is the new standard digital interface is a battery-driven electronic device, and this battery is completely down, it can be determined that the digital interface of this source device is the new standard digital interface. Accordingly, the above-mentioned data reception unit 122 can be controlled in the new standard mode, and also, power supply can be supplied to the source device for charging.

Note that, with the above-mentioned seventh configuration example, attention is focused on PIN 15 (pin for SCL) and PIN 16 (pin for SDA) as a pair of pins used when the data transmission unit 112 of the source device 110 operates using the HDMI standard digital interface, and not used when the data transmission unit 112 of the source device 110 operates using the new standard digital interface (see FIG. 5). Though detailed description will be omitted, the same arrangement may be made even with a pair of pins other than those.

Also, the above-mentioned seventh configuration example shows a configuration including the current detector 382 for detecting the current state of PIN 16. However, it can also be conceived to have a configuration for detecting the voltage state of PIN 16 instead of the current state thereof.

Eighth Configuration Example

This configuration example also focuses attention on, in the same way as the above-mentioned configuration example, a pair of pins, e.g., PIN 15 (pin for SCL) and PIN 16 (pin for SDA). This pair of pins are used when the data transmission unit 112 of the source device 110 operates using the HDMI standard digital interface, and are not used when the data transmission unit 112 of the source device 110 operates using the new standard digital interface (see FIG. 5).

Figure 37:
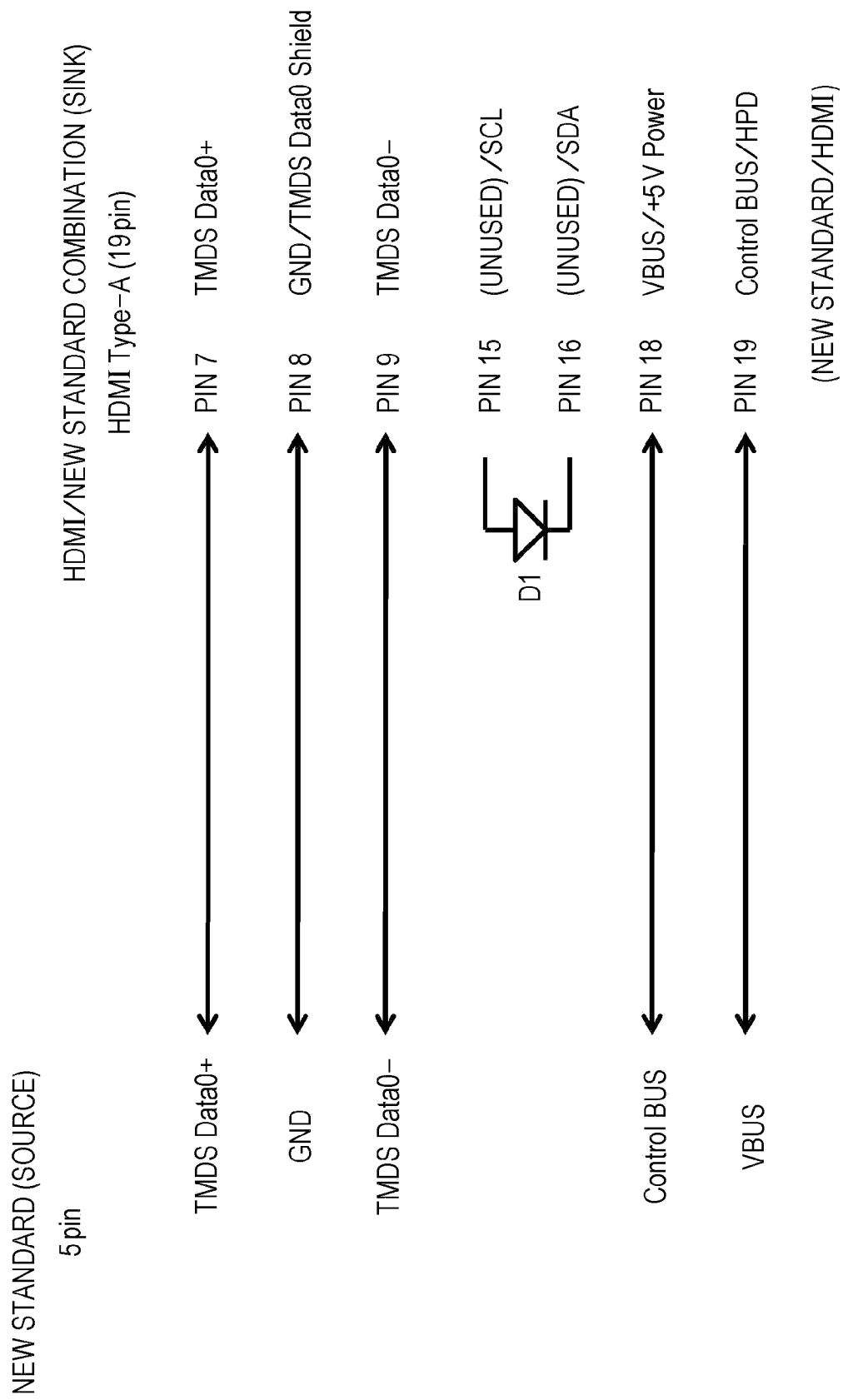
FIG. 37 is a diagram illustrating a cable wire layout of a new standard cable.

FIG. 37 illustrates a cable wire layout diagram of a new standard cable, wherein PIN 15 and PIN 16 are connected through a diode D1 within the HDMI Type-A plug on the sink device side of this new standard cable. In this case, the anode of the diode D1 is connected to PIN 15, a cathode thereof is connected to PIN 16, and a signal (current) flows from PIN 15 to PIN 16 in one direction. Note that another electronic device having a similar function may be employed instead of the diode D1.

Figure 38:
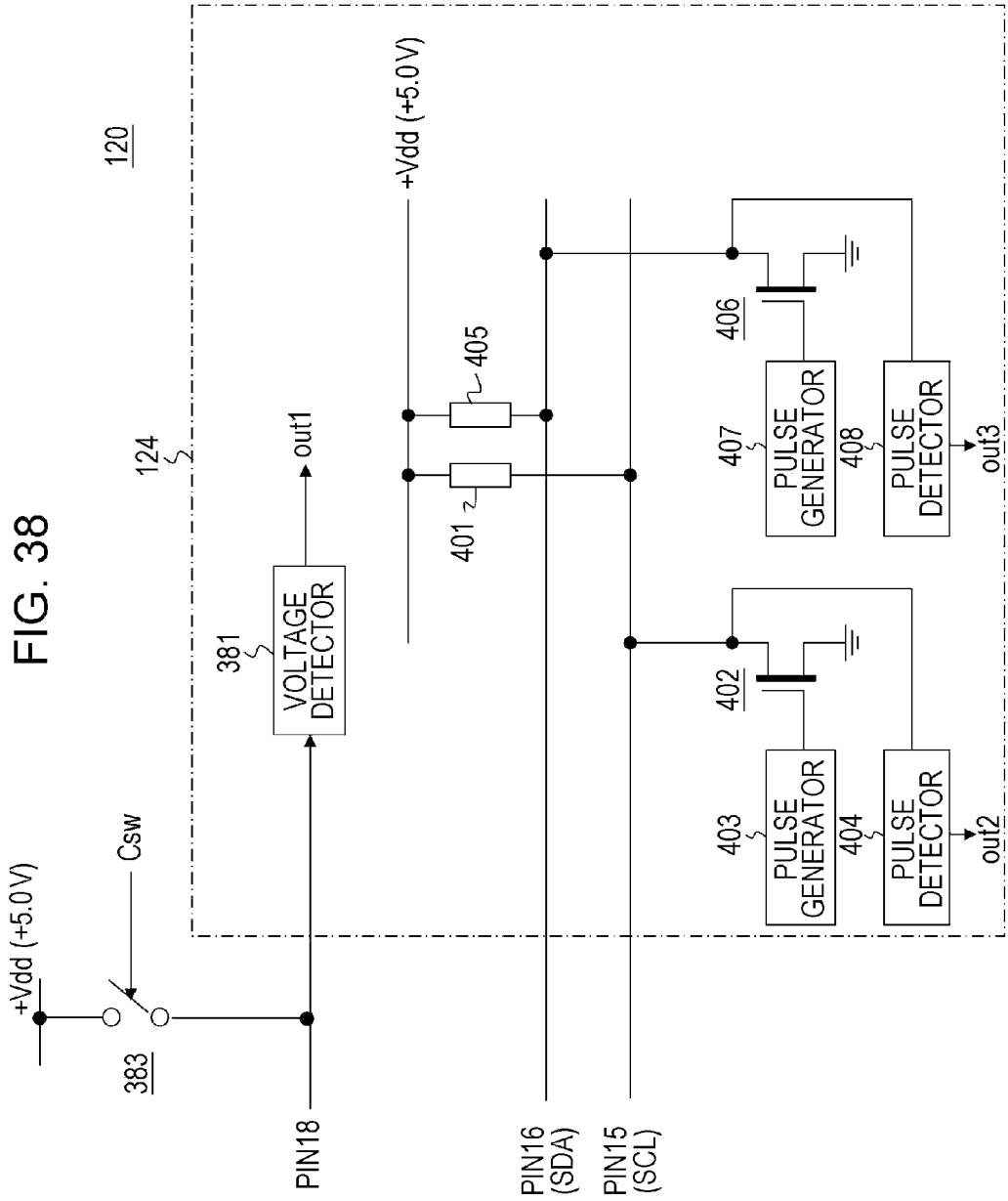
FIG. 38 is a diagram schematically illustrating the configuration within the determining unit within the control unit of the sink device.

FIG. 38 illustrates the schematic configuration of the determining unit 124 within the control unit 123 of the sink device 120. This determining unit 124 includes the voltage detector 381. PIN 18 is connected to the input side of this voltage detector 381. PIN 18 is a power supply pin to which a power supply line (+5VPower Line) is connected when an HDMI source device is connected. Specifically, the voltage detector 381 detects whether or not the voltage state of PIN 18 is power supply voltage, and outputs a detection result out1 thereof.

Also, the determining unit 124 includes a resistor (resistor element) 401, a field-effect transistor 402, a pulse generator 403, a pulse detector 404, a resistor (resistor element) 405, a field-effect transistor 406, a pulse generator 407, and a pulse detector 408. Here, the resistor 401 makes up a first resistor element, and the resistor element 405 makes up a second resistor element. Also, the field-effect transistor 402 makes up a first switching element, and the field-effect transistor 406 makes up a second switching element.

The resistor element 401, field-effect transistor 402, and pulse generator 403 make up a first signal supply unit. Also, the resistor element 405, field-effect transistor 406, and pulse generator 407 make up a second signal supply unit. Also, the pulse generator 408 makes up a first signal detecting unit, and the pulse generator 404 makes up a second signal detecting unit.

The resistor element 401 connects PIN 15 to a power supply pin to which predetermined voltage, here, power supply voltage +Vdd is supplied. That is to say, the resistor element 401 pulls up PIN 15 to the power supply voltage +Vdd. Also, the drain of the field-effect transistor 402 is connected to PIN 15, and the source thereof is grounded. The pulse generator 403 generates a pulse signal for driving the field-effect transistor 402 serving as a switching element. That is to say, a pulse signal generated at the pulse generator 403 is supplied to the gate of the field-effect transistor 402.

With the field-effect transistor 402, on (electric conductive) and off (non-electric-conductive) are alternately repeated based on the pulse signal from the pulse generator 403. Specifically, during a high-level period of a pulse signal the field-effect transistor 402 turns on (electric conductive) and the potential of PIN 15 turns to a grounding potential (0 V). On the other hand, during a low-level period of a pulse signal the field-effect transistor 402 turns off (non-electric-conductive) and the potential of PIN 15 turns to power supply voltage +Vdd. In this way, when a pulse signal is supplied from the pulse generator 403 to the field-effect transistor 402, a pulse signal of which the high level H is "+Vdd", and the low level L is "0 V" is supplied to PIN 15.

The resistor element 405 connects PIN 16 to a power supply terminal to which predetermined voltage, here, power supply voltage +Vdd is supplied. That is to say, the resistor element 405 pulls up PIN 16 to power supply voltage +Vdd. Also, the drain of the field-effect transistor 406 is connected to PIN 16, and the source thereof is grounded. The pulse generator 407 generates a pulse signal for driving the field-effect transistor 406 serving as a switching element. That is to say, the pulse signal generated at the pulse generator 407 is supplied to the gate of the field-effect transistor 406.

With the field-effect transistor 406, on (electric conductive) and off (non-electric-conductive) are alternately repeated based on the pulse signal from the pulse generator 407. Specifically, during a high-level period of a pulse signal the field-effect transistor 406 turns on (electric conductive) and the potential of PIN 16 turns to a grounding potential (0 V). On the other hand, during a low-level period of a pulse signal the field-effect transistor 406 turns off (non-electric-conductive) and the potential of PIN 16 turns to power supply voltage +Vdd. In this way, when a pulse signal is supplied from the pulse generator 407 to the field-effect transistor 406, a pulse signal of which the high level H is "+Vdd", and the low level L is "0 V" is supplied to PIN 16.

The pulse generator 404 detects, as described above, a signal obtained at PIN 15 during a period when a pulse signal of which the high level H is "+Vdd", and the low level L is "0 V" is supplied to PIN 16, and outputs a detection result out2 thereof. Also, the pulse generator 408 detects, as described above, a signal obtained at PIN 16 during a period when a pulse signal of which the high level H is "+Vdd", and the low level L is "0 V" is supplied to PIN 16, and outputs a detection result out3 thereof.

The determining unit 124 extracts a case where the new standard cable is connected based on a combination of the detection result out2 and detection result out3 obtained in the following detection procedures A and B. First, the detection procedures A and B will be described.

"Detection Procedure A"

Let us consider a state in which a pulse signal is supplied from the pulse generator 403 to the gate of the field-effect transistor 402, and a pulse signal of which the high level H is "+Vdd", and the low level L is "0 V" is supplied to PIN 15. In this state, the pulse detector 408 detects a signal obtained at PIN 16, and outputs a detection result out3. In this case, the detection result out3 that the pulse detector 408 outputs is as follows.

In the event that no pulse signal has been detected at all, i.e., in the event that the voltage of PIN 16 has been unchanged from the power supply voltage +Vdd, the pulse detector 408 outputs "N (No)" as the detection output out3. Also, in the event of having detected a perfect pulse signal, i.e., in the event of having detected a pulse signal of which the high level H is "+Vdd", and the low level L is "0 V", the pulse detector 408 outputs "Y (Yes)" as the detection output out3. Further, in the event of having detected an imperfect pulse signal, i.e., in the event of having detected a pulse signal of which the low level L is 0 V<L<+Vdd, the pulse detector 408 outputs "M (Medium)" as the detection output out3.

"Detection Procedure B"

Let us consider a state in which a pulse signal is supplied from the pulse generator 407 to the gate of the field-effect transistor 406, and a pulse signal of which the high level H is "+Vdd", and the low level L is "0 V" is supplied to PIN 16. In this state, the pulse detector 404 detects a signal obtained at PIN 15, and outputs a detection result out2. In this case, the detection result out2 that the pulse detector 404 outputs is as follows.

In the event that no pulse signal has been detected at all, i.e., in the event that the voltage of PIN 15 has been unchanged from the power supply voltage +Vdd, the pulse detector 404 outputs "N (No)" as the detection output out2. Also, in the event of having detected a perfect pulse signal, i.e., in the event of having detected a pulse signal of which the high level H is "+Vdd", and the low level L is "0 V", the pulse detector 404 outputs "Y (Yes)" as the detection output out2. Further, in the event of having detected an imperfect pulse signal, i.e., in the event of having detected a pulse signal of which the low level L is 0 V<L<+Vdd, the pulse detector 404 outputs "M (Medium)" as the detection output out2.

The detection result out2 and detection result out3 in the above-mentioned detection procedures A and B will be considered regarding the following five cases.
(1) Case of No Cable Being Connected
(2) Case of New Standard Cable Being Connected
(3) Case of New Standard Cable+New Standard Source Device (both power supply on/off) Being Connected
(4) Case of HDMI Cable Being Connected (with no source device)
(5) Case of HDMI Cable+HDMI Source Device (power supply on/off) Being Connected "(1) Case of No Cable Being Connected"

Figure 39:
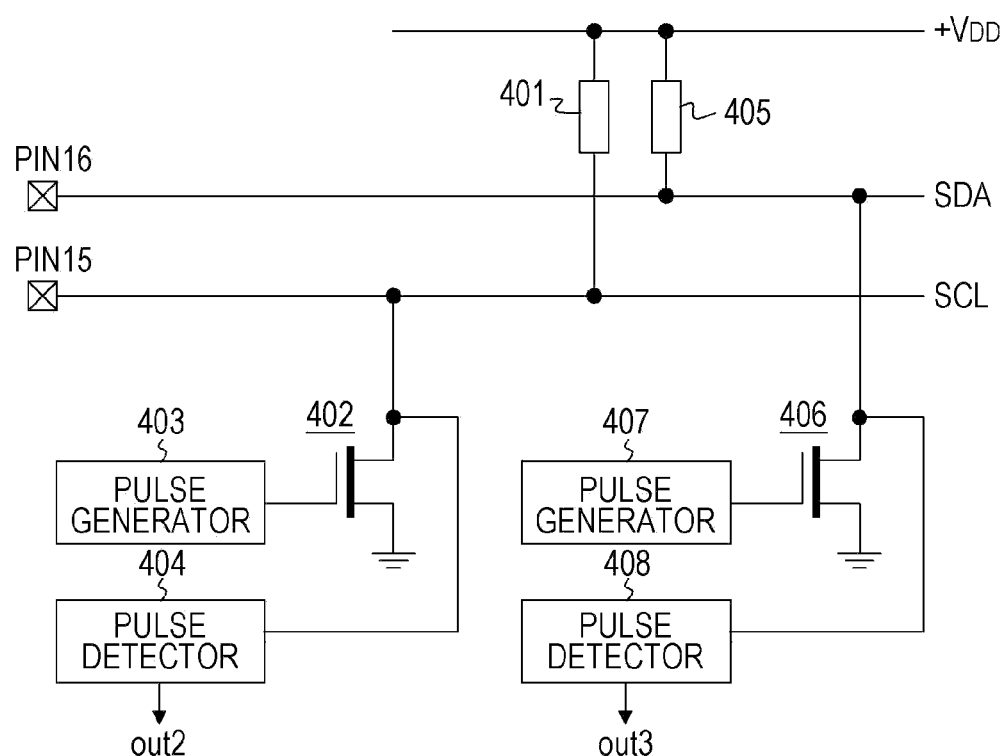
FIG. 39 is a connection status diagram for describing detection results when executing detection procedures A and B in "(1) Case of No Cable Being Connected".

In this case, as shown in FIG. 39, between PIN 15 (SCL) and PIN 16 (SDA) is disconnected (high impedance). Accordingly, in the event of having executed the detection procedure A, the voltage of PIN 16 has been unchanged from the power supply voltage +Vdd, and the pulse detector 408 does not detect a pulse signal at all. Accordingly, the pulse detector 408 outputs "N (No)" as the detection output out3. Also, in the event of having executed the detection procedure B, the voltage of PIN 15 has been unchanged from the power supply voltage +Vdd, and the pulse detector 404 does not detect a pulse signal at all. Accordingly, the pulse detector 404 outputs "N (No)" as the detection output out2.

"(2) Case of New Standard Cable Being Connected"

Figure 40:
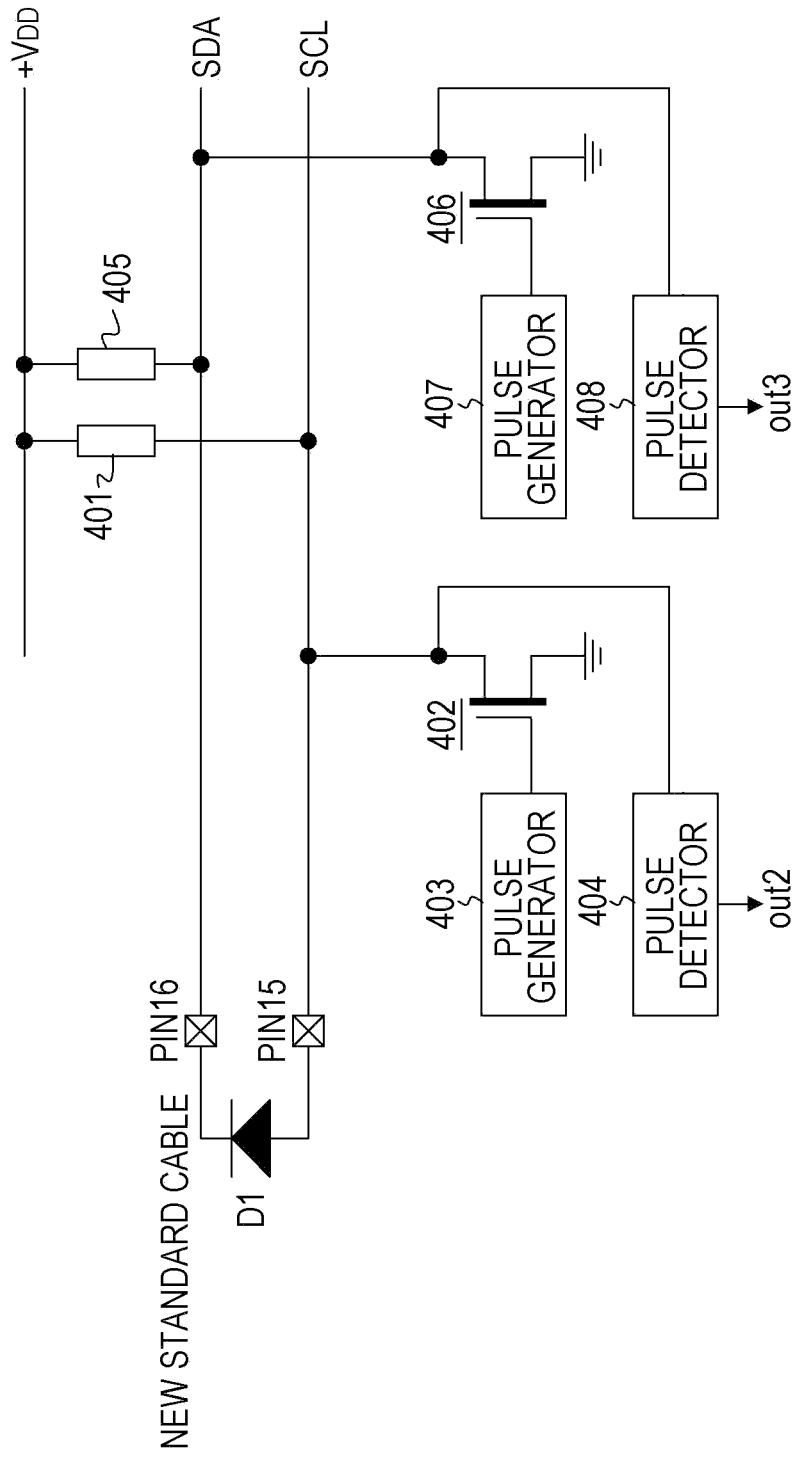
FIG. 40 is a connection status diagram for describing detection results when executing detection procedures A and B in "(2) Case of New Standard Cable Being Connected".

In this case, as shown in FIG. 40, between PIN 15 (SCL) and PIN 16 (SDA) is connected by the diode D1. In this case, a direction from PIN 15 (SCL) to PIN 16 (SDA) has low impedance, and a direction from PIN 16 (SDA) to PIN 15 (SCL) has high impedance.

Accordingly, in the event of having executed the detection procedure A, a perfect pulse signal of which the high level H is "+Vdd", and the low level L is "0 V" is obtained at PIN 16. Accordingly, the pulse detector 408 detects a perfect pulse signal, and outputs "Y (Yes)" as the detection output out3. Also, in the event of having executed the detection procedure B, the voltage of PIN 15 has been unchanged from the power supply voltage +Vdd, and the pulse detector 404 does not detect a pulse signal at all. Accordingly, the pulse detector 404 outputs "N (No)" as the detection output out2.

"(3) Case of New Standard Cable+New Standard Source Device Being Connected"

Figure 41:
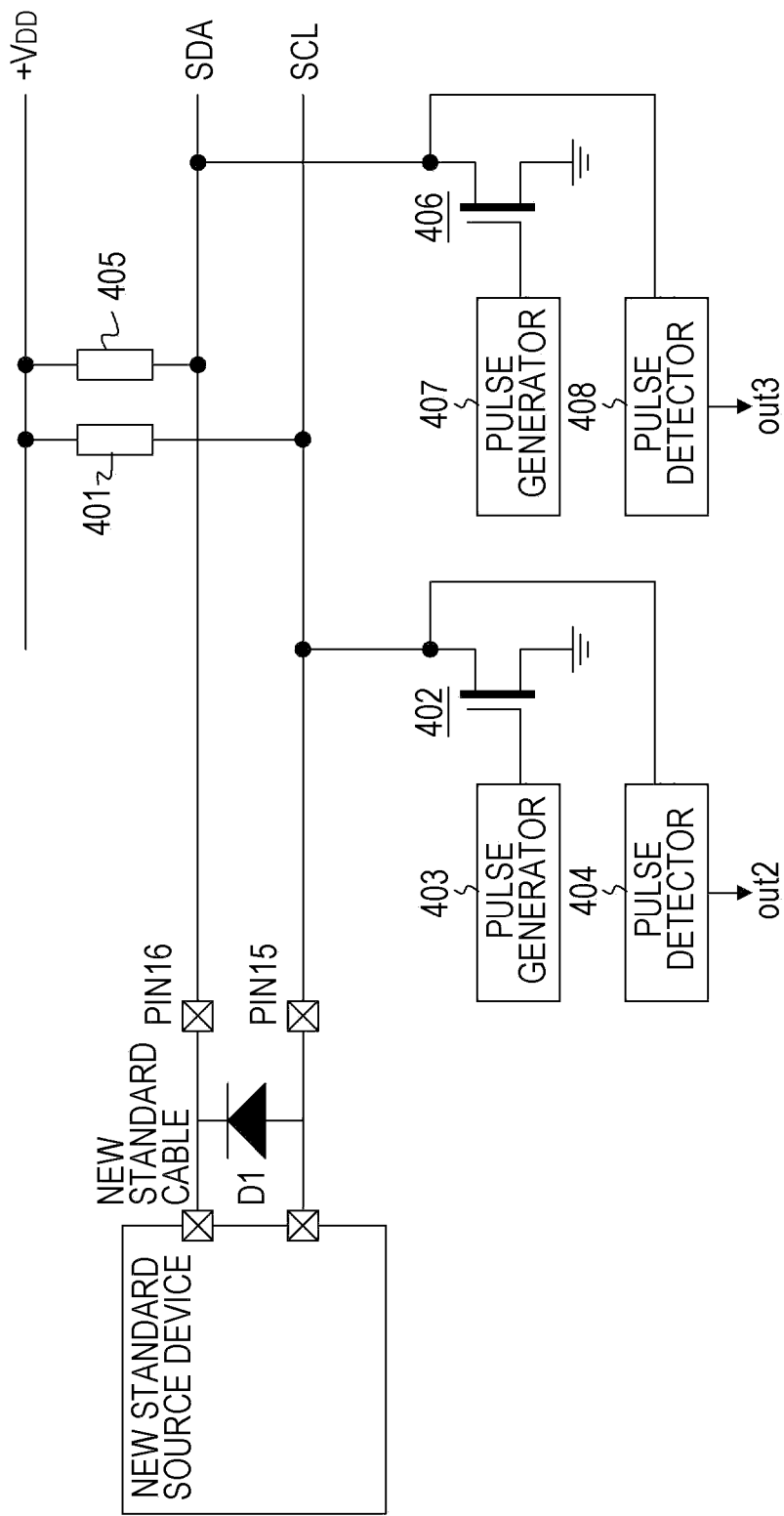
FIG. 41 is a connection status diagram for describing detection results when executing detection procedures A and B in "(3) Case of New Standard Cable+New Standard Source Device Being Connected".

In this case, as shown in FIG. 41, between PIN 15 (SCL) and PIN 16 (SDA) is connected by the diode D1. Accordingly, the detection output out3 in the event of having executed the detection procedure A, and the detection output out2 in the event of having executed the detection procedure B are the same as those in the above-mentioned "(2) Case of New Standard Cable Being Connected". Specifically, in the event of having executed the detection procedure A, the pulse detector 408 outputs "Y (Yes)" as the detection output out3. Also, in the event of having executed the detection procedure B, the pulse detector 404 outputs "N (No)" as the detection output out2.

"(4) Case of HDMI Cable Being Connected"

Figure 42:
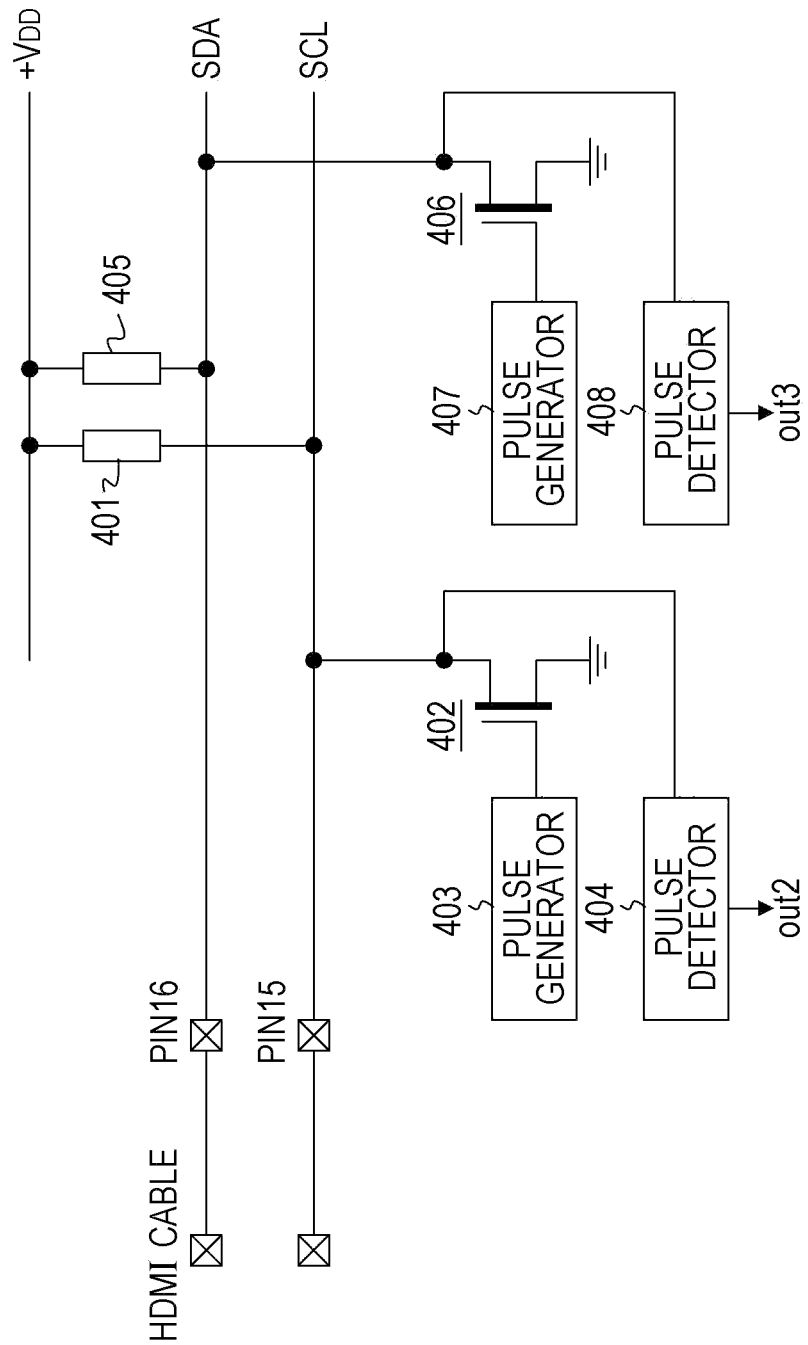
FIG. 42 is a connection status diagram for describing detection results when executing detection procedures A and B in "(4) Case of HDMI Cable Being Connected".

In this case, as shown in FIG. 42, between PIN 15 (SCL) and PIN 16 (SDA) is disconnected (high impedance). Accordingly, the detection output out3 in the event of having executed the detection procedure A, and the detection output out2 in the event of having executed the detection procedure B are the same as those in the above-mentioned "(1) Case of No Cable Being Connected". In the event of having executed the detection procedure A, the pulse detector 408 outputs "N (No)" as the detection output out3. Also, in the event of having executed the detection procedure B, the pulse detector 404 outputs "N (No)" as the detection output out2.

"(5) Case of HDMI Cable+HDMI Source Device Being Connected"

Figure 43:
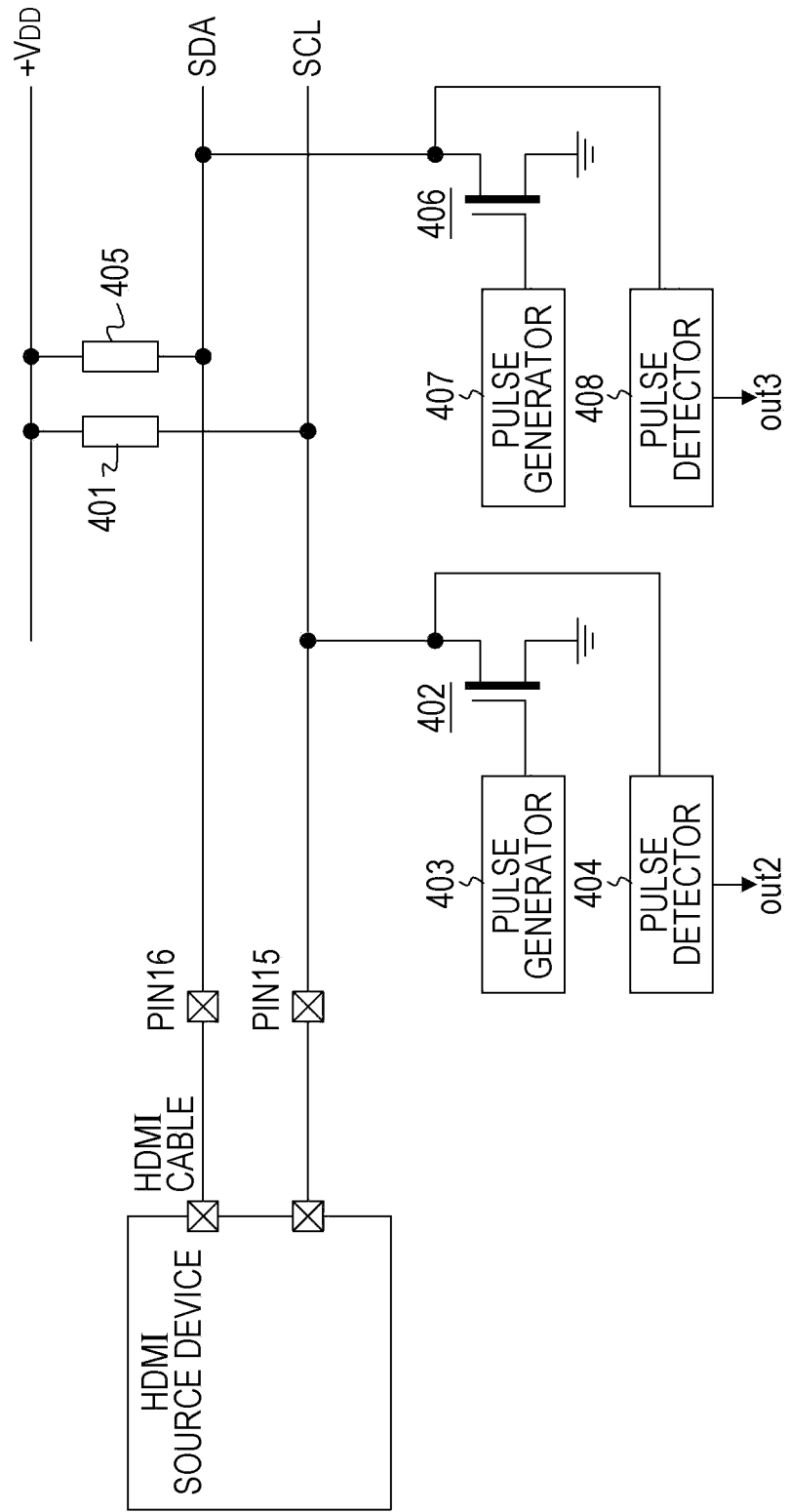
FIG. 43 is a connection status diagram for describing detection results when executing detection procedures A and B in "(5) Case of HDMI Cable+HDMI Source Device Being Connected".

FIG. 43 illustrates the connection state in this case. In this case, impedance between PIN 15 (SCL) and PIN 16 (SDA) is one of the following (5-1) through (5-3) depending on the state of the HDMI source device side.
(5-1): high impedance
(5-2): low impedance
(5-3): medium of low impedance and high impedance However, a direction from PIN 15 (SCL) to PIN 16 (SDA), and a direction from PIN 16 (SDA) to PIN 15 (SCL) ought to exhibit the same impedance value. Accordingly, in the case of (5-1), in the event of having executed the detection procedure A, the pulse detector 408 outputs "N (No)" as the detection output out3. Also, in the event of having executed the detection procedure B, the pulse detector 404 outputs "N (No)" as the detection output out2.

Also, in the case of (5-2), in the event of having executed the detection procedure A, the pulse detector 408 outputs "Y (Yes)" as the detection output out3. Also, in the event of having executed the detection procedure B, the pulse detector 404 outputs "Y (Yes)" as the detection output out2. Further, in the case of (5-3), in the event of having executed the detection procedure A, the pulse detector 408 outputs "M (Medium)" as the detection output out3. Also, in the event of having executed the detection procedure B, the pulse detector 404 outputs "M (Medium)" as the detection output out2.

FIG. 44 collectively illustrates the detection results out3 and out2 in the detection procedure A and detection procedure B in each case of the above-mentioned (1) through (5). As apparent from this diagram, with "(2) Case of New Standard Cable Being Connected" and "(3) Case of New Standard Cable+New Standard Source Device Being Connected", the detection result out3 of the detection procedure A is the complete opposite of the detection result out2 of the detection procedure B. This is because these are cases using the new standard cable, and have extreme anisotropy in impedance (low impedance in the direction of SCL→SDA, high impedance in the direction of SDA→SCL). Note that other cases have isotropy in impedance, and accordingly, the detection result out3 of the detection procedure A and the detection result out2 of the detection procedure B match.

From the above-mentioned results, only in the event that the detection result out3 of the detection procedure A is Y (a perfect pulse has been detected), and also the detection result out2 of the detection procedure B is N (no perfect pulse has been detected at all), determination can be made that the new standard cable shown in FIG. 37 is connected. The flowchart in FIG. 45 illustrates the control procedure of the control unit 123 of the sink device 120 in the event of using this detection method.

First, in step ST71, the control unit 123 starts processing in response to power-on, and then proceeds to the cable detection mode in step ST72. This cable detection mode is a mode for enabling the cable detection circuit shown in FIG. 38, and disabling other pins. Next, in step ST73, the control unit 123 executes the detection procedure A to obtain the detection result out3 output from the pulse generator 408. Next, in step ST74, the control unit 123 executes the detection procedure B to obtain the detection result out2 output from the pulse generator 404.

Next, in step ST75, the control unit 123 determines whether to satisfy a condition that the detection result out3 of the detection procedure A is "Y (Yes)", and also the detection result out2 of the detection procedure B is "N (No)". When this condition is satisfied, the control unit 123 proceeds to processing in step ST76. In this step ST76, the control unit 123 controls the data reception unit 122 in the operation mode conforming to the new standard digital interface (new standard mode).

Next, in step ST77, the control unit 123 executes the detection procedure A to obtain the detection result out3 output from the pulse detector 408. Also, in step ST78, the control unit 123 executes the detection procedure B to obtain the detection result out2 output from the pulse detector 404. In step ST79, the control unit 123 determines whether to satisfy a condition that the detection result out3 of the detection procedure A is "Y (Yes)", and also the detection result out2 of the detection procedure B is "N (No)".

When this condition is satisfied, the control unit 123 maintains the operation mode (new standard mode) of data reception unit 122 without change. On the other hand, when this condition is not satisfied, the control unit 123 determines that the new standard cable has been extracted, and returns to the cable detection mode in step ST72.

Also, when the condition is not satisfied in step ST75, the control unit 123 proceeds to processing in step ST80. In this step ST80, the control unit 123 determines whether or not power supply voltage has been detected at the voltage detector 381, i.e., whether or not the voltage of +5V pin (PIN 18) is +5 V (power supply voltage). In the event that power supply voltage has not been detected at the voltage detector 381, the control unit 123 returns to step ST73 to repeat the processes of the detection procedure A and detection procedure B.

In the event that power supply voltage has been detected, in step ST81 the control unit 123 controls the operation mode conforming to the HDMI standard digital interface (HDMI mode). In step ST82, the control unit 123 monitors the voltage detection state of the voltage detector 381 and maintains the operation mode (HDMI mode) of the data reception unit 122 without change while detecting power supply voltage. In the HDMI mode, the SDA line and SCL line are used for the original applications of HDMI such as readout of EDID, HDCP authentication, and so forth, and accordingly, the detection procedures A and B are not executed. In the event that power supply voltage has not been detected at the voltage detector 381, the control unit 123 immediately returns to the cable detection mode in step ST72.

Note that, when controlling the data reception unit 122 in the new standard mode in step ST76, the control unit 123 supplies the switch control signal $C_{SW}$ to the connection switch 383 shown in FIG. 38 to turn to an on state. Thus, power supply Vcc can be supplied to the source device side.

With the above-mentioned eighth configuration example, even when the source device of which the digital interface is the new standard digital interface is a battery-driven electronic device, and this battery is completely down, it can be determined that the digital interface of this source device is the new standard digital interface. Accordingly, the above-mentioned data reception unit 122 can be controlled in the new standard mode, and also, power supply can be supplied to the source device for charging.

Note that, with the above-mentioned eighth configuration example, attention is focused on PIN 15 (pin for SCL) and PIN 16 (pin for SDA) as a pair of pins used when the data transmission unit 112 of the source device 110 operates using the HDMI standard digital interface, and not used when the data transmission unit 112 of the source device 110 operates using the new standard digital interface (see FIG. 5). Though detailed description will be omitted, the same arrangement may be made even with a pair of pins other than those.

Also, with the above-mentioned eighth configuration example, the field-effect transistor 402 is driven by a pulse signal in the detection procedure A, and the field-effect transistor 406 is driven by a pulse signal in the detection procedure B. However, an arrangement can also be conceived wherein in these detection procedures A and B, the field-effect transistors 402 and 406 are changed from an on state to an off state, change in voltage level is detected at the pulse detectors 408 and 404, and the detection results out3 and out2 are obtained. In this case, the pulse generators 403 and 407 are unnecessary.

2. Modification

Note that, with the above-mentioned embodiment, an example has been shown wherein the HDMI receptacle is shared as the connector unit for connecting an external device which operates in the HDMI standard and new standard digital interface. However, it goes without saying that the present invention is not restricted to this, and can be applied to other similar digital interface units. It can also be conceived that one standard connector unit is shared as a connector unit for connecting an external device which operates in three or more standard digital interfaces.

INDUSTRIAL APPLICABILITY

The present invention can be applied to an AV system configured by a source device and a sink device being connected via a digital interface, or the like, for example.

REFERENCE SIGNS LIST

100 AV system
110 source device
111 connector unit
112 data transmission unit
113 control unit
114 determining unit
120 sink device
121 connector unit
122 data reception unit
123 control unit
124 determining unit
200 cable
310, 320 active range detecting circuit
331, 332, 341, 351, 352, 361 through 364 voltage comparator
370 cable detecting circuit
371 voltage comparator
381 voltage detector
382 current detector
383 connection switch
401, 405 resistor (resistor element)
402, 406 field-effect transistor
403, 407 pulse generator
404, 408 pulse detector

The invention claimed is:

1. An electronic device comprising:
a connector unit having a plurality of pins, in which a first number of pins of said plurality of pins are utilized when an external device which operates using a first digital interface is connected to said connector unit, and in which a second number of pins of said plurality of pins which are less than said first number of pins are utilized when an external device which operates using a second digital interface is connected;
a determining circuit configured to determine whether the digital interface of an external device connected to said connector unit is said first digital interface or said second digital interface, based on the voltage or current state of a predetermined pair of pins of said plurality of pins; and
a control unit configured to perform switching control so that a data transmission unit connected to said connector unit operates using a digital interface determined by said determining circuit,
in which said first digital interface conforms to an HDMI standard having three TMDS channels and a TMDS clock channel, and the predetermined pair of pins is assigned to one of the three TMDS channels, and
in which said second digital interface utilizes one TMDS channel and does not utilize additional TMDS channels or a TMDS clock channel.

2. An electronic device comprising:
a connector unit having a plurality of pins with a first number of pins being used of said plurality of pins when an external device which operates using a first digital interface is connected to said connector unit, and a second number of pins which are less than said first number of pins being used of said plurality of pins when an external device which operates using a second digital interface is connected;
a determining circuit configured to determine whether the digital interface of an external device connected to said connector unit is said first digital interface or said second digital interface, based on the voltage or current state of a predetermined pin not used of said plurality of pins when an external device which operates using said second digital interface is connected to said connector unit; and
a control unit configured to perform switching control so that a data transmission unit connected to said connector unit operates using a digital interface determined by said determining circuit,
wherein said determining circuit focuses on a pair of pins to which a differential signal is input when an external device which operates using said first digital interface is connected, and no differential signal is input when an external device which operates using said second digital interface is connected,
and in a state in which when an external device which operates using said second digital interface is connected, said pair of pins are short-circuited or connected via a first resistor, one pin of said pair of pins is pulled up to predetermined voltage via a second resistor, and the other pin of said pair of pins is grounded, based on a result of comparison between the voltage of said one pin, and higher voltage than voltage obtained by dividing said predetermined voltage by said first resistor and said second resistor, determines whether the digital interface of an external device connected to said connector unit is said first digital interface or said second digital interface.

3. The electronic device according to claim 2, wherein when an external device which operates using said second digital interface is connected, a state in which said pair of pins are short-circuited or connected via said first resistor is performed within the plug of a cable for connecting said external device to said connector unit.

4. The electronic device according to claim 2, further comprising:
a connection circuit configured to determine connection of said cable as to said connector unit;
wherein after said connection circuit determines that said cable is connected to said connector unit, said determining circuit determines whether the digital interface of an external device connected to said connector unit is said first digital interface or said second digital interface.

5. An electronic device comprising:
a connector unit having a plurality of pins with a first number of pins being used of said plurality of pins when an external device which operates using a first digital interface is connected to said connector unit, and a second number of pins which are less than said first number of pins being used of said plurality of pins when an external device which operates using a second digital interface is connected;
a determining circuit configured to determine whether the digital interface of an external device connected to said connector unit is said first digital interface or said second digital interface, based on the voltage or current state of a predetermined pin not used of said plurality of pins when an external device which operates using said second digital interface is connected to said connector unit; and
a control unit configured to perform switching control so that a data transmission unit connected to said connector unit operates using a digital interface determined by said determining circuit,
wherein said determining circuit further includes
a first detecting circuit configured to focus on a pair of pins which are used when an external device which operates using said first digital interface is connected, and are not used when an external device which operates using said second digital interface is connected, and to detect, when an external device which operates using said second digital interface is connected, said pair of pins are short-circuited or connected via a resistor, and one of said pair of pins is pulled up to predetermined voltage via a resistor, the state of current or voltage of the other pin of said pair of pins, and
a voltage detector configured to focus on, when an external device which operates using said first digital interface is connected, a power supply pin to which power supply is supplied from this external device, and to detect the voltage state of said power supply pin, and
based on the detection results of said first detecting circuit and said voltage detector, to determine whether the digital interface of an external device connected to said connector unit is said first digital interface or said second digital interface.

6. The electronic device according to claim 5, wherein said determining circuit determines, when said voltage detector detects that the voltage state of said power supply pin is the voltage of said power supply, that the digital interface of an external device connected to said connector unit is said first digital interface.

7. The electronic device according to claim 5, wherein said determining circuit determines, when said voltage detector detects that the voltage state of said power supply pin is not the voltage of said power supply, and further, said first detecting circuit detects that current flows through the other pin of said pair of pins, or that the voltage of the other pin of said pair of pins is predetermined voltage, that the digital interface of an external device connected to said connector unit is said second digital interface.

8. The electronic device according to claim 5, further comprising:
a power supply unit configured to supply, when said determining circuit detects that the digital interface of an external device connected to said connector unit is said second digital interface, power supply to said external device via said power supply pin.

9. The electronic device according to claim 5, wherein when an external device which operates using said second digital interface is connected, a state in which said pair of pins are short-circuited or connected via said first resistor is performed within the plug of a cable for connecting said external device to said connector unit.

10. The electronic device according to claim 5, wherein said first digital interface is HDMI;
and wherein one pin of said pair of pins is a pin for a serial clock (SCL), and the other pin of said pair of pins is a pin for serial data (SDA).

11. An electronic device comprising:
a connector unit having a plurality of pins with a first number of pins being used of said plurality of pins when an external device which operates using a first digital interface is connected to said connector unit, and a second number of pins which are less than said first number of pins being used of said plurality of pins when an external device which operates using a second digital interface is connected;
a determining circuit configured to determine whether the digital interface of an external device connected to said connector unit is said first digital interface or said second digital interface, based on the voltage or current state of a predetermined pin not used of said plurality of pins when an external device which operates using said second digital interface is connected to said connector unit; and
a control unit configured to perform switching control so that a data transmission unit connected to said connector unit operates using a digital interface determined by said determining circuit,
wherein said determining circuit focuses on a pair of pins which are used when an external device which operates using said first digital interface is connected, and are not used when an external device which operates using said second digital interface is connected, with one pin and the other pin of said pair of pins being connected via an electronic device which flows a signal in one direction from the one pin to the other pin when an external device which operates using said second digital interface is connected, and includes:
a first signal supply circuit configured to supply a first signal to said one pin of said pair of pins;
a second signal supply circuit configured to supply a second signal to said other pin of said pair of pins;
a first pulse detector configured to detect said first signal from said other pin of said pair of pins during a period when said first signal is supplied from said first signal supply circuit to said one pin of said pair of pins; and a second pulse detector configured to detect said second signal from said one pin of said pair of pins during a period when said second signal is supplied from said second signal supply circuit to said other pin of said pair of pins;

and based on the detection results of said first pulse detector and said second pulse detector, determines whether or not the digital interface of an external device connected to said connector unit is said second digital interface.

12. The electronic device according to claim 11, wherein said determining circuit determines, when said first signal detecting unit detects said first signal, and said second signal detecting unit does not detect said second signal, that the digital interface of an external device connected to said connector unit is said second digital interface.

13. The electronic device according to claim 12, wherein said determining circuit focuses on, when an external device which operates using said first digital interface is connected, a power supply pin to which power supply is supplied from this external device, further includes a voltage detecting unit configured to detect the voltage state of said power supply pin, and when said voltage detecting unit detects that the voltage state of said power supply pin is the voltage of said power supply, determines that the digital interface of an external device connected to said connector unit is said first digital interface.

14. The electronic device according to claim 11, wherein said first signal and said second signal are pulse signals.

15. The electronic device according to claim 14, wherein said first signal supply circuit includes a first resistor element for connecting said one pin of said pair of pins to a terminal to which predetermined voltage is supplied, and a first switching element for connecting said one pin to a ground terminal, and wherein said second signal supply circuit includes a second resistor element for connecting said other pin of said pair of pins to a terminal to which predetermined voltage is supplied, and a second switching element for connecting said other pin to a ground terminal.

16. The electronic device according to claim 15, wherein said first switching element and said second switching element are field-effect transistors.

17. The electronic device according to claim 13, wherein when determining that the digital interface of an external device connected to said connector unit is said second digital interface, said determining circuit further includes a power supply unit configured to supply power supply to said external device via said power supply pin.

18. The electronic device according to claim 11, wherein a state in which said pair of pins are connected through said electronic device when an external device which operates using said second digital interface is connected is performed within the plug of a cable for connecting said external device to said connector unit.

19. The electronic device according to claim 11, wherein said first digital interface is HDMI;

and wherein one pin of said pair of pins is a pin for a serial clock (SCL), and the other pin of said pair of pins is a pin for serial data (SDA).

20. The electronic device according to claim 11, wherein said electronic device is a diode.

21. The electronic device according to claim 1, in which in addition to the three TMDS channels and the TMDS clock channel, said first digital interface conforming to the HDMI standard has a DDC (Display Data Channel) and a CEC line.

22. The electronic device according to claim 1, in which the one of the three TMDS channels to which the predetermined pair of pins is assigned is utilized for the first digital interface and is not utilized for the second digital interface.

* * * * *